United States Patent [19]

Takahashi et al.

[11] Patent Number: 5,984,454
[45] Date of Patent: Nov. 16, 1999

[54] IMAGE FORMING SYSTEM AND APPARATUS CONSTITUTING THE SAME

[75] Inventors: Kazuyoshi Takahashi, Kawasaki; Takashi Watanabe, Yokohama; Toshiyuki Yanaka, Tokyo, all of Japan

[73] Assignee: Canon Kabushiki Kaisha, Tokyo, Japan

[21] Appl. No.: 08/066,376

[22] Filed: May 25, 1993

[30] Foreign Application Priority Data

| May 25, 1992 | [JP] | Japan | 4-132851 |
|---|---|---|---|
| Jul. 21, 1992 | [JP] | Japan | 4-193933 |
| Jul. 28, 1992 | [JP] | Japan | 4-201620 |
| Jul. 28, 1992 | [JP] | Japan | 4-201622 |
| Feb. 18, 1993 | [JP] | Japan | 5-028914 |

[51] Int. Cl.$^6$ ......................................... B41J 2/21
[52] U.S. Cl. .................................................. 347/43
[58] Field of Search .............................. 347/15, 43, 96, 347/101, 104, 105, 106, 16; 358/518, 519, 502; 395/115

[56] References Cited

U.S. PATENT DOCUMENTS

| 4,214,276 | 7/1980 | Pugsley et al. | 358/256 |
|---|---|---|---|
| 4,261,011 | 4/1981 | Knop | 358/75 |
| 4,313,124 | 1/1982 | Hara . | |
| 4,345,262 | 8/1982 | Shirato et al. . | |
| 4,446,470 | 5/1984 | Sugiyama et al. | 347/43 X |
| 4,459,600 | 7/1984 | Sato et al. . | |
| 4,463,359 | 7/1984 | Ayata et al. . | |
| 4,481,244 | 11/1984 | Haruta et al. | 346/135.1 X |
| 4,527,885 | 7/1985 | Ayata et al. | 347/2 |
| 4,558,333 | 12/1985 | Sugitani et al. . | |
| 4,561,025 | 12/1985 | Tsuzuki | 347/15 X |
| 4,608,577 | 8/1986 | Hori . | |
| 4,614,967 | 9/1986 | Sayanagi | 347/43 X |
| 4,631,548 | 12/1986 | Milbrandt | 347/15 |
| 4,723,129 | 2/1988 | Endo et al. . | |
| 4,725,849 | 2/1988 | Koike et al. . | |
| 4,740,796 | 4/1988 | Endo et al. . | |
| 4,774,528 | 9/1988 | Kato | 358/298 X |
| 4,882,621 | 11/1989 | Suzuki et al. | 358/518 |
| 5,023,631 | 6/1991 | Negishi et al. | 347/129 |
| 5,068,806 | 11/1991 | Gatten | 347/7 |
| 5,184,214 | 2/1993 | Tatsumi | 358/518 X |

FOREIGN PATENT DOCUMENTS

| 0421806 | 4/1991 | European Pat. Off. . | |
|---|---|---|---|
| 2 280 274 | 2/1976 | France . | |
| 2280274 | 2/1976 | France . | |
| 2025191 | 11/1969 | Germany . | |
| 2360270 | 6/1974 | Germany . | |
| 54-56847 | 5/1979 | Japan . | |
| 59-123670 | 7/1984 | Japan . | |
| 59-138461 | 8/1984 | Japan . | |
| 60-71260 | 4/1985 | Japan . | |
| 62-53492 | 3/1987 | Japan . | |
| 2-187343 | 7/1990 | Japan . | |
| 2-245335 | 10/1990 | Japan | 347/101 |
| 3-46589 | 7/1991 | Japan . | |
| 4-18358 | 1/1992 | Japan . | |
| 1228878 | 4/1971 | United Kingdom . | |
| 2 132 052 | 6/1984 | United Kingdom . | |

*Primary Examiner*—N. Le
*Assistant Examiner*—Anh Vo
*Attorney, Agent, or Firm*—Fitzpatrick, Cella, Harper & Scinto

[57] ABSTRACT

A color image forming system allows color image formation using a color (special color) except for yellow (Y), magenta (M), cyan (C), and black (BK) normally used in color image recording. Palette tables in which data defining use of the special colors (S1 to S4) in addition to Y, M, C, and BK are supplied from a host image data supply apparatus to a printer. At the same time, image data is transmitted in the form of data for allowing selection of the defined data in the palette tables. The printer uses Y, M, C, and BK heads and heads of the special colors S1 to S4. A control unit in the printer stores each palette table for each color (508) and outputs a driving signal to the corresponding head on the basis of the corresponding palette table.

19 Claims, 56 Drawing Sheets

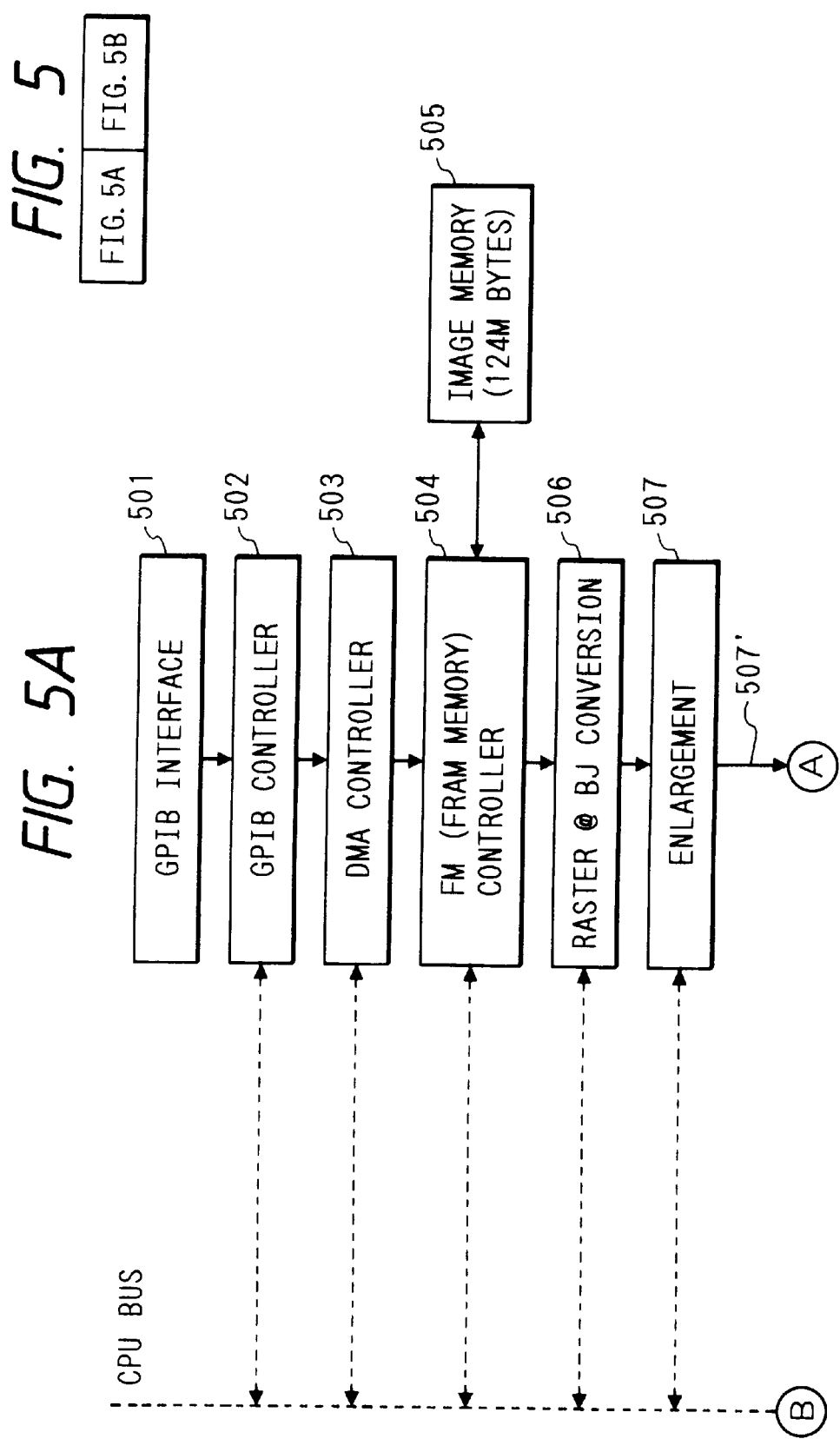

FIG. 8

| PALETTE DATA | CYAN | MAGENTA | YELLOW | BLACK | S1 | S2 |
|---|---|---|---|---|---|---|
| 0 | 10 | 10 | 10 | 0 | 0 | 0 |
| 1 | 0 | 0 | 0 | 0 | 255 | 0 |
| 2 | 0 | 0 | 0 | 0 | 0 | 0 |
| 3 | 150 | 150 | 0 | 0 | 0 | 255 |
| 4 | 0 | 0 | 0 | 255 | 0 | 0 |
| 5 | 0 | 200 | 200 | 0 | 0 | 0 |
| 6 | 0 | 250 | 100 | 0 | 0 | 0 |
| ---------- | ---------- | ---------- | ---------- | ---------- | ---------- | ---------- |
| 254 | 0 | 0 | 255 | 0 | 0 | 0 |
| 255 | 0 | 0 | 0 | 0 | 0 | 0 |

FIG. 17

| PALETTE DATA | CYAN | MAGENTA | YELLOW | BLACK | S1 | S2 |
|---|---|---|---|---|---|---|
| 0 | 10 | 10 | 10 | 0 | 0 | 0 |
| 1 | 0 | 0 | 0 | 0 | 255 | 0 |
| 2 | 0 | 0 | 0 | 0 | 0 | 255 |
| 3 | 150 | 150 | 0 | 0 | 0 | 0 |
| 4 | 0 | 0 | 0 | 255 | 0 | 0 |
| 5 | 0 | 200 | 200 | 0 | 0 | 0 |
| 6 | 0 | 250 | 100 | 0 | 0 | 0 |
| ----- | ----- | ----- | ----- | ----- | ----- | ----- |
| 254 | 0 | 0 | 255 | 0 | 0 | 0 |
| 255 | 0 | 0 | 0 | 0 | 0 | 0 |

FIG. 30

| PALETTE DATA | CYAN (C) | MAGENTA (M) | YELLOW (Y) | BLACK (BK) | S1 | S2 | S3 | S4 |
|---|---|---|---|---|---|---|---|---|
| 0 | 0 | 0 | 0 | 0 | 0 | 0 | 0 | 0 |
| 1 | 255 | 0 | 0 | 0 | 0 | 0 | 0 | 0 |
| 2 | 0 | 255 | 0 | 0 | 0 | 0 | 0 | 0 |
| ........ | ........ | ........ | ........ | ........ | ........ | ........ | ........ | ........ |
| 255 | 0 | 255 | 255 | 0 | 0 | 0 | 0 | 0 |

FIG. 31

| PALETTE DATA | CYAN | YELLOW | MAGENTA | BLACK | S1 | S2 | S3 | S4 |
|---|---|---|---|---|---|---|---|---|
| 0 | 0 | 0 | 0 | 0 | 0 | 0 | 0 | 0 |
| 1 | 0 | 0 | 0 | 255 | 0 | 0 | 0 | 0 |
| ........ | ........ | ........ | ........ | ........ | ........ | ........ | ........ | ........ |
| 255 | 0 | 255 | 255 | 0 | 0 | 0 | 0 | 0 |

FIG. 32

| PALETTE DATA | CYAN | MAGENTA | YELLOW | BLACK | S1 | S2 | S3 | S4 |
|---|---|---|---|---|---|---|---|---|
| 0 | 0 | 0 | 0 | 0 | 255 | 0 | 0 | 0 |
| 1 | 0 | 0 | 0 | 0 | 0 | 255 | 0 | 0 |
| 2 | 0 | 0 | 0 | 0 | 0 | 0 | 0 | 0 |
| ----- | ----- | ----- | ----- | ----- | ----- | ----- | ----- | ----- |
| 255 | 0 | 0 | 255 | 0 | 0 | 255 | 0 | 0 |

FIG. 33

| PALETTE DATA | CYAN | MAGENTA | YELLOW | BLACK | S1 | S2 | S3 | S4 |
|---|---|---|---|---|---|---|---|---|
| 0 | 0 | 0 | 0 | 0 | 0 | 0 | 255 | 0 |
| 1 | 0 | 0 | 0 | 0 | 0 | 0 | 0 | 255 |
| 2 | 0 | 0 | 255 | 0 | 255 | 0 | 0 | 0 |
| ---------- | ---------- | ---------- | ---------- | ---------- | ---------- | ---------- | ---------- | ---------- |
| 254 | 0 | 0 | 0 | 255 | 0 | 0 | 255 | 0 |
| 255 | 0 | 0 | 0 | 0 | 0 | 255 | 0 | 255 |

FIG. 45

| PALETTE DATA | CYAN | MAGENTA | YELLOW | BLACK | S1 | ... | S4 |
|---|---|---|---|---|---|---|---|
| 0 | 0 | 0 | 0 | 0 | 0 | ... | 0 |
| 1 | 0 | 0 | 0 | 0 | 0 | ... | 0 |
| 2 | 0 | 0 | 0 | 0 | 0 | ... | 0 |
| 3 | 0 | 0 | 0 | 0 | 0 | ... | 0 |
| 4 | 0 | 0 | 0 | 0 | 0 | ... | 0 |
| 5 | 0 | 0 | 0 | 0 | 0 | ... | 0 |
| 6 | 0 | 0 | 0 | 0 | 0 | ... | 0 |
| ... | ... | ... | ... | ... | ... | ... | ... |
| 254 | 0 | 0 | 0 | 0 | 0 | ... | 0 |
| 255 | 0 | 0 | 0 | 0 | 0 | ... | 0 |

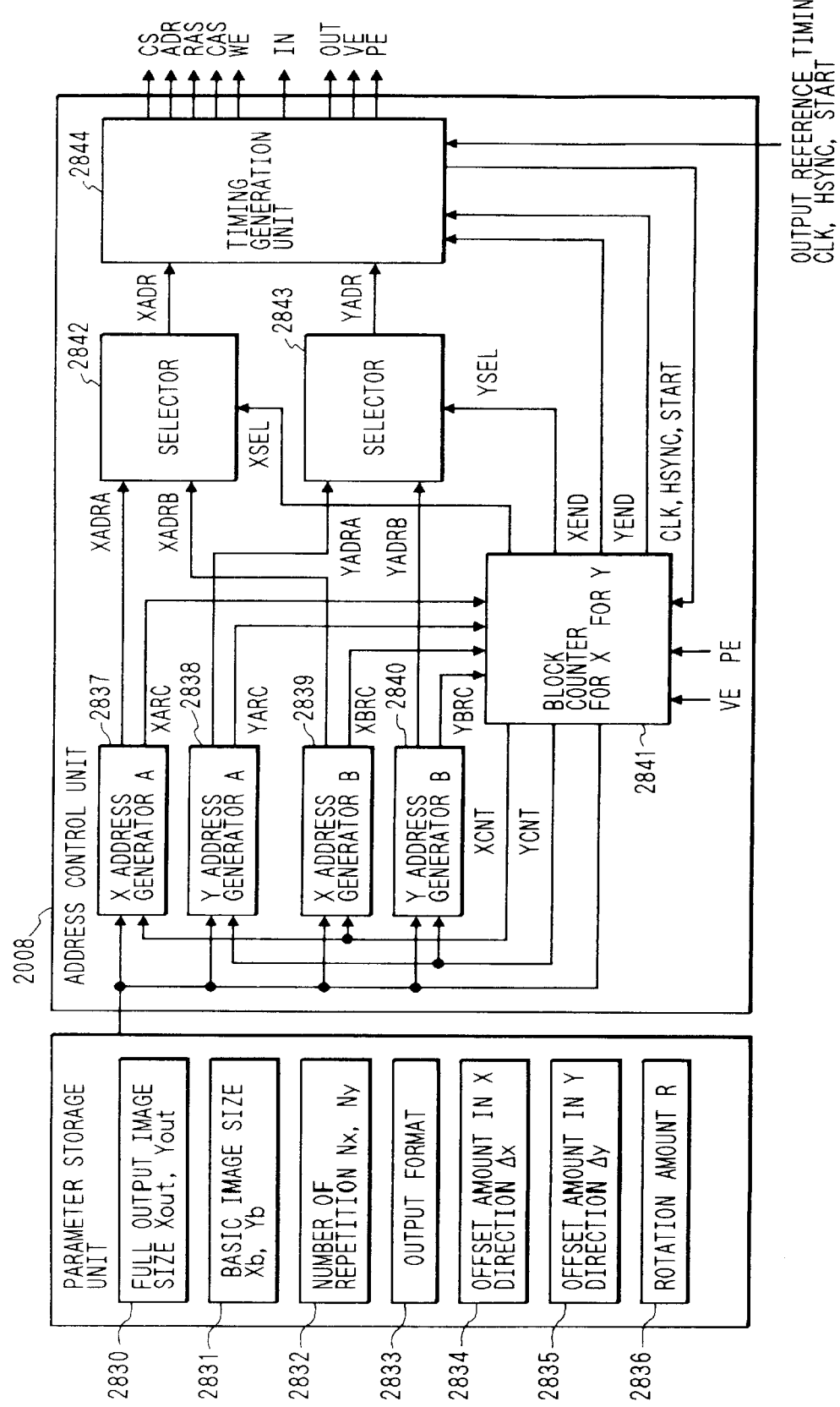

IMAGE FORMING SYSTEM AND APPARATUS CONSTITUTING THE SAME

BACKGROUND OF THE INVENTION

1. Field of the Invention

The present invention relates to an image forming system and an image forming apparatus constituting the system.

2. Related Background Art

An ink jet recording apparatus using a printing means for an ink jet scheme to record information on an elongated recording medium such as a cloth is a relatively new recording apparatus.

A recording apparatus for printing information on a cloth is known as a cloth printing apparatus. Main conventional printing methods are:

A) roller printing for pressing a roller engraved with a pattern against a cloth to form a continuous pattern; and B) screen printing for preparing screen plates, the number of which is equal to the number of colors to be stacked.

The advantages and disadvantages of these conventional methods and an ink jet cloth printing method will not be described in detail herein. The ink jet cloth printing method has received a great deal of attention in view of proposal of a new design environment and innovation of a printing work site in consideration of environmental countermeasures.

A known ink jet scheme is used in a recording apparatus such as a printer or copying machine using a recording medium (e.g., paper). This ink jet recording apparatus is applied to a printing apparatus using a cloth as a recording medium in place of paper, new technical problems are posed. For example, various kinds of cloths used in printing, such as natural fibers (e.g., cotton, silk, and wool) and synthetic fibers (e.g., Nylon, polyester, and acrylic). Characteristic differences between these fibers are described in detail in, e.g., "Senshoku", ed., Kazuo Kondo, published from Tokyo Denki Daikaku Shuppan-Kyoku.

The detailed problems will be described below.

1) Image densities to be reproduced on cloths using identical amounts of ink vary depending on types of cloths.

2) When recording is performed in a constant cloth feed quantity, serial stripes appear differently between scanning cycles of a recording head. This may occur due to elongation properties of cloths.

3) The discharge port surface of the recording head is interfered with fluffs. A gap between the cloth surface and the discharge port surface must be increased for a fiber having large fluffs, such as wool. In this case, the offset influence of a discharge direction as one of the discharge characteristics of a recording head typically occurs, and density variations occurs.

4) The cloth printing apparatus is a manufacturing equipment which is much larger than a printer and a copy machine as the applications of the conventional ink jet scheme.

For example, the width of a cloth subjected to printing per scanning cycle is about 2 m, and a memory capacity for a circuit system is very large. In addition, an image memory for storing original image data is as large as several 100 Mbytes. Although the number of ink colors in a copy machine or the like is four, i.e., cyan, magenta, yellow, and black, the cloth printing apparatus requires two or more colors in the form of special or specific colors in addition to the above four colors. To perform maintenance of such an apparatus, maintenance personnel must have higher technical levels, and maintenance time may be undesirably prolonged.

5) In arranging a cloth printing apparatus, a host computer such as a workstation generates and manages printing image data. A plurality of cloth printing apparatuses are preferably managed by one host computer through a network. Maintenance personnel can preferably obtain necessary information on an operation unit serving as an operation input/output means of the cloth printing apparatus and enter necessary instructions.

6) A cloth printing apparatus generally produces dry goods in continuous output of 50 m or more. In this case, when printing up to 40 m is completed, and abnormal printing occurs, this dry-goods item does not have any commercial value. The portion up to 40 m is undesirably wasted, resulting in a great loss.

In an ink jet printer for recording an image using a recording head having a plurality of nozzles, the recording heads each having the plurality of nozzles are scanned to record image data common to all the recording heads on a recording medium, thereby preventing image variations caused by the nozzle characteristics of the recording heads. This recording scheme is called multi-scanning.

The following problems are posed by the conventional multi-scanning printing method.

(1) When the same data is printed at the same position a plurality of times to increase the printing density, the printing time is undesirably doubled.

(2) A scanning rate of a printing head may be increased to obtain a higher printing speed during thinned printing. However, assume that a predetermined period of time required for performing printing by one normal scanning cycle is defined as "1". If the printing speed is doubled and printing is performed by two printing cycles in accordance with thinned printing, the predetermined period of time is about "1.5" times. When the scanning rate is doubled to perform printing by four scanning cycles, the predetermined period of time becomes about "3" times.

The printing speed is greatly reduced if printing data is thinned and printed to increase the printing density.

In a conventional image output apparatus such as a color printer, color image data received from an image supply apparatus such as a host computer is often expressed as a combination (R, G, and B) of red (R), green (G), and blue (B) as the additive primaries. In particular, when the image supply apparatus is a computer, digital signals representing the quantized intensities of the R, G, and B components are often input because a color image is expressed in the form of R, G, and B luminance data in consideration of matching with a color monitor of the computer.

Cyan (C), magenta (M), and yellow (Y) as complementary colors of R, G, and B are often used as the colors of recording agents or colorants (e.g., a color toner and a color ink) for forming an image in an image output apparatus (a black (BK) recording agent may also be used). C, M and Y are the subtractive primaries.

In this case, the image output apparatus converts the input signals (R, G, and B) into density data C, M, Y, and (K) and controls the amounts of color agents in accordance with these density data, thereby forming an image.

In an image output apparatus, a recording agent having a color (e.g., a metallic color; to be referred to as a special or specific color hereinafter), except for C, M, Y, and BK, as a recording agent for forming an image may be expected to be used. The special color is used when a color which cannot be expressed by C, M, Y, and BK is required in an output image (in particular, in the field of cloth printing, this applies to a case in which a strong demand arises for faithfully reproducing a design designed by a designer) or when an amount of color development agent such as an ink or toner is kept small.

A conventional image forming system is incompatible with use of a color development material of a special color due to its capability.

For example, a conventional image output apparatus cannot convert R, G, and B components of the input image data into density data including a special color. In addition, no color development material corresponding to the special color is available, and an output image including the special color cannot be obtained.

There are many problems left unsolved as to how a special color is designated, and how special color application modes such as a color range to be substituted for the special color and a special color application region are designated.

An image supply apparatus H may supply C, M, Y, and BK as the signal components used in an image output apparatus. In this case, the image supply apparatus must perform processing for color-separating image data into C, M, Y, and BK in accordance with the characteristics of the image output apparatus and supplying the color-separated components to the image output apparatus. In this case, a conventional image supply apparatus cannot color-separates image data into C, M, Y, and BK, and then special colors. Even if this color separation is possible, such color-separated data cannot be accepted by the image output apparatus.

In some conventional image forming systems of this type, an image supply apparatus such as a host computer transmits color image data for recording, and an image output apparatus receives these data to perform color image formation using recording agents of cyan (C), magenta (M), yellow (Y), and black (BK).

In image recording on a recording medium using this image forming system, it is important to determine whether a recorded image faithfully reproduces the original colors.

For example, in the field of cloth printing for printing images on cloths, a designer designs an original image while selecting colors from standard color patches. Color reproducibility at the time of printing for the selected colors greatly depends on reproducibility of a cloth printing system. Strong demand therefore has arisen for faithfully reproducing the selected colors.

SUMMARY OF THE INVENTION

It is an object of the present invention to provide an image forming system and an apparatus constituting the image forming system, capable of solving all or each of the conventional problems described above.

It is another object of the present invention to solve problems posed by ink jet recording on an elongated recording medium in accordance with an ink jet scheme.

It is still another object of the present invention to provide an image forming system which can prevent a decrease in recording density.

It is still another object of the present invention to provide an image forming system capable of performing good recording on various types of recording media.

In order to achieve the above objects according to an aspect of the present invention, there is disclosed an ink jet recording apparatus for discharging an ink on a recording medium to record an image, comprising a recording head for discharging the ink, moving means for moving the recording head for recording, feeding means for feeding the recording medium to a movement region of the recording head moved by the moving means, image processing means for performing processing for converting input image data to ink discharge data of the recording head, and control means for changing a processing parameter in the image processing means and/or a feed quantity in the feeding means.

It is still another object of the present invention to provide an apparatus capable of properly performing error processing.

It is still another object of the present invention to provide an image supply apparatus capable of facilitating designation of special color applications, designation of an application mode of the special color, and the like.

It is still another object of the present invention to provide an image output apparatus control apparatus compatible with the image output apparatus.

It is still another object of the present invention to provide an image output apparatus which allows special color applications and is compatible with designation of an image supply apparatus.

It is still another object of the present invention to provide an image forming system, comprising the image supply apparatus and the image output apparatus, for allowing faithful reproduction of an original image.

In order to achieve the above objects according to another aspect of the present invention, there is provided an image supply apparatus for supplying image data to an image output apparatus capable of performing color recording, comprising designating means for designating image recording using a recording agent used for expressing a special color.

The present invention has been made in consideration of the above situation, and has as its still another object to provide an image forming system capable of properly reproducing a selected color.

The above and other objects, features, and advantages of the present invention will be apparent from the following detailed description of the preferred embodiments in conjunction with the accompanying drawings.

BRIEF DESCRIPTION OF THE DRAWINGS

FIG. 8 is a view illustrating the contents of a palette conversion table shown in FIGS. 5A and 5B;

FIG. 17 is a view for explaining a palette conversion table in the cloth printing apparatus of the second embodiment;

FIG. 30 is a view for explaining a palette conversion table formed in the sequence shown in FIG. 29;

FIG. 31 is a view for explaining the palette conversion table formed in the sequence shown in FIG. 29;

FIG. 32 is a view for explaining the palette conversion table formed in the sequence shown in FIG. 29;

FIG. 33 is a view for explaining the palette conversion table formed in the sequence shown in FIG. 29;

FIG. 45 is a view for explaining data for setting data in each memory shown in FIG. 43 so as to prevent an abnormal output until a conversion parameter is input;

FIG. 50 is a block diagram showing an arrangement of a parameter storage unit and an address control unit;

DETAILED DESCRIPTION OF THE PREFERRED EMBODIMENTS

The first embodiment of the present invention will be described below.

Prior to a description of a cloth printing apparatus of the first embodiment, the general arrangement of an ink jet recording apparatus as its main component will be described with reference to FIGS. 1 to 3. In the description with reference to FIGS. 1 to 3, although terms (e.g., recording paper) which are not used in a cloth printing apparatus, parts having a clear correspondence with those of the cloth printing apparatus will not be described in detail.

Figure 1:
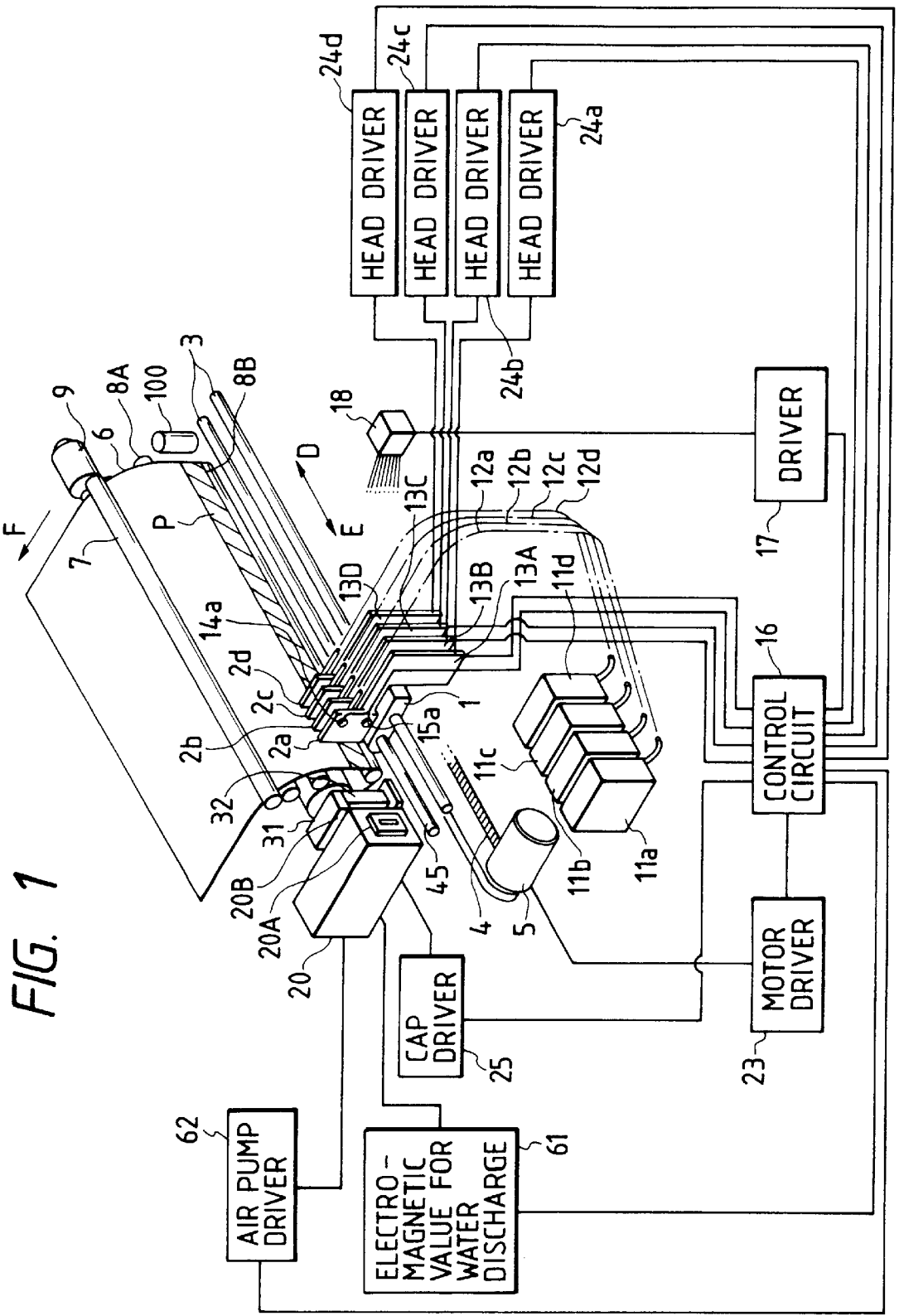
FIG. 1 is perspective view of a recording unit of an apparatus according to the first embodiment of the present invention.

Referring to FIG. 1, a carriage 1 has recording heads 2a, 2b, 2c, and 2d for discharging inks of four colors, i.e., cyan, magenta, yellow, and black. A guide shaft 3 movably guides and supports the carriage 1. Part of a belt 4 constituted by an endless belt is connected to the carriage 1, and the carriage 1 is driven by a driving motor 5 as a pulse motor driven by a motor driver 23 so as to move along the recording surface of recording paper 6 serving as a recording medium such as paper or a cloth through the belt 4.

The ink jet recording apparatus also includes a feeding roller 7 for feeding the recording paper 6, guide rollers 8A and 8B for guiding the recording paper 6, and a recording paper feeding motor 9.

Each of the recording heads 2a, 2b, 2c, and 2d has a plurality of discharge ports (not shown) for discharging ink droplets toward the recording paper 6 and an ink path (not shown) communicating with the plurality of discharge ports. Inks are supplied from ink tanks 11a, 11b, 11c, and 11d to the ink paths through supply tubes 12a, 12b, 12c, and 12d, respectively. Thermoelectric conversion elements for generating heat energies are arranged in the ink paths and selectively receive driving signals from head drivers 24a, 24b, 24c, and 24d through flexible cables 13a, 13b, 13c, and 13d, thereby discharging inks, respectively.

Head heaters 14a, 14b, 14c, and 14d (the heaters 14b to 14d are not illustrated) and temperature detecting means 15a, 15b, 15c, and 15d (the means 15b to 15d are not illustrated) are arranged in the recording heads 2a, 2b, 2c, and 2d, respectively. Detection signals from the temperature detecting means 15a, 15b, 15c, and 15d are input to a control circuit 16 having a CPU. The control circuit 16 controls heating of the head heaters 14a, 14b, 14c, and 14d (the heaters 14b to 14d are not illustrated) on the basis of these input signals, thereby controlling the temperatures of the recording heads 2a to 2d.

A capping unit 20 has a cap 20A brought into contact with the discharge port surface of each of the recording heads 2a, 2b, 2c, and 2d in a non-recording state. In the non-recording state, the recording heads 2a, 2b, 2c, and 2d which are in contact with the cap 20A are moved to a position opposite to the capping unit 20. At this time, the capping unit 20 is driven by a cap driver 25 in a forward direction, so that the cap 20A is brought into tight contact with the discharge port surface of the cap 20A, thereby performing capping. The cap unit 20 has a blade 20B to wipe the discharge port surfaces of the recording heads 2a to 2d.

A clogging preventive means 31 receives a discharged ink during idle discharge operations of the recording heads 2a, 2b, 2c, and 2d. An idle discharge reception unit 31 has a liquid reception member 32 which is caused to oppose the recording heads 2a, 2b, 2c, and 2d to absorb the inks discharged therefrom. The idle discharge reception unit 31 is located between the capping unit 20 and a recording starting position. Note that the liquid reception member 32 effectively consists of a sponge-like porous member or a plastic sintered body.

An electromagnetic valve 61 for water discharge and an air pump driver 62 are connected to the capping unit 20. Under the control of the control circuit 16, the water discharge nozzle for cleaning and an air spray nozzle in the capping unit 20 are driven by the electromagnetic valve 61 and the air pump driver 62, respectively.

Figure 2:
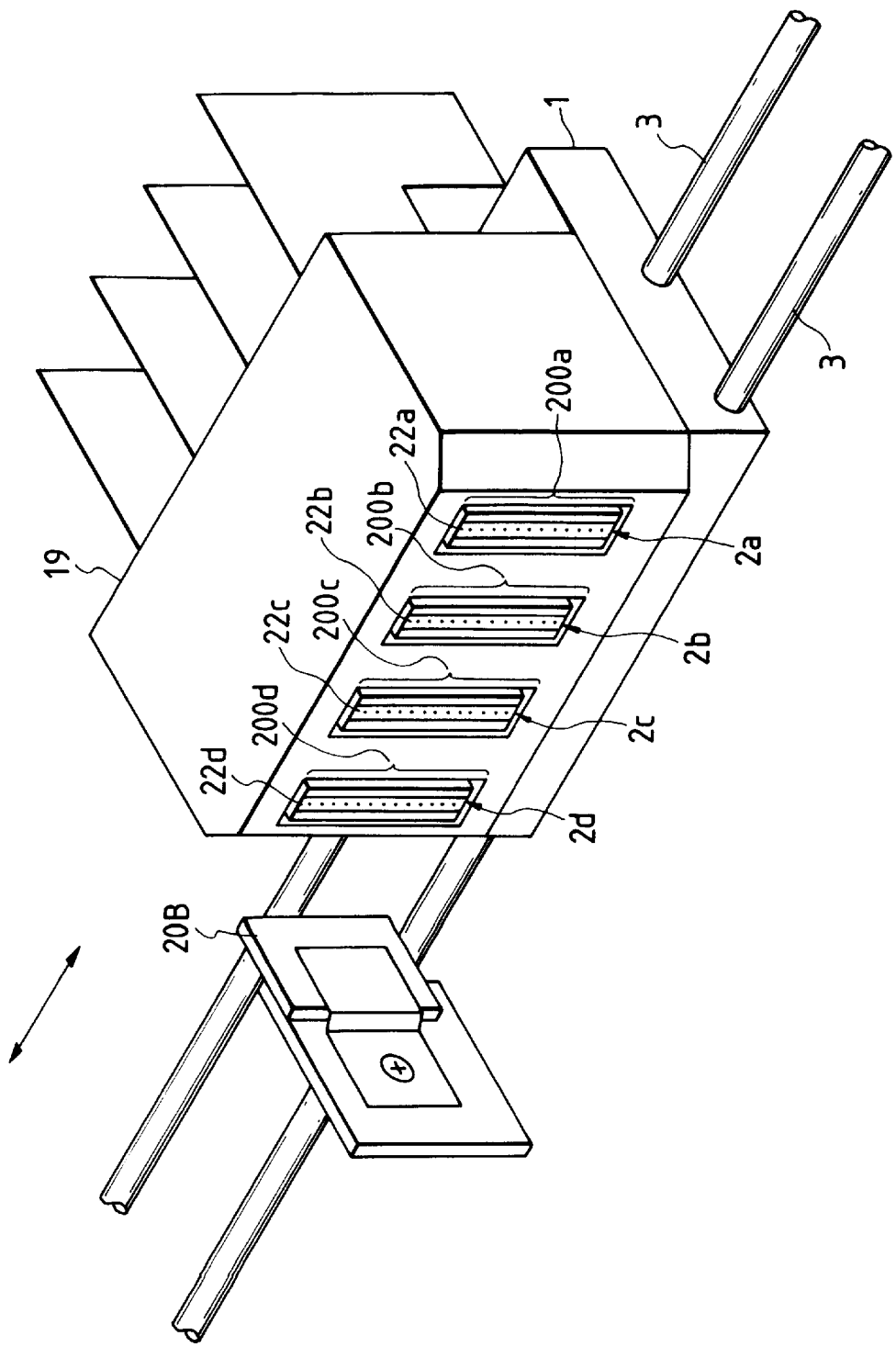
FIG. 2 is a perspective view showing the details of recording heads shown in FIG. 1.

FIG. 2 is a perspective view showing the details of the recording heads 2a to 2d, when viewed from a direction opposite to that in FIG. 1.

As shown in FIG. 2, the respective recording heads comprise a plurality of discharge ports 200a, a plurality of discharge ports 200b, a plurality of discharge ports 200c, and a plurality of discharge ports 200d in a feed direction (to be referred to as a sub-scanning direction) of the recording paper 6. The four recording heads 2a to 2d are integrally mounted by a head holder 19. FIG. 2 shows a state in which the carriage 1 is located near the blade 20B shown in FIG. 1. Surfaces 22a to 22d in which the discharge ports 200a to 200d of the recording heads are formed are brought into contact with the blade 20B when they pass by the blade 20B, so that the ink droplets and dust which attach to the surfaces 22a to 22d are wiped out.

Figure 3:
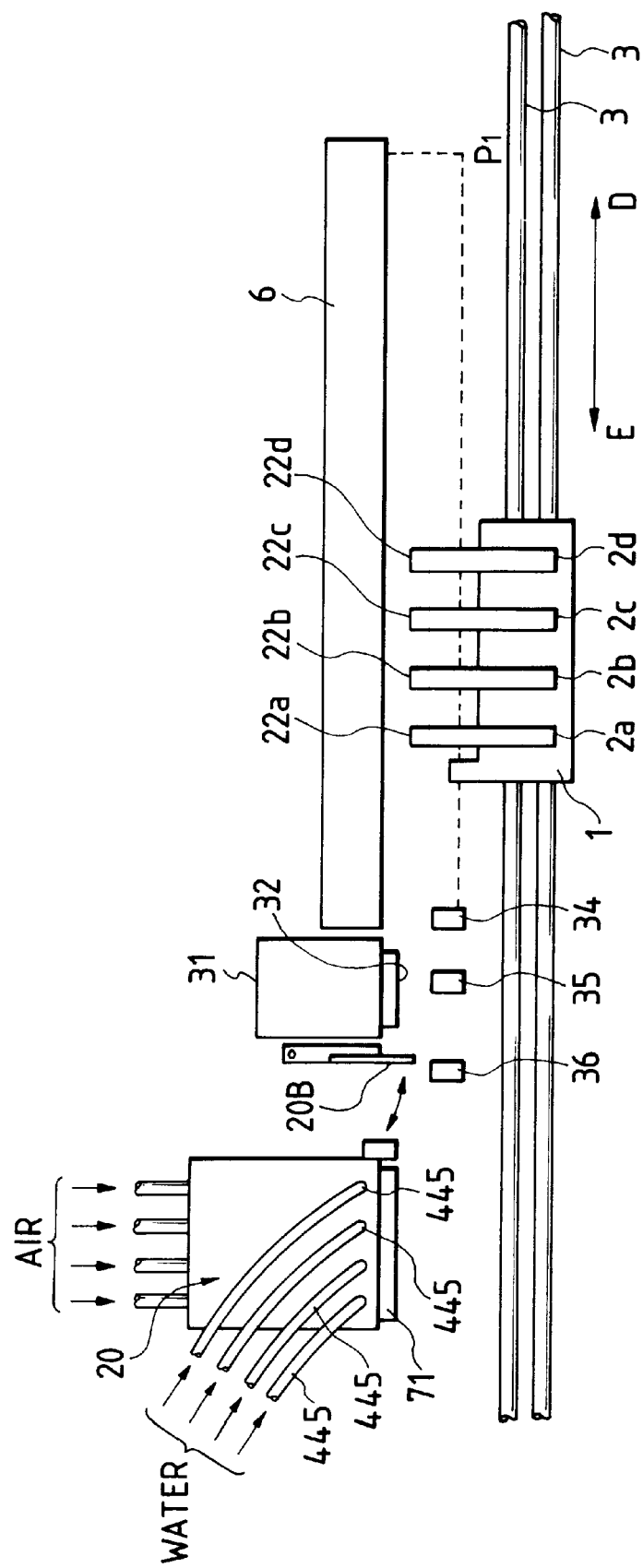
FIG. 3 is a schematic plan view of an apparatus for explaining the operation of the apparatus shown in FIG. 1.

FIG. 3 is a plan view for explaining an operation of the recording heads in the recording apparatus shown in FIGS. 1 and 2. The same reference numerals as in FIG. 1 denote the same parts in FIG. 3, and a detailed description thereof will be omitted.

Referring to FIG. 3, a capping unit detection sensor 36 detects that the recording heads 2a, 2b, 2c, and 2d are located at predetermined capping position. An idle discharge position detection sensor 35 detects a reference position set when the recording heads 2a, 2b, 2c, and 2d perform idle discharge operations while moving along the scanning direction.

The operation of the ink jet recording apparatus will be described below.

In a standby state, the recording heads 2a, 2b, 2c, and 2d are capped by the capping unit 20. When a recording instruction is input to the control circuit 16, the carriage 1 is driven through the motor driver 23. This movement of the carriage 1 is detected by the idle discharge position detection sensor 35 to perform idle ink discharge to the idle discharge reception unit 31 for a predetermined period of time. When movement of the carriage 1 is detected by a recording starting detection sensor 34, the carriage 1 is moved with reference to this recording starting position in the main-scanning direction (i.e., a direction indicated by an arrow D) to selectively discharge inks from the discharge ports 200a to 200d of the recording heads 2a, 2b, 2c, and 2d in accordance with recording data. Therefore, an image constituted by a dot pattern is recorded in a recording width portion p of the recording paper 6.

When the recording heads 2a, 2b, 2c, and 2d are fed by P1 pulses from the recording starting position by the driving motor 5 (FIG. 1), and ink discharge recording on the recording paper 6 is performed, the carriage 1 is moved by P2 pulses, thereby completing one scanning cycle. The moving direction of the carriage 1 is then reversed, and the carriage 1 is driven in a direction indicated by an arrow E to return to the idle discharge position. Upon this movement, the recording paper 6 is fed by the width of the recording width portion P of the recording paper 6 in the sub-scanning direction (i.e., a direction indicated by an arrow F), and the above operations are repeated. A head cleaning mechanism 445 using water in FIG. 3 is not directly associated with the gist of the present invention, and a detailed description thereof will be omitted.

The overall arrangement of a cloth printing apparatus used in the printing unit of the above-described ink jet apparatus will be described with reference to FIG. 4.

Printing image data is transmitted from a host computer 101 such as a workstation to a control board 102 in the cloth printing apparatus through an interface (GPIB in this case). An apparatus for transmitting this image data is not limited to a specific apparatus. The image data may be transferred through a network or in an off-line through an MT (magnetic tape) or the like. The control board 102 is the main component of the cloth printing apparatus and manages the overall apparatus.

The control board 102 receives a key input or the like from an operation unit 103 and outputs data for performing a predetermined display operation. The control board 102 also transmits a cloth feed instruction to a cloth feeder 104. Details of communication with the cloth feeder 104 will be described with reference to FIG. 7. The control board 102 further controls to drive actuators such as a motor and a, solenoid through a driver unit 105 and read the operating states of the components through sensors and the like.

Various actuators and sensors are not directly associated with the gist of the present invention, and only typical functions will be described below.

A carriage motor 5 (FIG. 4) corresponding to the motor 5 (FIG. 1) is different from the motor 5 (FIG. 1) in the following respects. Only the four recording heads of four colors are used in FIG. 1. However, in the cloth printing apparatus, recording heads S11, S12, S21, and S22 of the special colors described above are mounted. One or two recording heads for each special color are mounted to perform high-speed printing. For this reason, the weight and volume of the carriage become large, and the carriage motor is larger than that used in a conventional printer or copying machine. To continuously print a cloth having a length of several tens of meters, ink consumption is large. In some cases, the maximum storage ink quantity of the conventional printer may be used up within, e.g., an hour. The cloth printing apparatus of this embodiment comprises a large ink tank which stores a large amount of ink and an ink feed motor 106 for moving the carriage, although these components are not provided in FIG. 1. Capping motors 25-1 and 25-2 (FIG. 4) correspond to the cap driver 25 in FIG. 1. In this embodiment, two recording heads are used for each color, so that two capping motors are arranged for these two recording heads. In addition, a position sensor S-1 detects a carriage position and information representing the presence/absence of a cloth. A head driving signal is transmitted to each recording head through a flexible cable 13 and relay boards 107-1 and 107-2 on the carriage.

Figure 5B:
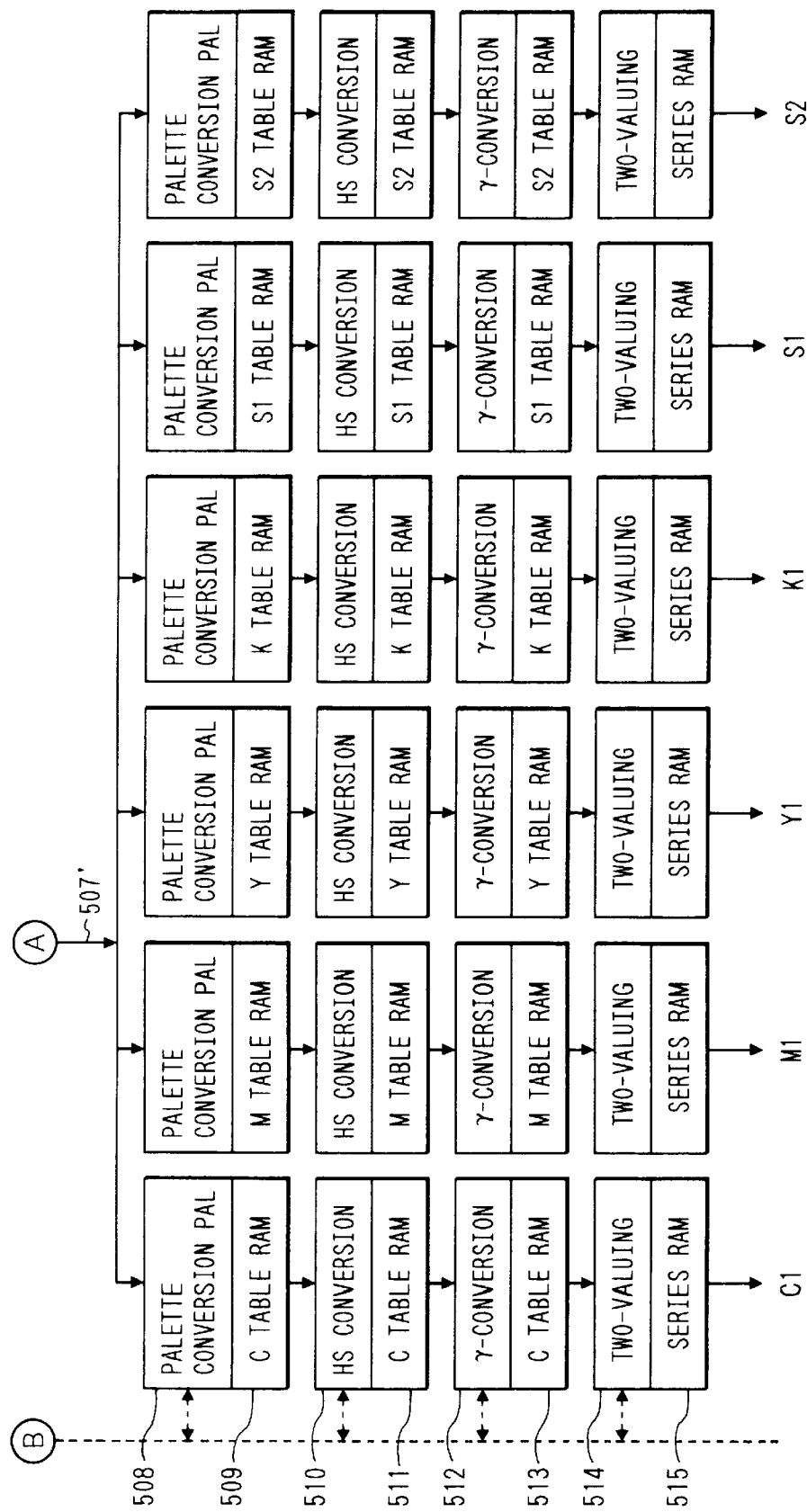
FIG. 5, comprised of FIG. 5A and 5B, are block diagrams showing an arrangement in a control board shown in FIG. 4.
Figure 6:
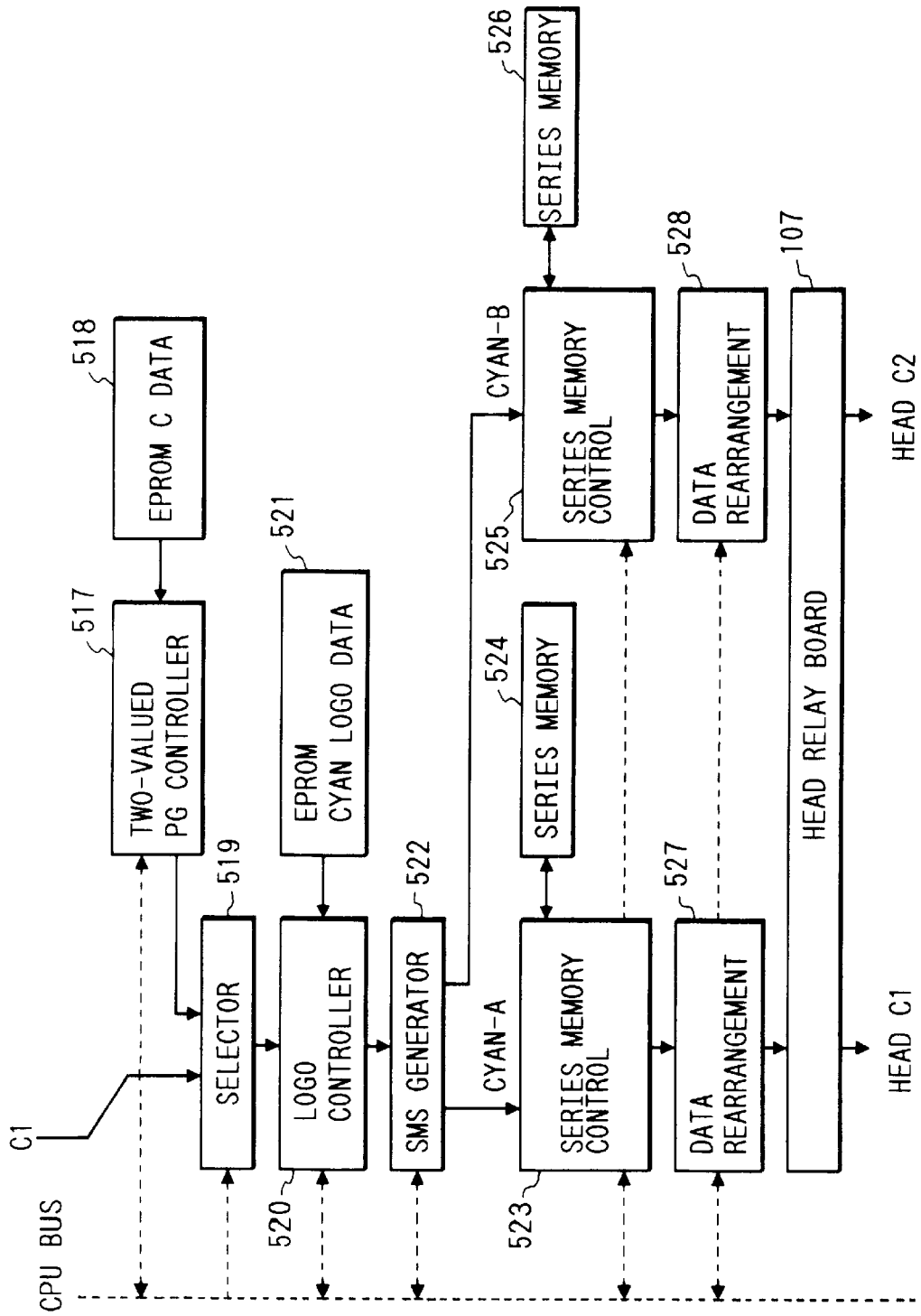
FIG. 6 is a block diagram showing the arrangement in the control board shown in FIG. 4.

FIGS. 5A, 5B and 6 are block diagrams showing an image data processing arrangement and a data flow in the control board 102.

The cloth printing apparatus receives information such as printing image data and color palette table data from the host computer 101. The image data from the host computer is stored in an image memory 505 through an GPIB interface 501, a GPIB controller 502, a DMA controller 503, and an FM memory controller 504. The memory size as 124 Mbytes of this memory 505 is assumed when an A1 size is constituted by 8-bit palette data. The memory size can be determined depending on the product specifications. When transfer from the host computer is completed, and predetermined processing is completed, the cloth printing apparatus is set in a printing standby state.

Upon reception of a printing starting signal from a CPU (not shown), read access of the image memory 505 is started. Data transferred from the host computer 101 represents a raster image, and conversion of the raster image data into data for driving each recording head is performed in raster @ BJ conversion 506. The converted data is subjected to palette conversion 508 through an enlargement function 507. Up to a signal 507' output from the enlargement function 507, the data has a form which is the same as that of the data transmitted from the host computer 101. In this embodiment, this data is an 8-bit palette signal. The data is converted into color data by the palette conversion devices 508 and conversion tables (SRAM) 509. In this embodiment, the data are classified into a total of six colors, i.e., cyan, magenta, yellow, black, and the special colors S1 and S2.

A conversion operation of the palette tables 509 is shown in FIG. 8.

256 inputs from 0 to 255 are entered for 8-bit palette data. As can be understood from FIG. 8, the conversion is performed as follows.

If 0 is input, light gray is obtained.

If 1 is input, solid printing of a special color 1 is performed.

If 2 is input, solid printing of a special color 2 is performed.

If 3 is input, a bluish color as a mixture of cyan and magenta is obtained.

If 4 is input, solid black printing is performed.

If 5 is input, a reddish color as a mixture of magenta and yellow is obtained.

If 6 is input, a more reddish color than that in the input of 5 is obtained.

If 254 is input, solid yellow printing is performed.

If 255 is input, no printing is performed.

As a more specific circuit arrangement, an input (palette data) is supplied to the address of each RAM 509, and this address data is used as a conversion value. If this conversion table is fixed, the table can be constituted by a ROM. The device 508 has a function of managing the RAM and interfacing with the CPU.

Figure 4:
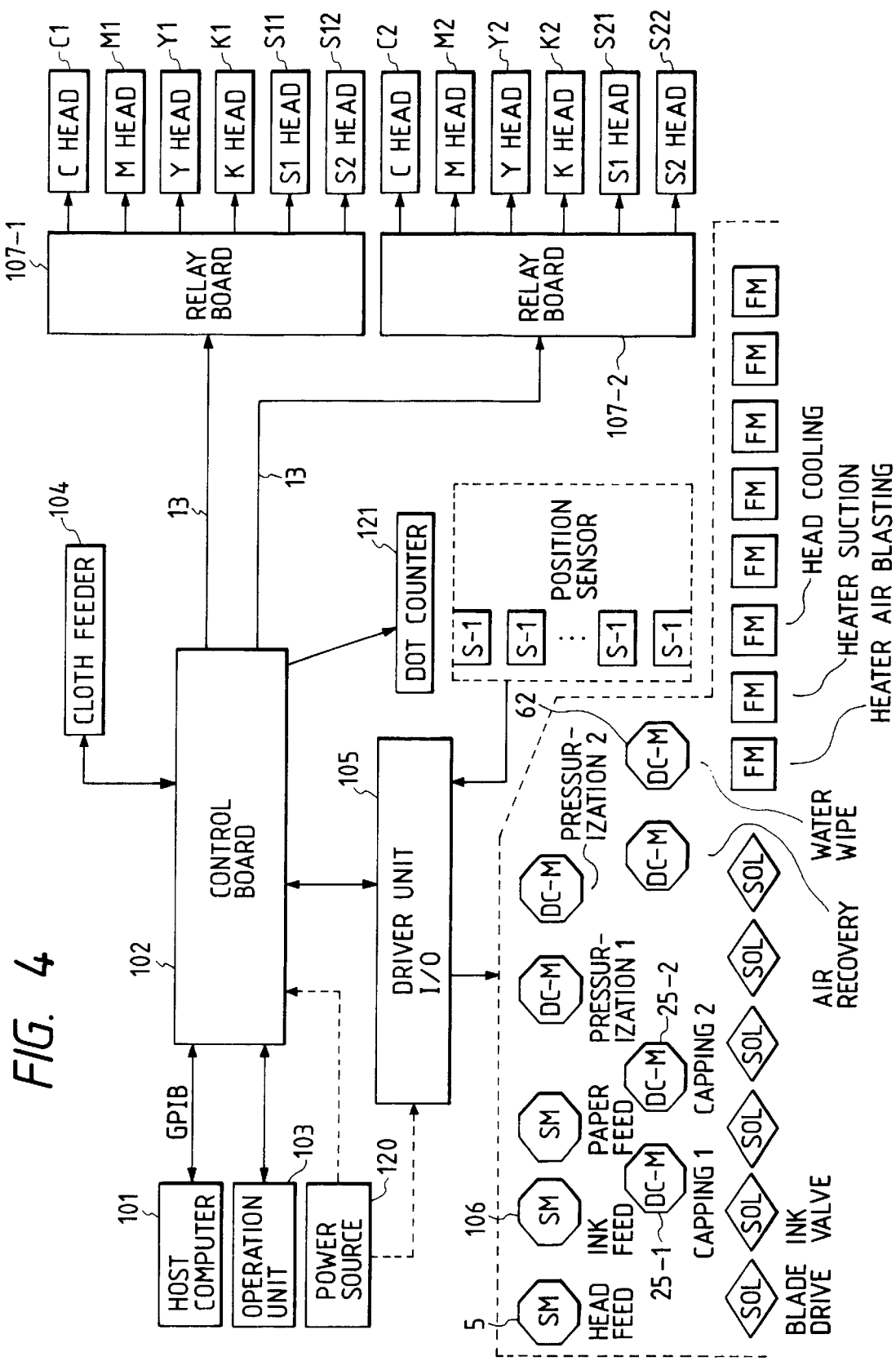
FIG. 4 is a block diagram showing an overall arrangement of a cloth printing apparatus according to the first embodiment of the present invention.

HS (head shading) conversion 510 performs table conversion and corrects variations (irregularity) of printing densities which correspond to the discharge ports of the recording heads 2a to 2d (FIG. 1) (recording heads C1, C2, M1, M2, Y1, Y2, K1, and K2 are used in FIG. 4). For example, data for a discharge port having a small ink discharge amount and a low recording dot density is converted to data representing a higher density, data for a discharge port having a large ink discharge amount and a high recording dot density is converted into data representing a lower density, and data for a discharge port having an intermediate ink discharge amount and a middle recording dot density is directly used. The HS conversion 510 uses HS table conversion SRAMs 511.

γ-conversion is constituted by γ-conversion devices 512 and conversion table RAMs 513 and performs gradation correction table conversion in which the density of the entire image for each color is increased or decreased. If no density conversion is performed, a linear table is obtained. That is, an output of "0" is obtained for an input of "0"; an output of "100", for an input of "100"; an output of "210", for an input of "210"; and an output of "255", for an input of "255".

When the color data conversion tables 509, the HS conversion tables 511, and the γ-conversion tables 513 are provided in accordance with the types of cloths used in printing, best printing can be performed in accordance with the types of cloths.

Two-valuing circuits 514 are devices having a pseudo gradation function. An input to each two-valuing circuit 514 is 8-bit gradation data, and an output therefrom is 1-bit two-valued pseudo gradation data. This pseudo gradation data is expressed by the number of dots formed in unit area (or unit pixel). The pseudo gradation data is stored in each series memory 515 (SRAM).

In this stage, two-valued data C1, M1, Y1, K1, S1, and S2 corresponding to all the colors are generated. The two-valued signals of all the colors are supplied to identical circuit arrangements. Only C1 will be exemplified below.

Referring to FIG. 6, two-valued data C1 is input to an SMS generator 522. A selector 519 is arranged to receive outputs from a two-valued PG controller 517 and an EPROM 518 constituting a test printing pattern generator (PG). The data or signal C1 is input to the SMS (sequential multi-scanning) generator 522 in accordance with the switching operation of the selector 519.

The EPROM 518 of the pattern generator stores PG data, and its output timing is managed by the PG controller 517. Logo marks such as maker brands are often printed at the end portions of the dry goods. For this reason, data associated with this are stored in an EPROM 521, and a logo controller 520 manages the position and length of a logo mark on the basis of the data stored in the EPROM 521. That is, logo data is added to the data C1, and the resultant data is input to the SMS generator 522.

As described in Japanese Patent Application No. 4-74209 filed by the present applicant, the SMS generator 522 selects one of the ink discharge ports of recording heads C1 and C2 to form a dot in a pixel corresponding to the data C1. This can prevent degradation of printing quality which is caused by irregular ink discharge of each discharge port, as will be briefly described below. To form each printing pixel by a plurality of dots on a cloth, the ink discharge operations are performed from different discharge ports in different scanning operations of the recording heads C1 and C2, and these different discharge ports are sequentially used. As described above, the SMS generator 522 distributes the printing data to series memory controls 523 and 525 in accordance with a predetermined sequence.

A series memory 524 is a data storage memory for correcting the physical position of a recording head space. Image data stored and input by the SMS generator 522 is temporarily stored in this memory and is read out at a timing corresponding to the physical position of the recording head. The series memory controls 523 and 525 manage read data access. A data rearrangement 527 rearranges the data matching the respective recording heads.

The cyan data C two-valued as described above is subjected to the above parallel processing in accordance with the two recording heads, and the resultant data is transmitted to two recording heads C1 and C2 through a head relay board 107.

Figure 7:
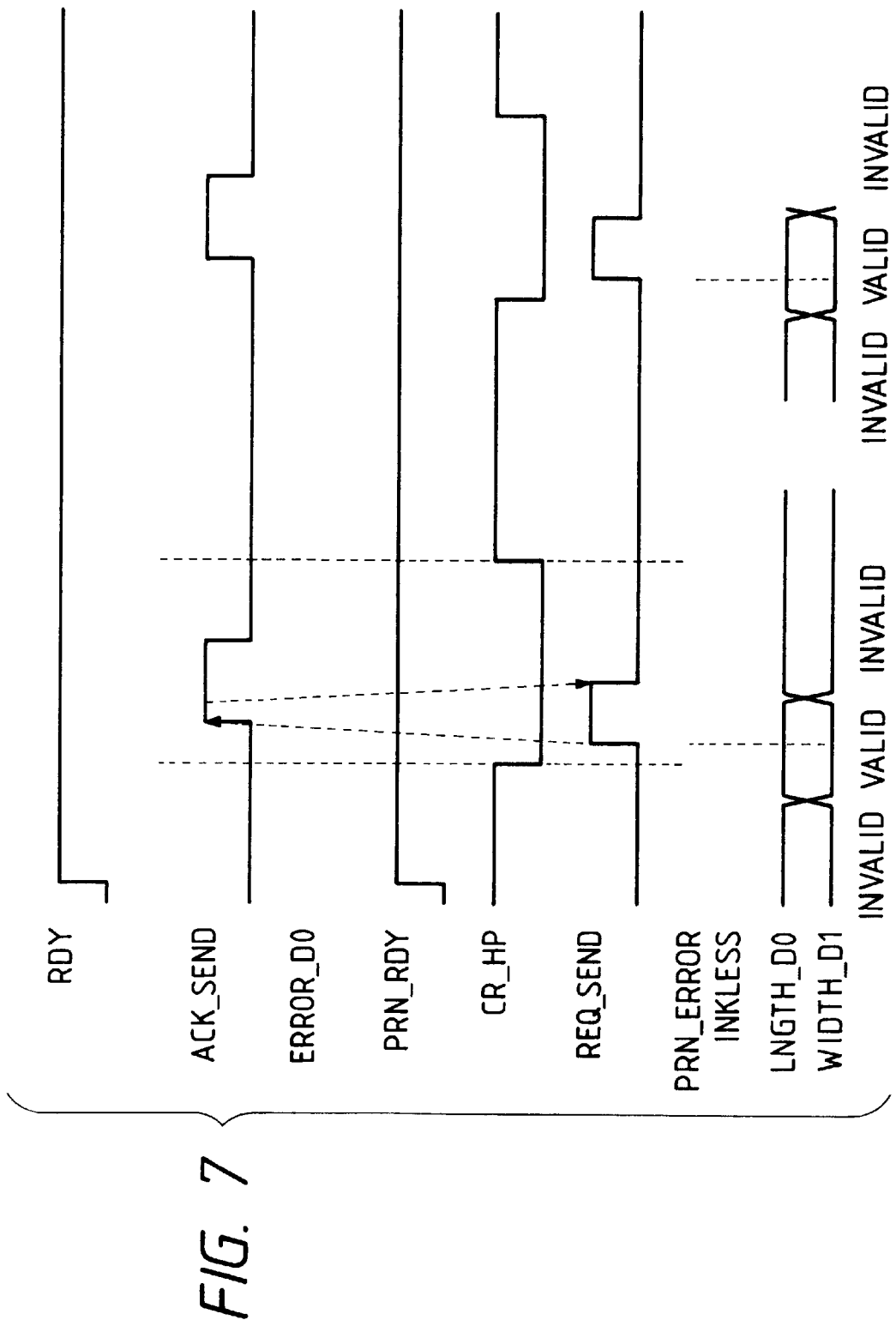
FIG. 7 is a timing chart of signals for explaining communication between the control board shown in FIG. 4 and a cloth feeder.

FIG. 7 is a view showing communication specifications between the cloth feeder 104 and the control board 102 in the printing unit. A communication enable state is set when a ready signal RDY in the cloth feeder 104 and a ready signal PRN-RDY in the printer unit are set at "H" level. When a request signal REQ-SEND representing that a cloth as a recording medium is to be fed from the printer unit is output, the cloth feeder 104 outputs a signal ACK-SEND representing that the cloth is being fed. A signal CR-HP is a signal representing that the recording head is located at a predetermined printable position. If this signal is set at "H", it indicates that the cloth can be fed. This arrangement is employed due to the following reason. If a cloth is fed while a recording head is located on the cloth, the recording head surface may be damaged.

A signal ERROR-DO represents that any error has occurred in the cloth feeder 104. The CPU in the printer unit monitors this signal. A signal PRN-ERROR is an error signal output from the printer unit. The CPU in the cloth feeder 104 motors this signal every predetermined interval. A signal INKLESS is a signal representing that the ink in the printer unit is almost used up. Since FIG. 7 shows a state in which no errors has occurred, the waveforms of the signals PRN-ERROR and INKLESS are not illustrated. A signal LENGTH-DO is a signal representing a cloth feed quantity adjustment value. A 3-bit signal as the signal LENGTH-DO is exemplified in Table 1 below.

TABLE 1

| Bit 2 | Bit 1 | Bit 0 | Adjustment Value |
|---|---|---|---|
| 0 | 0 | 0 | 0 μm |
| 0 | 0 | 1 | +10 μm |
| 0 | 1 | 0 | +20 μm |
| 0 | 1 | 1 | +30 μm |
| 1 | 0 | 0 | −10 μm |
| 1 | 0 | 1 | −20 μm |
| 1 | 1 | 0 | −30 μm |
| 1 | 1 | 1 | −40 μm |

These bits are switched in accordance with the types of cloths to finely adjust the cloth feed quantity. In this arrangement, if the number of bits is increased, the number of adjustment values is increased, accordingly, thereby performing adjustment in many levels. A signal WIDTH-D1 is a signal representing a cloth feed quantity. A 2-bit signal is used as the signal WIDTH-D1 in Table 2 as follows.

TABLE 2

| Bit 1 | Bit 2 | Feed Quantity |
|---|---|---|
| 0 | 0 | 16.256 mm |
| 0 | 1 | 8.128 mm |
| 1 | 0 | 4.064 mm |
| 1 | 1 | 32.512 mm |

In this embodiment the signal WIDTH-D1 is used to be compatible with a large change such as a change in printing scheme and a change in printing head.

Various operations in the cloth printing apparatus described above will be described below.

The signals having the contents in Table 1 are transmitted to the cloth feeder 104 to adjust the feed quantities in accordance with the types of cloths (e.g., cotton, silk, wool, Nylon, polyester, and acrylic cloths) used for printing. That is, the CPU in the cloth printing apparatus sets all bits of the signal LNGTH-DO in accordance with the contents of Table 1 in response to an operator input from the operation unit 103 (FIG. 4) or an instruction from the host computer 101, thereby finely adjusting the feed quantity corresponding to the type of cloth. The feed quantity finely adjusted in accordance with the type of cloth can be automatically set to be an optimal fine adjustment value by the CPU upon the input of the type of cloth without inputting the fine adjustment value of the feed quantity from the operation unit by an operator each time when the fine adjustment values are stored in a nonvolatile memory or the like in correspondence with the types of cloths. Setup of the color data conversion tables 509, the HS conversion tables 511, and the γ-conversion tables 513 according to the types of cloths can also be performed by inputs through the operation unit 103 or the computer 101.

Block formation and a mechanism for displaying the number of errors occurring in each block in a RAM check routine upon a power-ON operation of the circuits described with reference to FIGS. 5A, 5B and 6 will be described below.

In the RAM check routine, the CPU writes predetermined data in all the RAMs shown in FIGS. 5A, 5B and 6 to check that the RAMs are normally operated. In an apparatus having a large memory in each part as in an ink jet cloth printing apparatus, it takes about several tens of minutes to perform only the RAM check, and it is difficult for the operator to recognize the current state of the apparatus. In the first step of this routine, the first half portion of the image memory 505 is write/read-accessed and checked while displaying that the check is being performed in the first step. In the second step, the second half portion of the image memory 505 is write/read-accessed and checked while displaying that the check is being performed in the second step. In the third step, each palette conversion SRHAM 509 is read/write-accessed and checked while displaying that the check is being performed in the third step. In the fourth step, each HS conversion SRAM 511 is read/write-accessed and checked while displaying that the check is being performed in the fourth step. The check operations are similarly performed in the subsequent steps, and error information in each step is displayed, so that the operator immediately judges a repair portion.

For example, in the third step, when an error occurs in memory data at random, the operator may notice that the RAM device itself must be replaced with a new one. For example, in the third step, when errors occur in all the steps, the operator may notice that the mounted states of the RAM devices must be checked. In addition, for example, in the third step, when errors occur every predetermined interval, the operator may notice that dust attachment and disconnections of the address lines of the RAM device must be checked.

Although the operation unit 103 is not illustrated in detail in FIG. 4, it has key switches serving as data input means as well as a liquid display unit or LED serving as a display means. It may take several hours or a day or more for a cloth printing apparatus to produce long dry goods. For this reason, to display the current image pattern, the length of the printed product, the remaining printing length, and the set cloth feed quantity any time is to improve operability of the apparatus.

Figure 9:
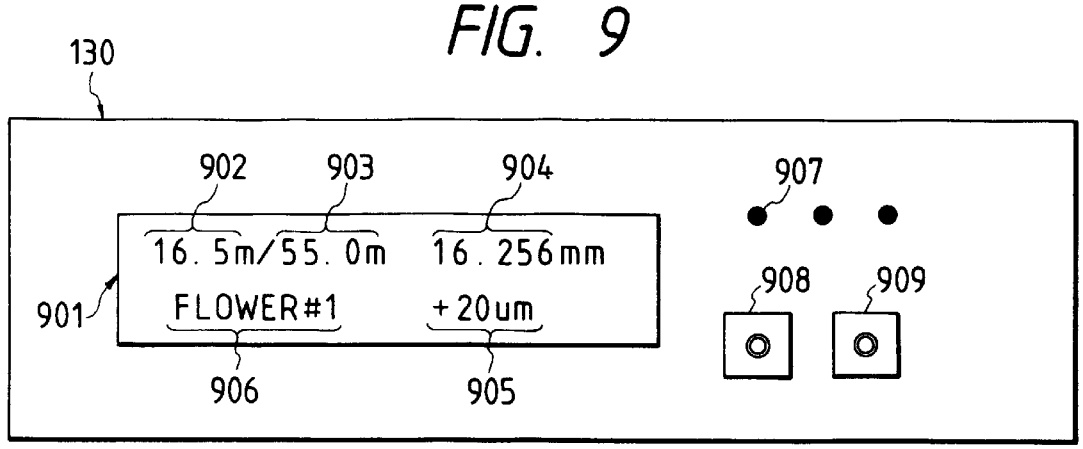
FIG. 9 is a plan view mainly illustrating a display unit in the operation unit shown in FIG. 4.

FIG. 9 is a plan view illustrating the display contents.

Referring to FIG. 9, a printed cloth length 902, a remaining printing length 903, a cloth feed quantity 904, a registered image data name 906, and a fine adjustment value 905 for cloth feed quantity are displayed on a liquid crystal display device 901. Lamps for indicating errors are also arranged in the operation unit 103.

A stop button 908 and an emergency stop button 909 are arranged on the operation unit 103. When the stop button 908 is depressed, the CPU immediately stops scanning of the recording heads if scanning is being performed. The CPU maintains the stop state while maintaining operating states of a memory address counter and the like in each block shown in FIGS. 5A, 5B and 6. The CPU then waits for the next starting signal. When a restarting signal is input, the printing image pattern is printed in a continuous manner. This mode is effective for a pause for maintenance.

When the emergency button 909 is depressed, the CPU assumes an accident as of each motor represented as FM and stops driving all the actuators. In this case, even if a restarting signal is input, the printing image pattern is not printed in a continuous manner. Since the image memory 505 is not erased, the printing operation can be started without transferring data again, and the printing image pattern can be printed from the beginning again.

The recording medium used in this ink jet recording apparatus of the present invention is not limited to a cloth, but may be extended to paper or the like. The types of cloths are not limited to the ones described above, and either a natural cloth or a synthetic cloth can be used. In addition, a woven or unwoven fabric can be used.

As is apparent from the above description, according to this embodiment, the image processing parameters, the feed quantity of a recording medium, and the like can be changed in accordance with types of elongated recording media such as a cloth. The circuits in the apparatus are divided into a plurality of blocks in the memory check such as a RAM memory check in the initial check routine as in a power-ON routine. A specific checked block and the number of errors in this block can be displayed. In addition, the recording length in the feed direction of the recording medium set in the recording apparatus, the length of the recorded product in the feed direction, and the printing image file name set in the recording apparatus are displayed on the operation unit. Continuous recording on the recording medium can be performed by the first stop designation input means which guarantees continuity of recording even if an abnormal stop occurs.

As a result, there is provided an ink jet recording apparatus having high operability and high productivity.

Figure 10:
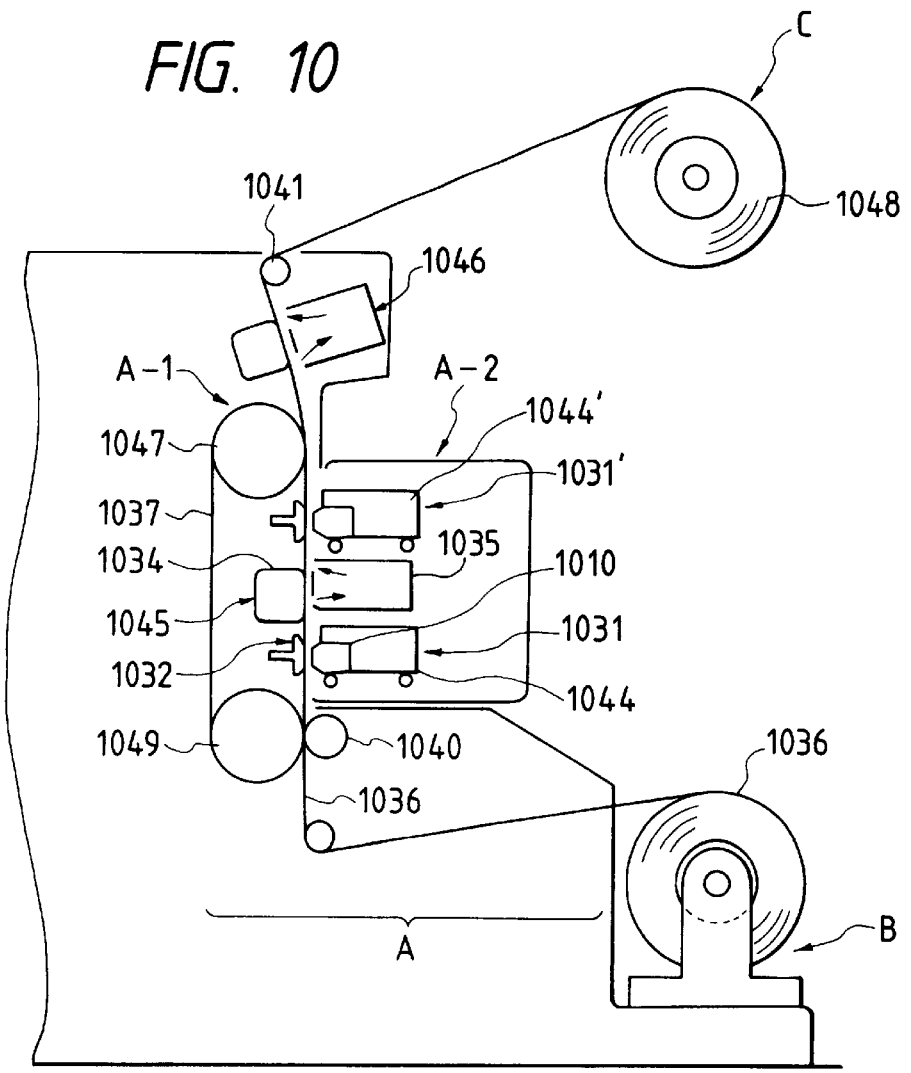
FIG. 10 is a sectional view showing the overall structure of a cloth printing apparatus according to the second embodiment of the present invention.
Figure 11:
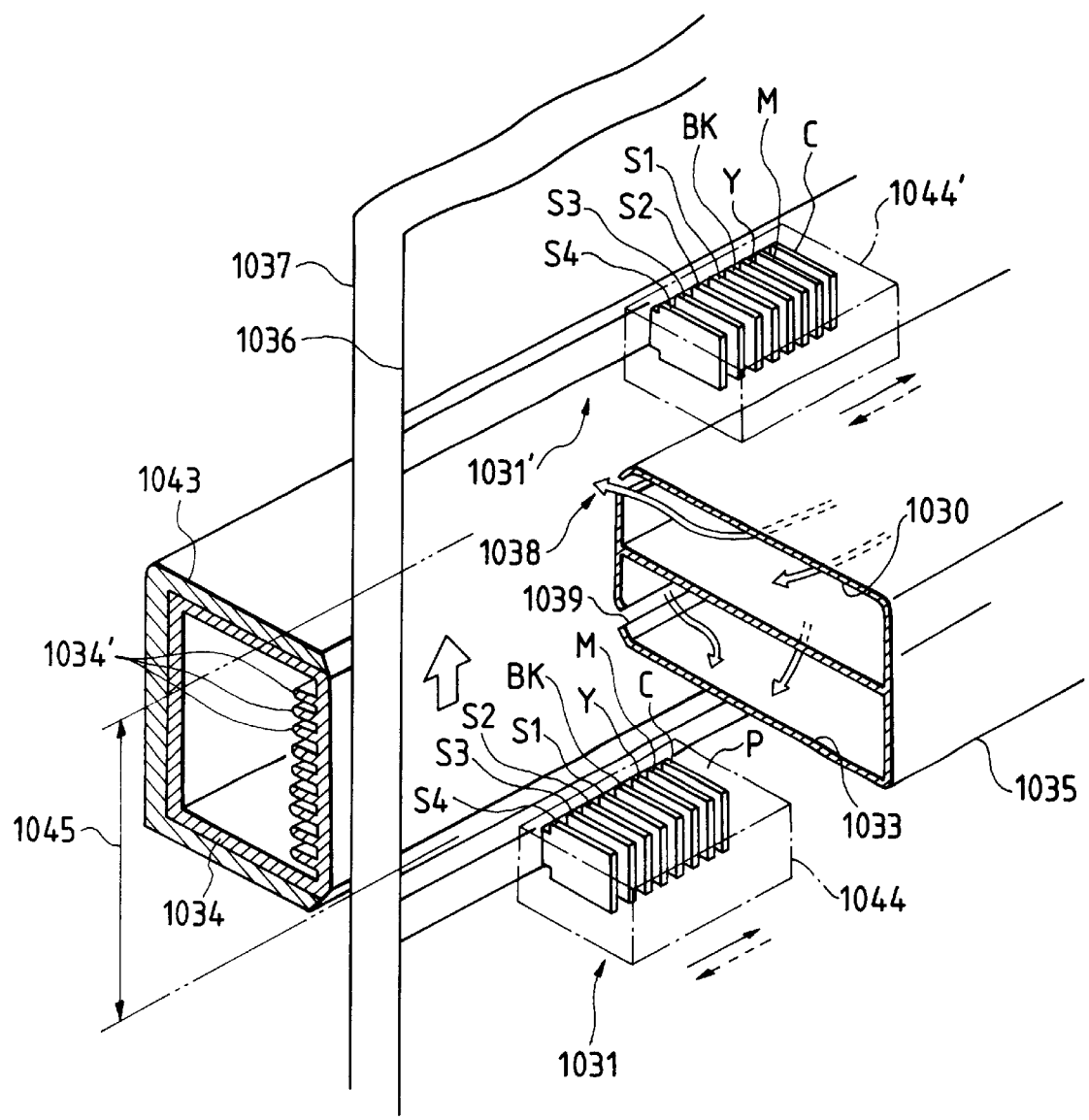
FIG. 11 is an enlarged view showing part around recording heads shown in FIG. 10.

FIG. 10 shows an arrangement of an ink jet printer as a cloth printing apparatus of the present invention, and FIG. 11 is an enlarged perspective view showing the main part of the ink jet printer. The cloth printing apparatus (printer) mainly comprises a cloth feed unit B for feeding a roll of pre-treated cloth, a main unit A for precisely feeding the cloth line by line to print an image with ink jet heads, and a winding-up unit C for drying the printed cloth and winding the dried cloth. The main unit A comprises a printer unit A-2 and a high-precision cloth feed unit A-1 including a platen.

The roll of the pretreated cloth 1036 is fed toward the cloth feed unit and then the main unit A. An endless thin metal belt 1037 precisely driven stepwise is looped between a driving roller 1047 and a winding roller 1049 in the main unit. The driving roller 1047 is directly driven stepwise by a high-resolution stepping motor (not shown) to feed the metal belt by a stepping amount. The fed cloth 1036 is urged against the surface of the metal belt 1037 backed up by the winding roller 1049 and supported thereto.

The cloth 1036 fed stepwise by the belt is positioned by a platen 1032 on the rear surface of the belt at a first printer unit 1031, and an image is printed on the front surface of the cloth with an ink jet head 1010. Every time one line is printed, the cloth is fed stepwise by a predetermined quantity. The printed image is heated by a heating plate 1034 from the rear surface of the belt and dried by a warm air duct 1035 with warm air from the front surface supplied and discharged. Subsequently, overlap printing is performed in a second printer unit 1031' in the same method as in the first printer unit.

The printed cloth is separated from the metal belt and is dried again by a post drying unit 1046 consisting of a heating plate and a warm air duct. The dried cloth is guided to a guide roll 1041 and is wound up by a winding-up roll 1048. The wound cloth is removed from the apparatus and is subjected to post treatments such as color development, cleaning, and drying, thereby obtaining a finished product.

Referring to FIG. 11, the cloth 1036 serving as the recording medium is supported by the metal belt 1037 and is fed stepwise upward in FIG. 11. A first carriage 1044 having Y, M, C, and BK ink jet heads and S1 to S4 (special color) ink jet heads in the lower first printer unit 1031. The ink jet head (recording head) of this embodiment has a heating element for generating a heat energy for causing film boiling in the ink as the energy utilized for discharging the ink. Each ink jet head has 128 discharge ports at a density of 400 dpi (dots per inch).

A drying unit 1045 constituted by the heating plate 1034 for heating the cloth from the rear surface of the belt and the warm air duct 1035 for drying the cloth from the front surface is arranged in the downstream of the first printer unit. The heat conduction surface of the heating plate 1034 is urged against the endless thin metal belt 1037 having a high tension to strongly heat the rear surface of the feeding or metal belt 1037 with a high-temperature, high-pressure water vapor through a hollow interior. The feeding belt 1037 is made of a thin stainless steel plate (thickness: 100 to 150 $\mu$m) to directly effectively heat the supported cloth 1036 by heat conduction. Heat accumulation fins 1034' are formed on the inner surface of the heating plate to effectively perform heat accumulation on the rear surface of the belt. The inner surface portion which does not brought into contact with the belt is covered with a heat-insulating material 1043 to prevent a heat loss caused by heat dissipation.

Dry warm air is sprayed from a warm air duct 1030 in the downstream to the drying cloth from the front surface. Air having a lower humidity is sprayed against the cloth, thereby improving the drying effect. Air having a sufficiently high water content flows in a direction opposite to the cloth feed direction and is subjected a larger amount of suction than the spray amount through a suction duct 1033, thereby preventing moisture leakage and hence the surrounding mechanism from dewing. The warm air source is located in the rear side in FIG. 11, and suction is performed from the front side. A pressure difference between a spray port 1038 and a suction port 1039 is set uniform in the entire area along the longitudinal direction. The air spray/suction units are offset in the downstream with respect to the center of the heating plate, so that air is sprayed on a sufficiently heated portion. The large amount of water in the ink containing a diluting agent, which is received by the cloth, can be strongly dried by the first printer unit 1031.

The second printer unit 1031' is located in the downstream (upward) of the first printer unit. The second printer unit is constituted by a second carriage 1044' having the same arrangement as that of the first carriage.

Figure 12:
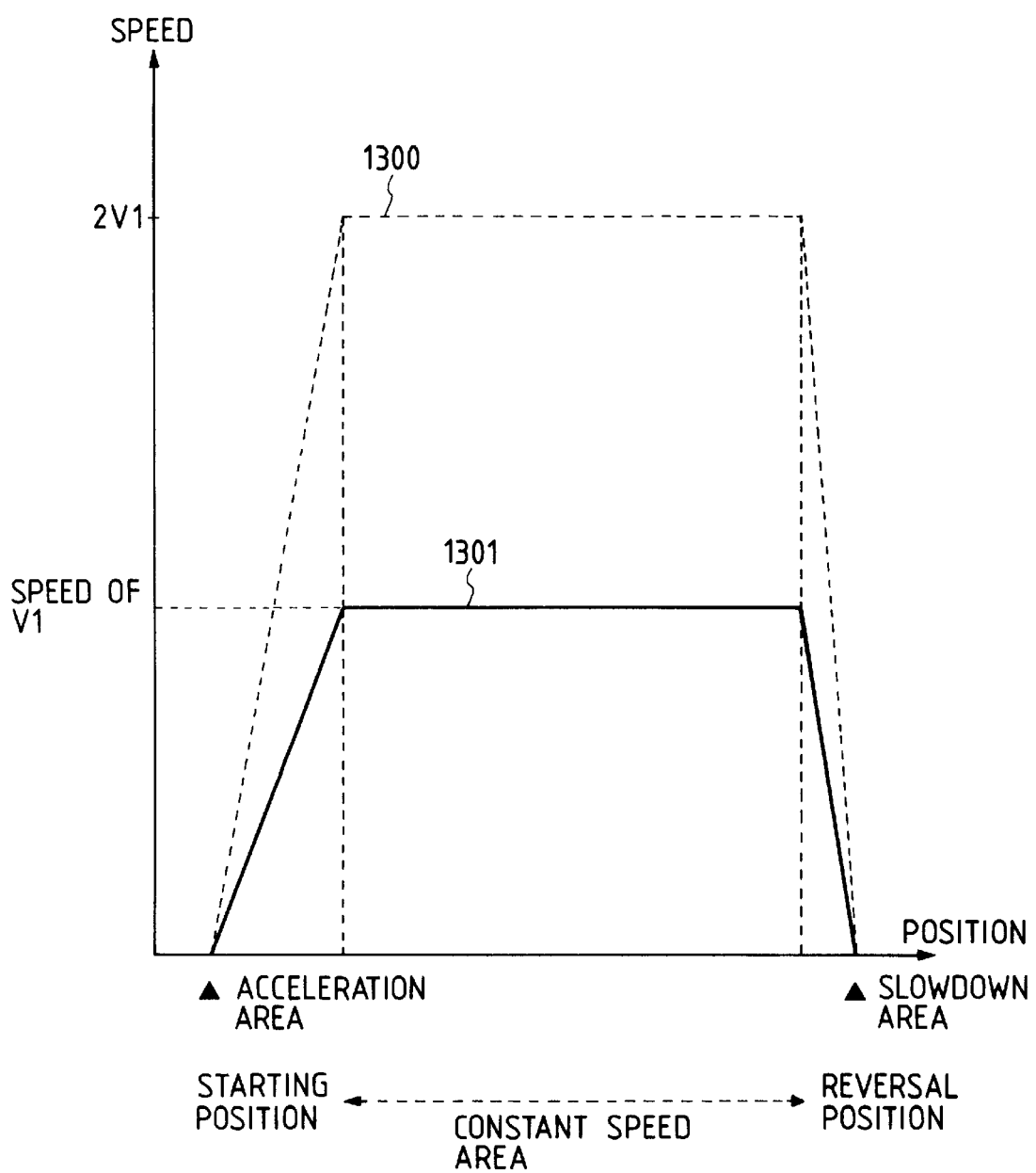
FIG. 12 is a view for explaining carriage driving in the cloth printing apparatus of the second embodiment.

FIG. 12 is a graph for explaining speeds at which the carriages 1044 and 1044' of the first and second printer units 1031 and 1031' in FIG. 11 scan the surface of the cloth 1036 to perform printing.

The scanning speeds of the carriages 1044 and 1044' are increased from the starting position, maintained in the recording area at constant speeds, and decreased in the slowdown area at the end of recording area. When the speeds reach the reversal position, the speeds become zero. The carriages then start to return to the starting positions. The reversal movement which does not perform printing has a higher speed than that of normal printing, thereby shortening the recording time and increasing the recording productivity.

Referring to FIG. 12, a curve 1300 represents carriage movement in the thinned printing mode. A curve 1301 represents movement in a mode for increasing the density. If a constant carriage speed for increasing the density is defined as a constant speed V1, the constant carriage speed in the thinned printing mode is given as 2V1. This will be described in detail later.

Figure 13:
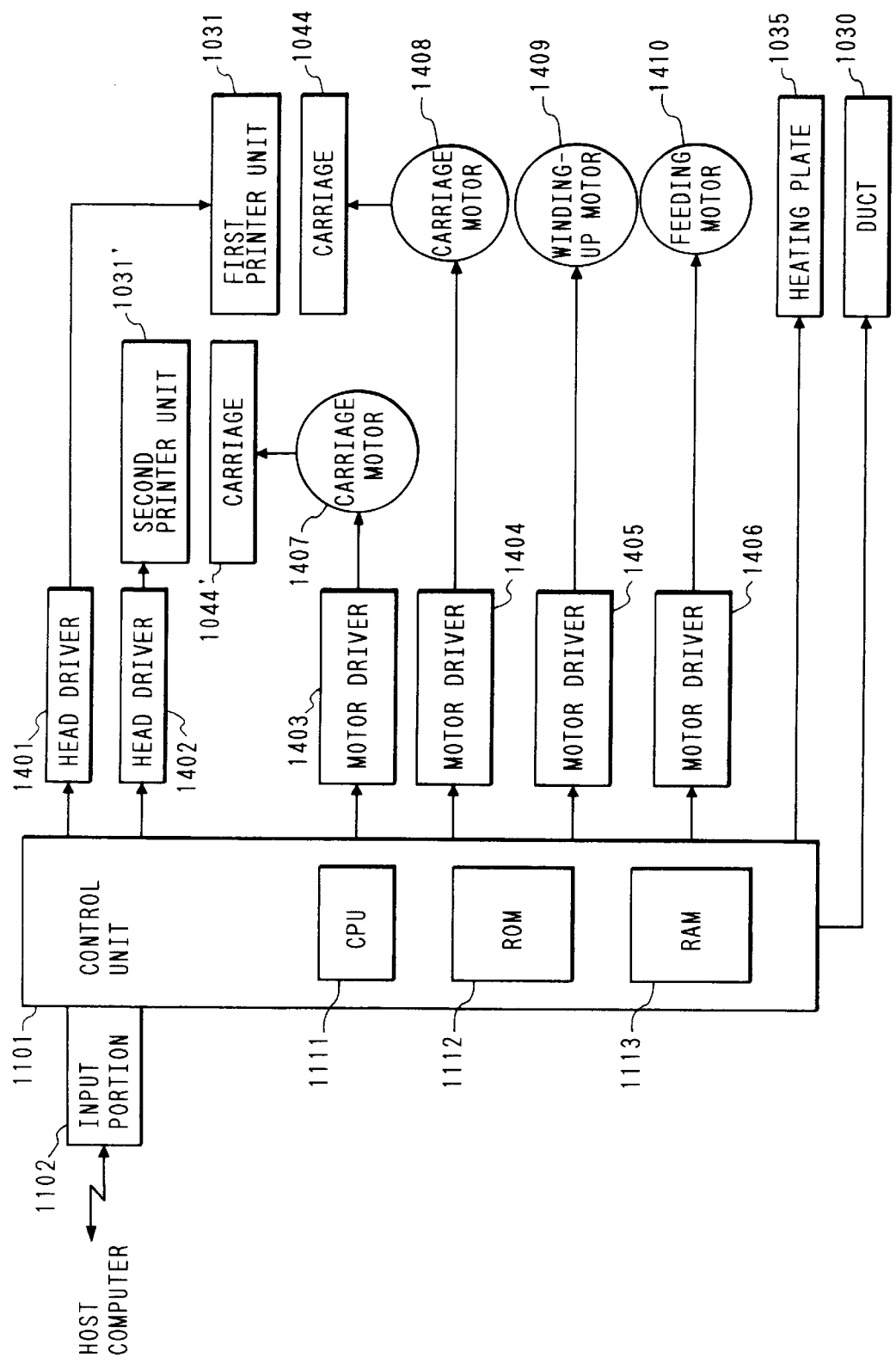
FIG. 13 is a block diagram showing a schematic arrangement of the cloth printing apparatus of the second embodiment.

FIG. 13 is a block diagram showing a schematic arrangement of a cloth printing apparatus of this embodiment. The same reference numerals as described above denote the same parts in FIG. 13, and a detailed description thereof will be omitted.

Referring to FIG. 13, a control unit 1101 controls the overall operation of the apparatus and includes a CPU 1111 such as a microprocessor, a ROM 1112 for storing a control program 113 and various data, and a RAM 1113, used as a work area, for temporarily storing various data. An input portion 1102 inputs recording data from an external device such as a host computer and controls communication with this external device. Head drivers 1401 and 1402 drive the ink jet heads of the first and second printer units 1031 and 1031'. Motor drivers 1403 to 1406 drive the corresponding motors. A carriage motor 1407 drives and feeds the carriage 1044'. A carriage motor 1408 drives and feeds the carriage 1044. A winding-up motor 1409 drives the winding-up roll 1048 to wind the recorded cloth 1036. A feeding motor 1410 feeds the metal belt 1037 and rotates various feeding rollers.

Figure 14:
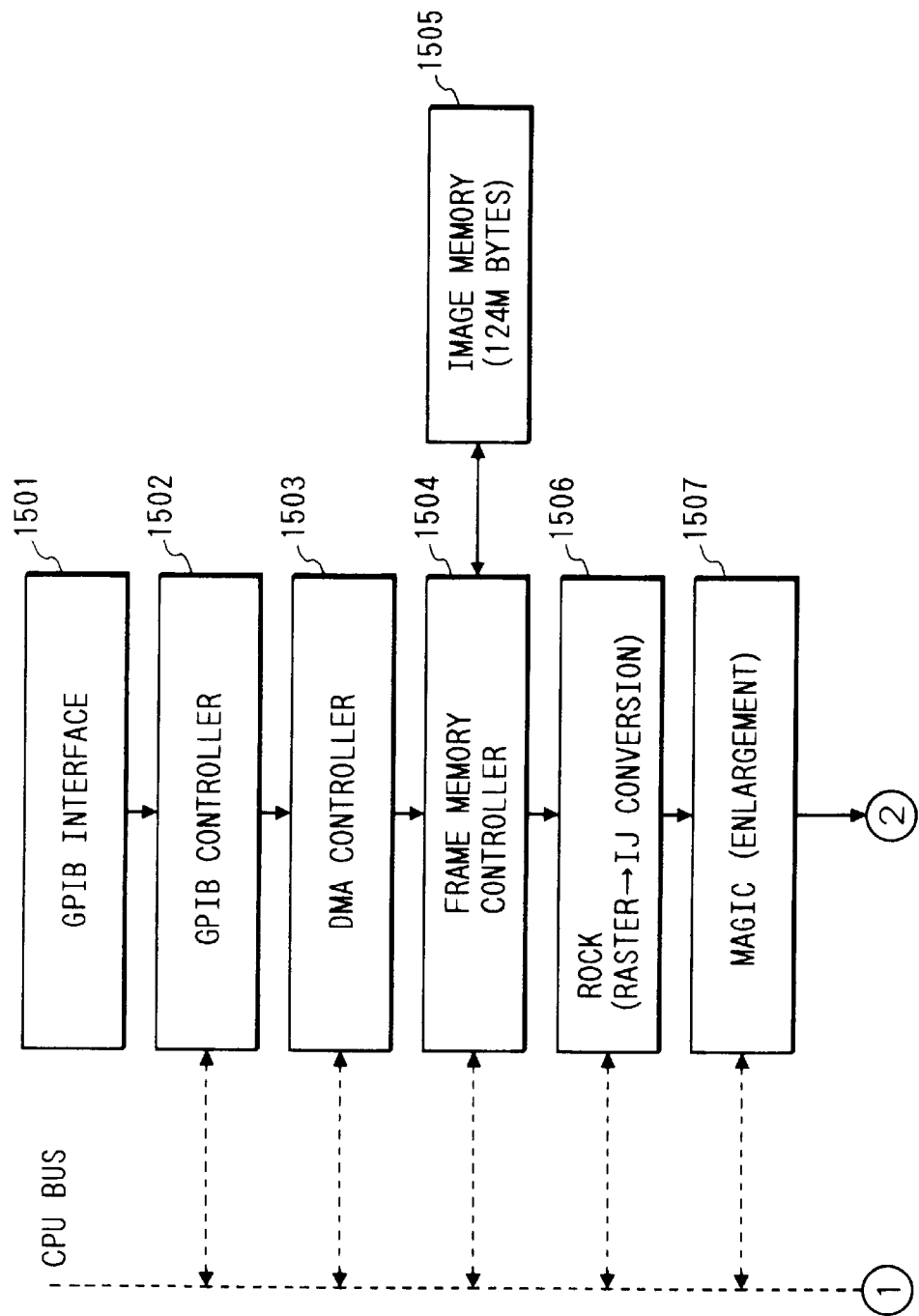
FIG. 14 is a block diagram showing an image signal flow in the cloth printing apparatus of the second embodiment.
Figure 15:
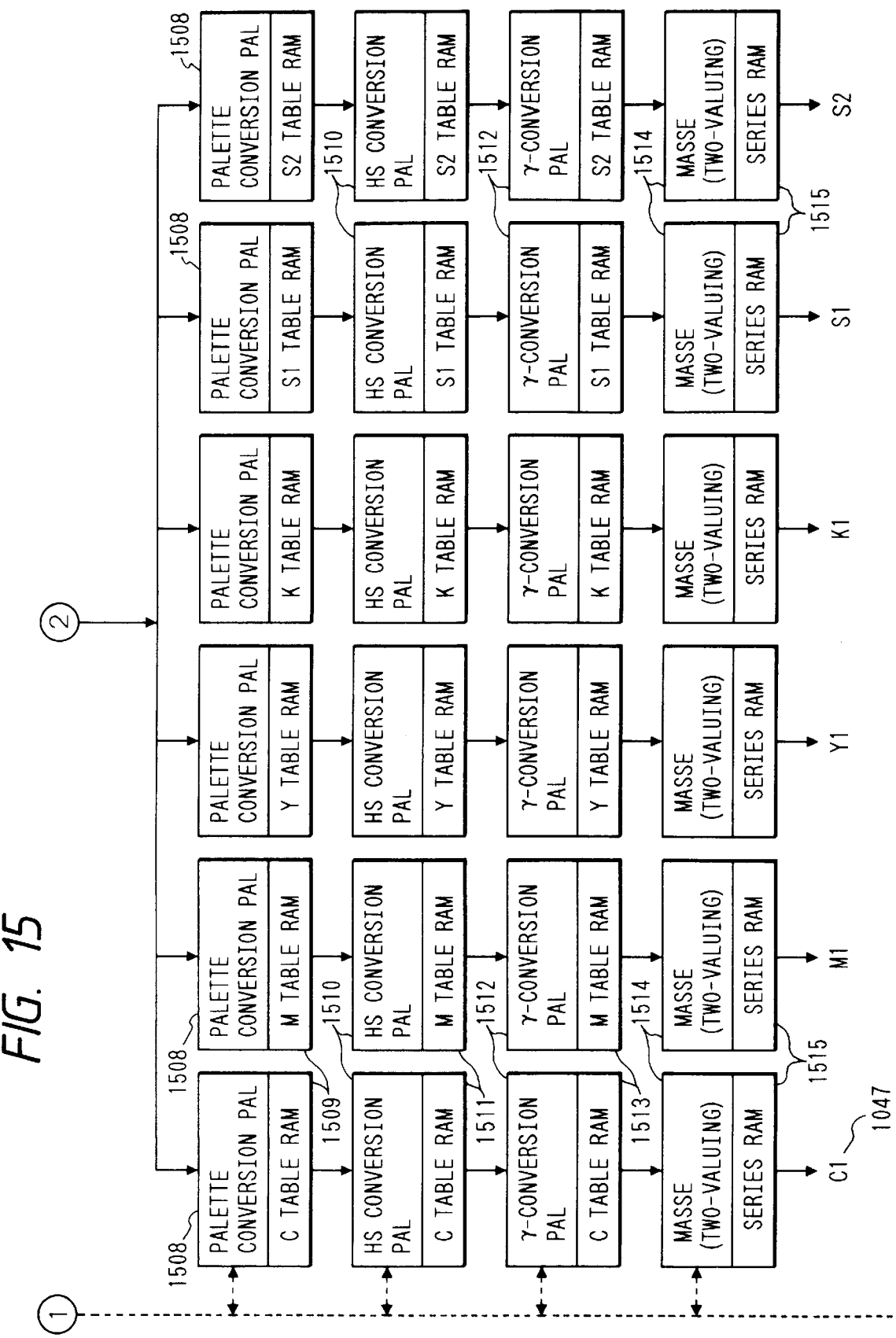
FIG. 15 is a block diagram showing an image signal flow in the cloth printing apparatus of the second embodiment.
Figure 16:
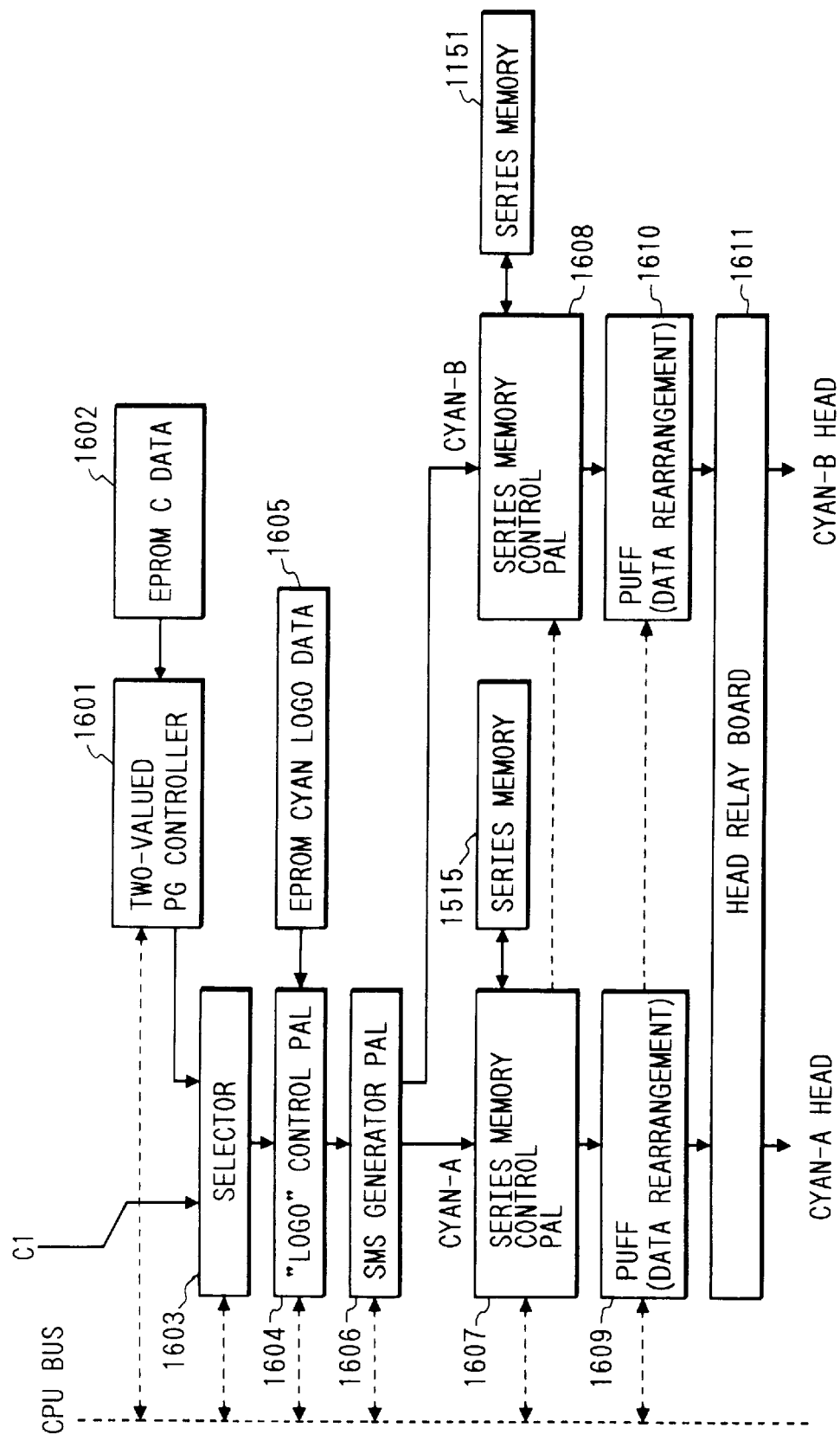
FIG. 16 is a block diagram showing an image signal flow in the cloth printing apparatus of the second embodiment.

FIGS. 14 to 16 are block diagrams showing an image data flow in an image processing system in the cloth printing apparatus of this embodiment.

Image data, palette table data, and the like transmitted from a host computer (not shown) are received by a GPIB interface 1501 and a GPIB controller 1502 in the input portion 1102 and are stored in an image memory 1505 in the RAM 1113 through a DMA controller 1503 and an FM (frame memory) controller 1504. This image memory 1505 has a 124-Mbyte memory space, so that image data having an A1 size can be stored in the form of 8-bit palette data. When a predetermined amount of image data is stored in the image memory 1505, image data read access from the image memory 1505 is started upon reception of a printing starting signal from the CPU 1111, thereby starting printing process.

The image data transmitted from the host computer is raster image data. For this reason, the raster image data must be converted in accordance with the alignment of nozzles of the ink jet heads of the first and second printer units 1031 and 1031'. This conversion is performed by a conversion unit (ROCK) 1506. The converted image data is enlarged by an enlargement unit (magic) 1507. A signal output from the enlargement unit (magic) 1507 is an 8-bit palette signal in this embodiment.

Referring to FIG. 15, each palette conversion device (PAL) 1508 converts data into color data with reference to a conversion table (SRAM) of a corresponding device. In this embodiment, the image data are classified into a total of six colors, i.e., cyan (C), magenta (M), yellow (Y), black (K), and special colors S1 and S2 (in the embodiment shown in FIG. 11, eight color ink jet heads of colors including four special colors (S1 to S4) are used, but the image processing system in FIG. 15 uses the above six colors).

The image data conversion contents using these palette tables are shown in FIG. 17. 256 inputs from 0 to 255 are entered for 8-bit palette data. As can be understood from FIG. 17, the conversion is performed as follows.

If 0 is input, light gray is obtained.

If 1 is input, solid printing of a special color 1 is performed.

If 2 is input, solid printing of a special color 2 is performed.

If 3 is input, a bluish color as a mixture of cyan and magenta is obtained.

If 4 is input, solid black printing is performed.

If 5 is input, a reddish color as a mixture of magenta and yellow is obtained.

If 6 is input, a more reddish color than that in the input of 5 is obtained.

If 254 is input, solid yellow printing is performed.

If 255 is input, no printing is performed.

As a more specific circuit arrangement, an input (palette data) is supplied to the address of each RAM, and this address data is used as a conversion value, thus constituting a so-called look-up table. If this conversion table is fixed, the table can be constituted by a ROM. The palette conversion device (PAL) 1508 has a function of managing the RAM and interfacing with the CPU.

HS conversion 1510 performs table conversion and corrects variations of printing densities which correspond to the discharge ports of the ink jet heads. For example, data for a discharge port having a small ink discharge amount and a low recording dot density is converted to data representing a higher density, data for a discharge port having a large ink discharge amount and a high recording dot density is converted into data representing a lower density, and data for a discharge port having an intermediate ink discharge amount and a middle recording dot density is directly used. An HS table conversion SRAM 1511 is identical to a table RAM 1509.

γ-conversion 1512 is constituted by conversion table RAMS 1513 and performs gradation correction table conversion in which the density of the entire image for each color is increased or decreased as in the palette conversion and HS conversion. If no density conversion is performed, a linear table is obtained. That is, an output of "0" is obtained for an input of "0";

an output of "110", for an input of "100";

an output of "210", for an input of "210"; and an output of "255", for an input of "255".

MASSE (two-valuing circuit) has a pseudo gradation function. An input to each two-valuing circuit is 8-bit gradation data, and an output therefrom is 1-bit two-valued pseudo gradation data. This pseudo gradation data is expressed by the number of dots formed in unit area. The densities of an image to be injected are sequentially stored in series memories 1515 (SRAMs), although a detailed description thereof will be omitted. In this manner, two-valued data C1, M1, Y1, K1, S1, and S2 corresponding to all the colors are generated. The two-valued signals of all the colors are supplied to identical circuit arrangements. Only C1 will be exemplified below.

Referring to FIG. 16, two-valued data C1 is input to an SMS generator 1606. A selector 1603 is arranged to switch this data because data from a pattern generator (PG) 1601 for printer test recording and an EPROM 1602 may be used. PG (pattern generation) data is stored in the EPROM 1602, and its output can be read out under the control of the two-valued PG controller 1601.

Logo marks such as maker brands are often printed at the end portions of the dry goods. For this reason, data associated with this are stored in an EPROM 1605, and a logo control 1604 manages the position and length of a logo mark.

An SMS (sequential multi-scanning) generator 1606 generates data for causing a plurality of ink jet heads to perform overlap printing. For this purpose, the following operations are performed.

A. The density variations of the ink jet heads are corrected.

B. The recording density is increased.

In this embodiment, overlap printing for correcting the density variations will be described below.

Figure 18:
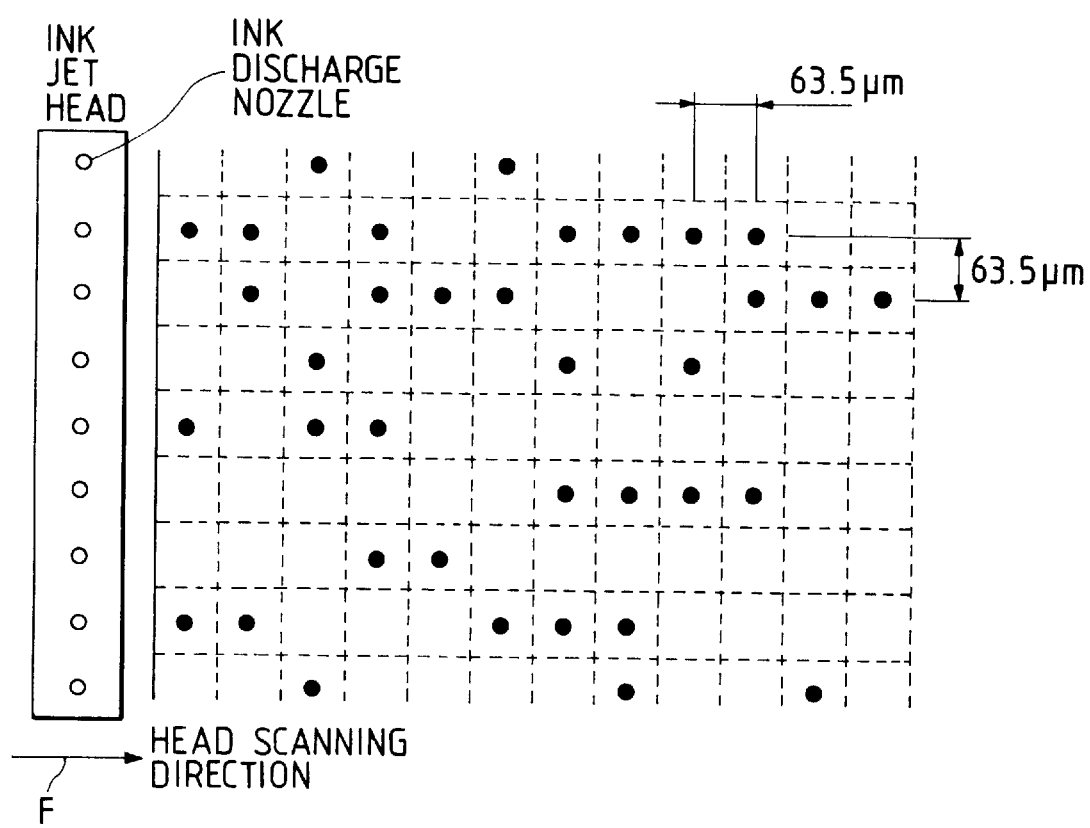
FIG. 18 is a view showing a recorded content in the cloth printing apparatus of the second embodiment.

FIG. 18 is a view for explaining recording data recorded by sequential multi-scanning.

Referring to FIG. 18, each rectangular region surrounded by a dotted line corresponds to one dot (pixel). For example, at a recording density of 400 dpi (dots per inch), the area of each rectangular region is about 63.5 $\mu m^2$. A portion represented by a black circle is a position where a dot is printed, and a portion having no black circle is a position where no printing is performed. Each ink jet head is moved in a direction indicated by an arrow F, and an ink is discharged from an ink discharge nozzle at a predetermined timing. This sequential multi-scanning is preformed to correct variations in sizes of ink droplets discharged from the nozzles and variations between nozzles which are caused by variations in ink discharge directions. The same line (head moving direction) is recorded with a plurality of nozzles. In this manner, since one line is formed using the plurality of nozzles, random nozzle characteristics of each ink jet head are utilized to reduce density variations. That is, in sequential multi-scanning mode using two scanning cycles, recording using the upper half of the nozzles of the ink jet head is performed in the first scanning cycle, and recording using the lower half of the nozzles of the ink jet head is performed in the second scanning cycle.

Figure 19:
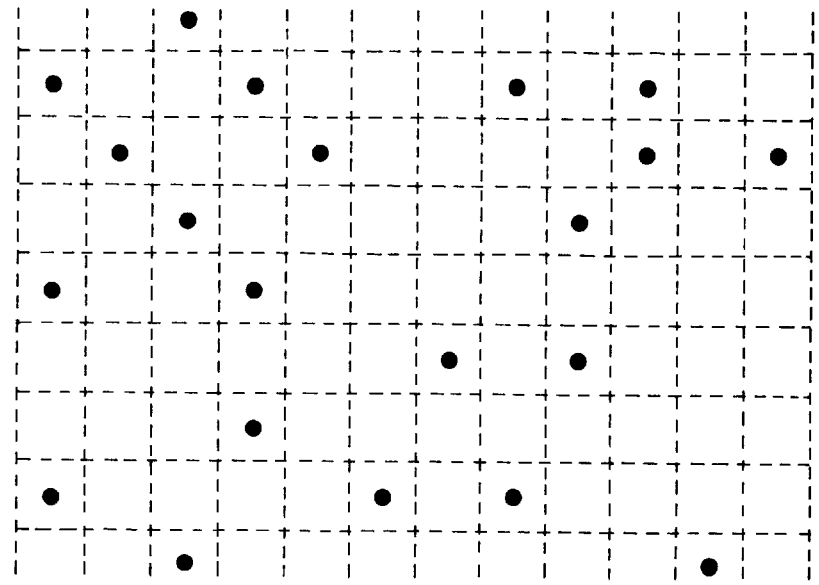
FIG. 19 is a view for explaining thinning processing in the cloth printing apparatus of the second embodiment.
Figure 20:
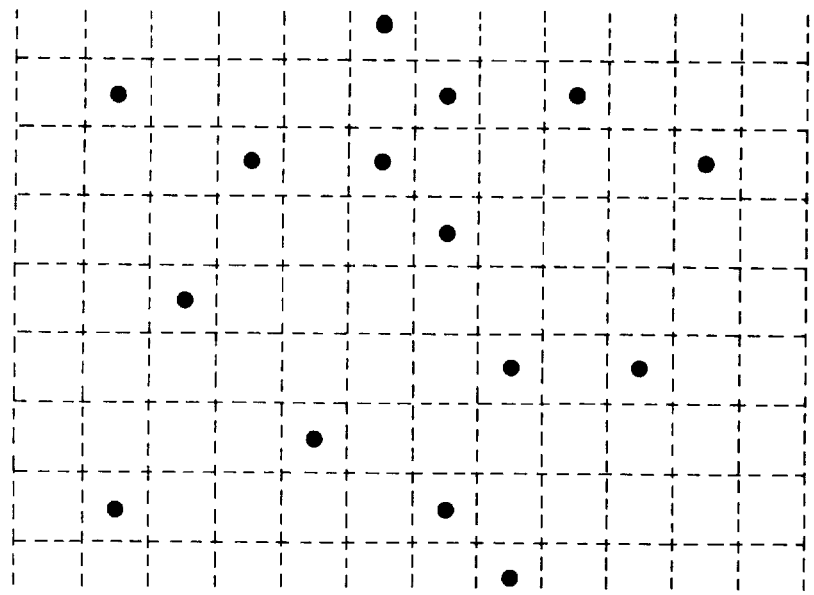
FIG. 20 is a view for explaining the thinning processing in the cloth printing apparatus of the second embodiment.

Recorded states obtained in this sequential multi-scanning are shown in FIGS. 19 and 20.

Assume that data shown in FIG. 18 is to be printed. As shown in FIG. 19, only odd-numbered recording data of the data generated in the moving direction of the ink jet head are recorded with the upper half of the nozzles of the ink jet head. The ink jet head (carriage) is then returned to the home position, and the cloth is fed by a half of the width of the ink jet head. As shown in FIG. 20, only the even-numbered dots in the moving direction of the ink jet head are recorded with the lower half of the nozzles of the ink jet head. Therefore, data shown in FIG. 18 is recorded on the cloth by the two scanning cycles.

This sequential multi-scanning is a technique for preventing degradation of printing quality which is caused by ink discharge variations of nozzles of the ink jet head, as described above. An effect derived from this technique is the same as that derived from HS conversion. The SMS (sequential multi-scanning) generator 1606 distributes the printing data to series controls 1607 and 1608 in accordance with a predetermined sequence. A data storage memory 1515 corrects physical position errors of head spaces and temporarily stores the image data input from the SMS (sequential multi-scanning) generator 1606. The storage contents are read out at a timing corresponding to the physical position of the ink jet head, thereby performing recording.

Rearrangement circuits (PUFF) 1609 and 1610 rearrange the recording data to match the nozzle layout of the ink jet head, and a detailed description thereof will be omitted.

Two-valued cyan data C1 is divided into cyan-A and cyan-B which are respectively transmitted to the first and second printer units through a relay board 1611.

Printing in the cloth printing apparatus of this embodiment will be described with reference to FIGS. 21 to 23. In this case, recording using a cyan head will be exemplified as in the above description. Similar printing operations are performed for the remaining colors.

Figure 21:
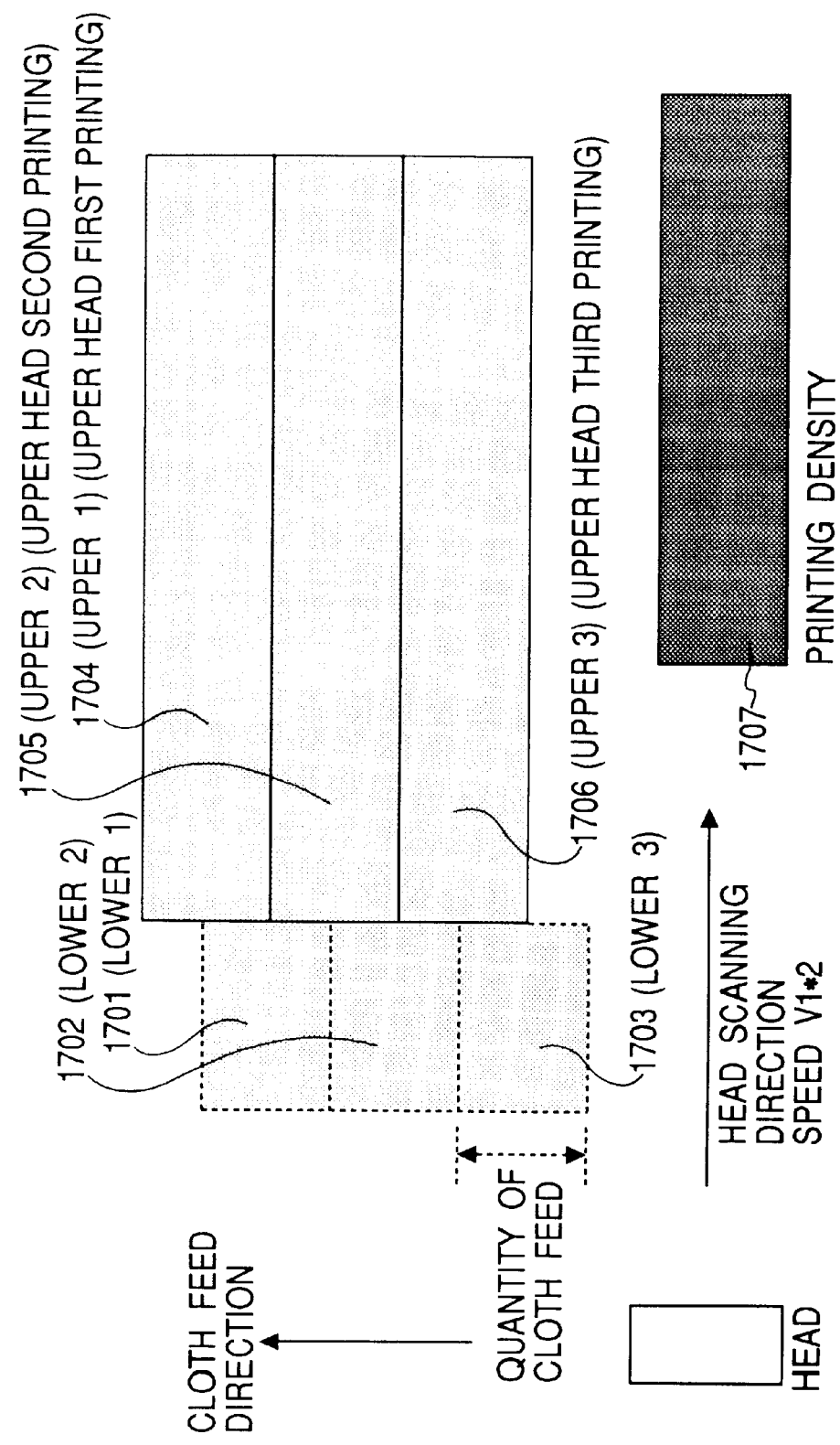
FIG. 21 is a view for explaining a recording operation at a normal density in the cloth printing apparatus of the second embodiment.

FIG. 21 shows a print in a normal multi-scanning operation (two scanning cycles). The area printed with the ink jet head of the first printer unit 1031 is represented by a lower 1 1701, a lower 2 1702, and a lower 3 1703, and the area printed with the ink jet head of the second printer unit 1031' is represented by an upper 1 1704, an upper 2 1705, and an upper 3 1706.

The cloth feed direction is indicated by an arrow. The first step feed quantity of the cloth 1036 corresponds to the recording width of the ink jet head. As is apparent from FIG. 21, all the printed areas are obtained using the upper half of the ink jet head of the second printer unit 1031' and the lower half of the ink jet head of the first printer unit 1031, or the lower half of the ink jet head of the second printer unit 1031' and the upper half of the ink jet head of the first printer unit 1031. The data recorded with each ink jet head is thinned data, as shown in FIGS. 19 and 20. As a result of overlap recording using these two ink jet heads, a printing density 1707 is obtained. The scanning speed of the ink jet head is 2•V1, as shown in FIG. 12.

Figure 22:
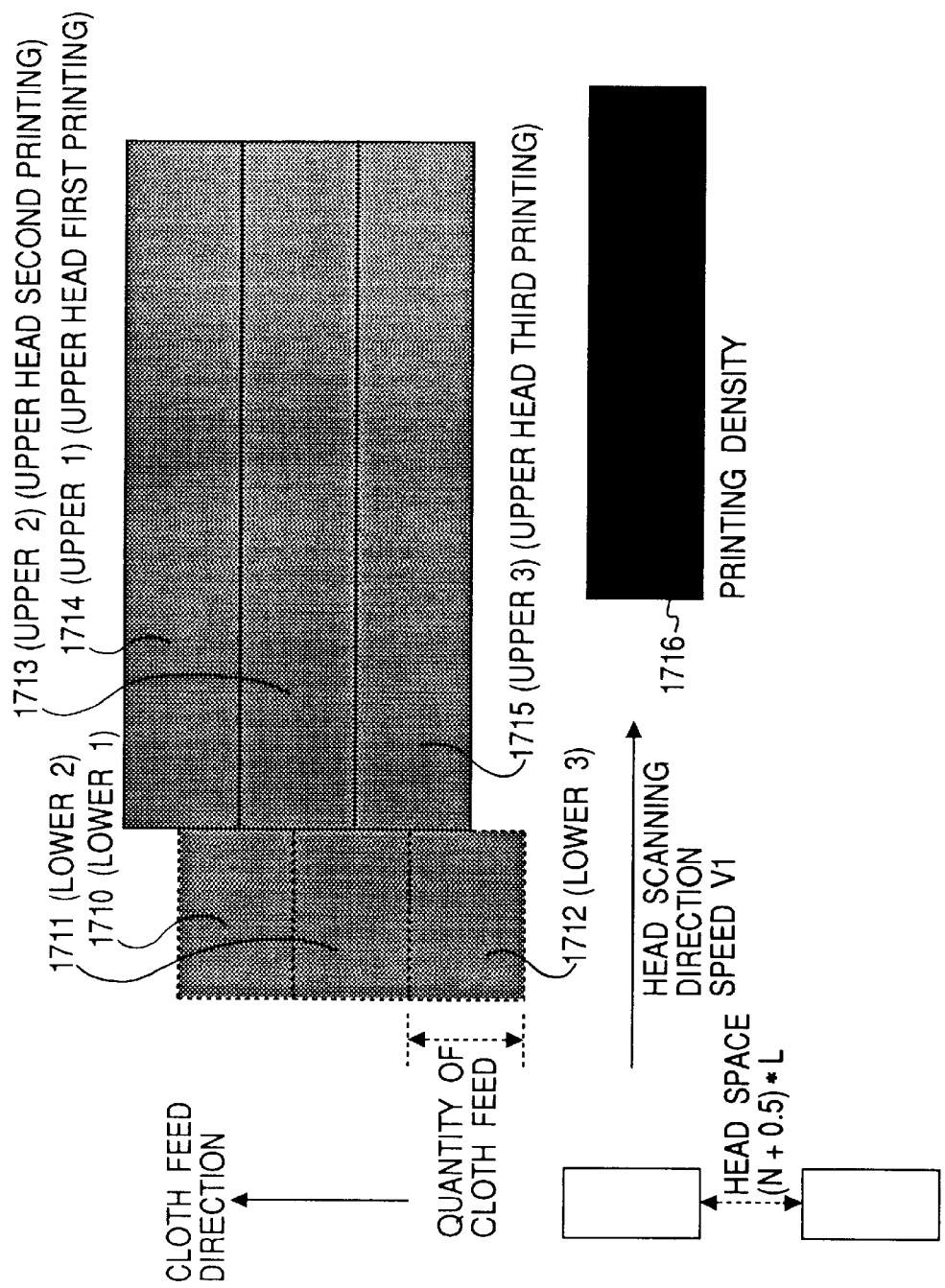
FIG. 22 is a view for explaining a recording operation at a high density in the cloth printing apparatus of the second embodiment.

FIG. 22 shows a case in which a printing density 1716 is twice that in FIG. 21. Areas 1710 to 1712 are printed with the ink jet head of the first printer unit 1031, and areas 1713 to 1715 are printed with the ink jet head of the second printer unit 1031'. The differences between FIGS. 22 and 21 are in that the printing data are not thinned, and the carriage scanning speed is halved in FIG. 22. In FIG. 21, the data are divided by the SMS generator 1606. In FIG. 22, no data distribution is not performed. In FIG. 22, the ink jet head has a recording width L and a multi-scanning count N.

Figure 23:
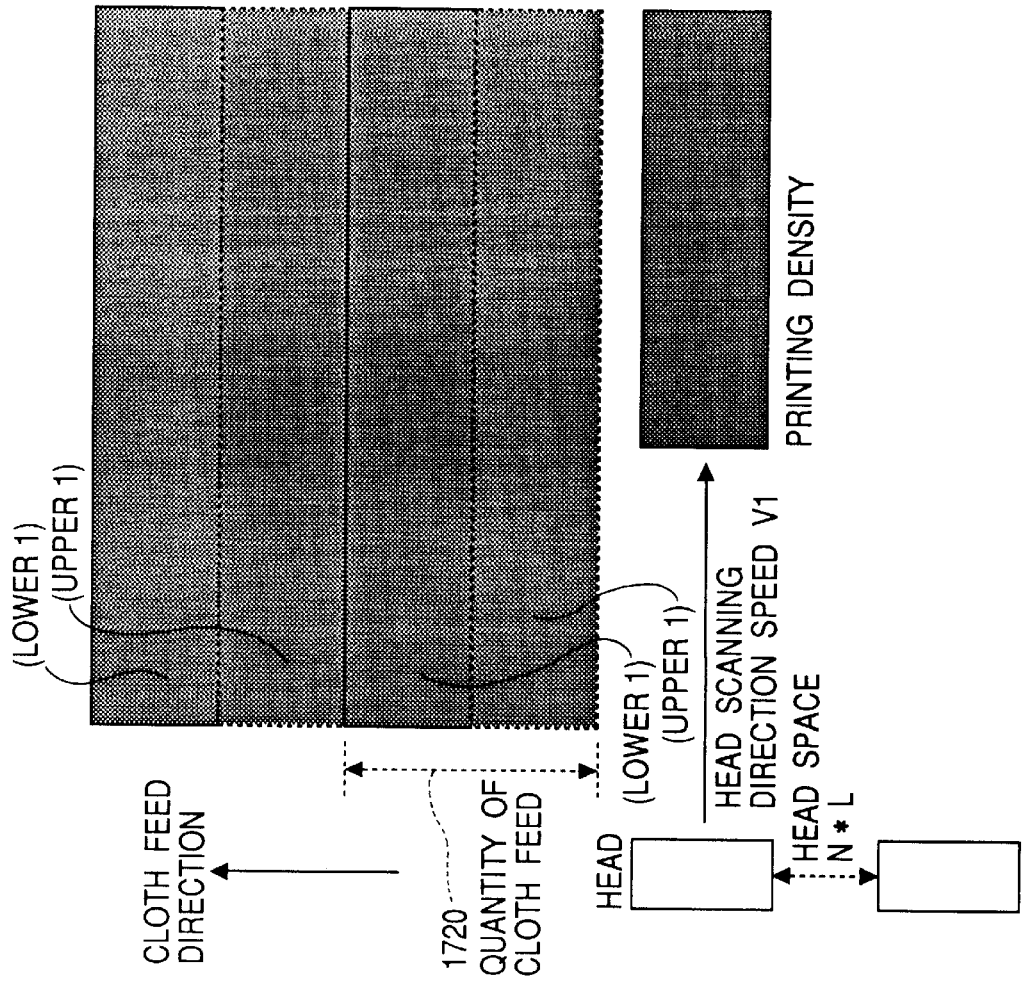
FIG. 23 is a view for explaining a high-speed recording operation in the cloth printing apparatus of the second embodiment.

In FIG. 23, thinning is not performed unlike in FIG. 21, and the feed quantity of the cloth 1036 is twice that in FIG. 21. The space between the ink jet heads of the first and second printer units 1031 and 1031' is set to be an integer multiple (N x L) of the recording width of the head. In this case, the area represented by the lower 1 is recorded with the ink jet head of the first printer unit 1031. When the cloth 1036 is fed by a length (2L) 1720, the area represented by the upper 1 is recorded with the ink jet head of the second printer unit 1031'. Note that recording (indicated by the lower 1) with the first printer unit 1031 is simultaneously performed.

Characteristics in FIGS. 21 to 23 are summarized in the following table.

| Mode | Thinning | Cloth Feed Quantity | Upper and Lower Head Space | Carriage Speed |
| --- | --- | --- | --- | --- |
| FIG. 21 | Yes | L | (N + 0.5)L | 2V1 |
| FIG. 22 | No | L | (N + 0.5)L | V1 |
| FIG. 23 | No | 2 × L | N × L | V1 |

In addition, the effects of the schemes and their characteristics in FIGS. 21 to 23 are summarized in the following table.

| Mode | Variation Correction | Productivity | Density |
| --- | --- | --- | --- |
| FIG. 21 | 1 | 2 | 3 |
| FIG. 22 | 1 | 3 | 1 |
| FIG. 23 | 3 | 1 | 3 |

The evaluation values satisfy condition 1>2>3.

Figure 24:
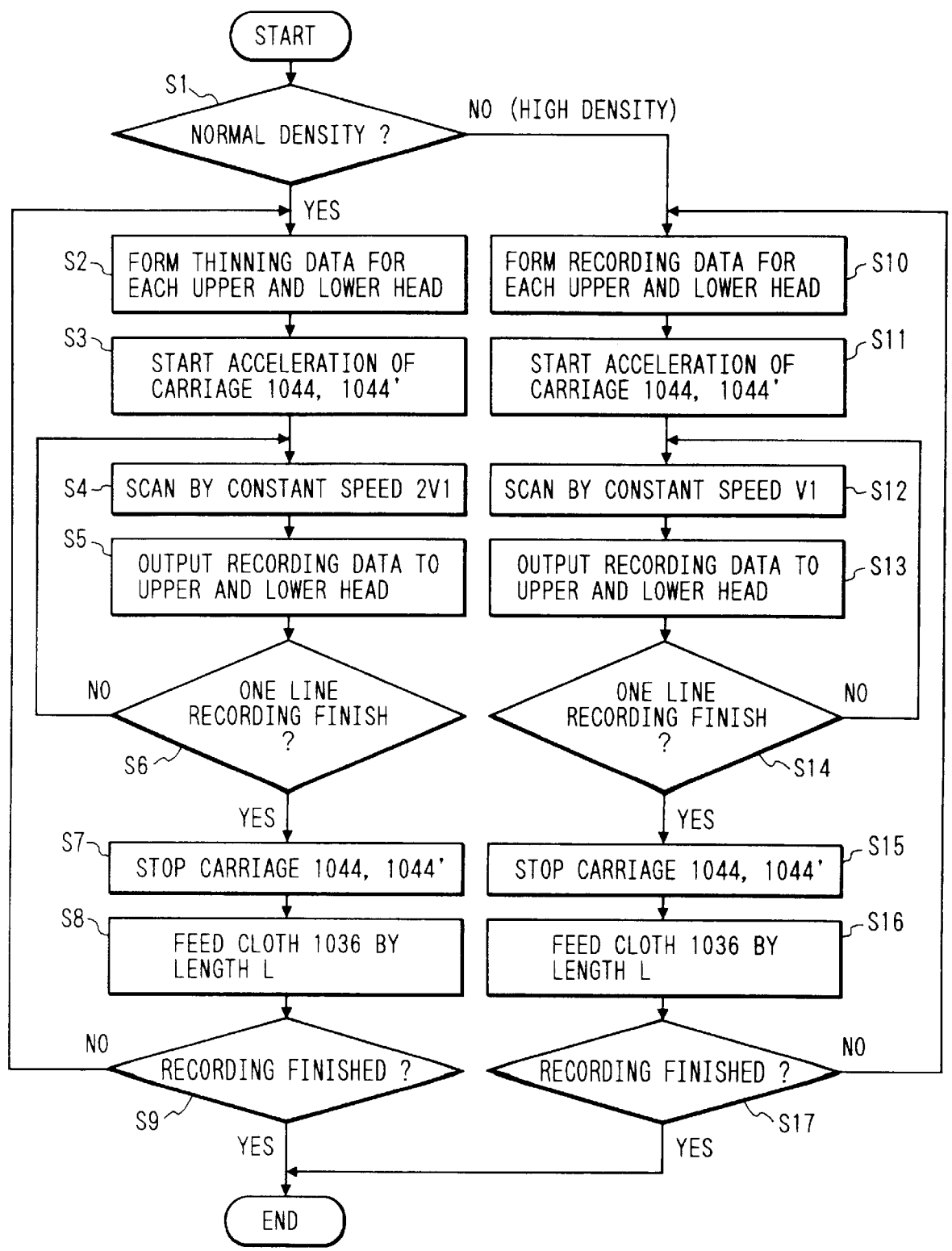
FIG. 24 is a flow chart showing a recording operation in the cloth printing apparatus of the second embodiment.

FIG. 24 is a flow chart of printing processing in the cloth printing apparatus of this embodiment. The control program for executing this processing is stored in the ROM 1112.

The image data to be printed is stored in the image memory 1505, and the routine is started when the CPU 1111 detects the start of printing. It is determined in step S1 whether recording is performed at a normal density (corresponding to FIG. 21) or a high density (corresponding to FIG. 22). This determination may be performed by a code or the like included in the data from the host computer, or the density is designated with a switch or the like in an operation panel (not shown).

When the normal density is determined, the flow advances to step S2 to form the thinned data for the ink jet heads of the first and second printer units 1031 and 1031'. When formation of the recording data is completed, the flow advances to step S3 to start rotation of the carriage motors 1407 and 1408. When acceleration of the carriages 1044 and 1044' is completed and a constant speed mode is set, the flow advances to step S4, and the carriages 1044 and 1044' are moved at a constant speed V1. In synchronism with this carriage movement, the recording data of each ink jet head is output to perform recording by the first and second printer units 1031 and 1031'. In this case, the area recorded by the upper half of the nozzles of the ink jet head of the first printer unit 1031 is recorded by the lower half of the nozzles of the ink jet nozzle of the second printer unit 1031'. In contrast to this, the area recorded by the lower half of the nozzles of the first printer unit 1031 is recorded by the upper half of the nozzles of the second printer unit 1031'.

When one-line recording is finished, the flow advances from step S6 to step S7 to stop traveling the carriages. In step S8, the winding-up motor 1409 and the feeding motor 1410 are rotated and driven to feed the cloth 1036 by a recording width L. This processing is completed until one-page recording process is finished.

On the other hand, when recording is performed at a high density, the flow advances to step S10 to form recording data for the upper and lower heads. This recording data is not thinned data given in step S2. In steps S11 and S12, the carriages 1044 and 1044' are accelerated and are kept at the constant speed V1. In step S13, the recording data are respectively output to the upper and lower heads. In step S14, when one-line recording is finished, the flow advances to step S15. As in steps S7 and S8, the carriage return is performed, and the cloth 1036 is fed. Although the flow chart of printing process in the mode shown in FIG. 23 is not illustrated, printing can be performed in the same manner as at the high density, except that the feed quantity of the cloth 1036 fed every printing of one line is 2L.

Figure 25:
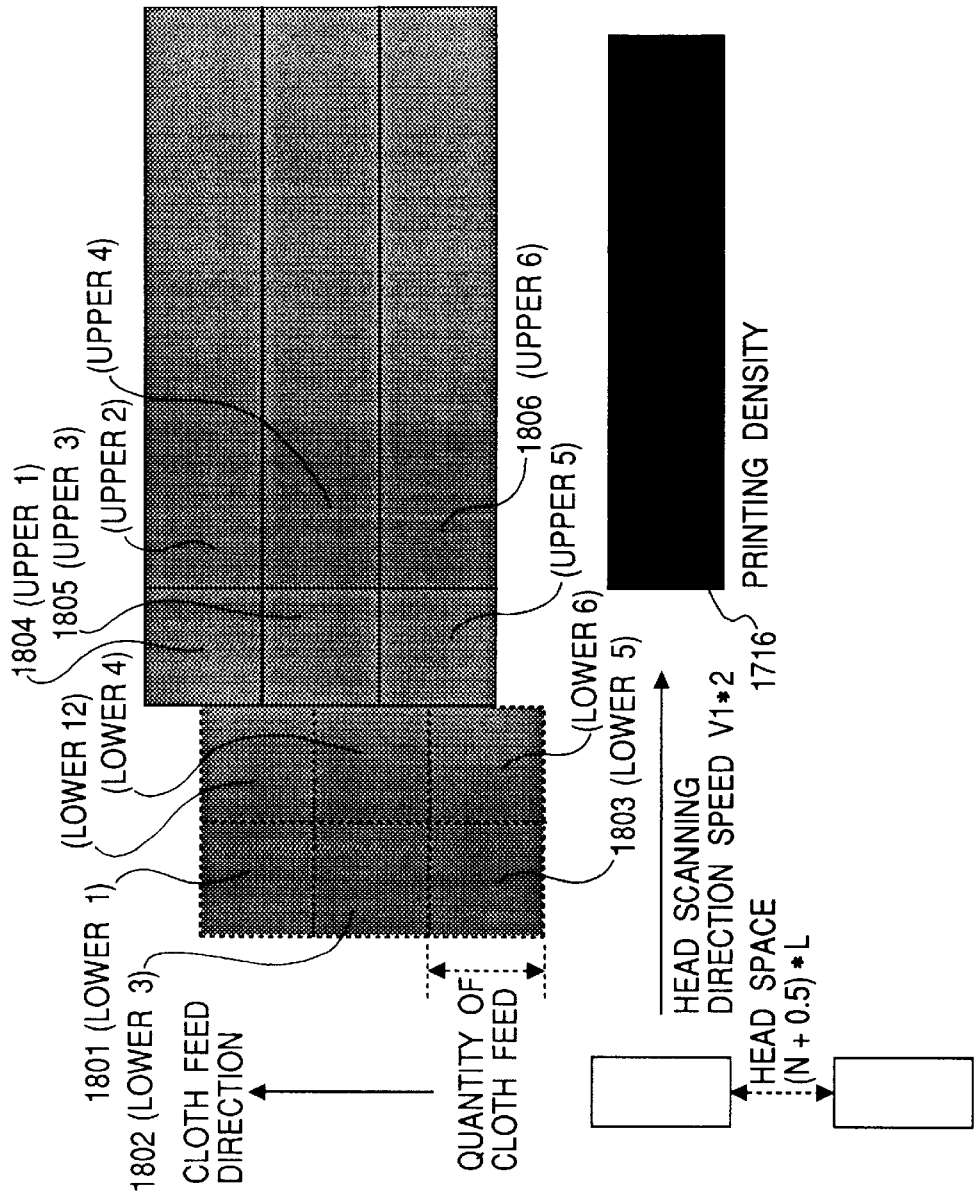
FIG. 25 is a view for explaining a printed content in four-time multi-scanning.

FIG. 25 is a view for explaining another printing method according to this embodiment.

In this operation, areas 1801 to 1803 are recorded by two scanning cycles by means of ink jet heads of the first printer unit 1031, and areas 1804 to 1806 are recorded by two scanning cycles by means of ink jet heads of the second printer unit 1031'. The data recorded by each recording scanning cycle is thinned data. By this data thinning method, one-scanning data is recorded by, e.g., the lower 1 and the lower 2. The area recorded by the lower 1 and the lower 2 may be subjected to overlap printing by the upper 1 and the upper 2. Alternatively, one-scanning data is recorded by the lower 1 and the upper 1, and the area recorded by the lower 1 and the upper 1 may be similarly recorded by the lower 2 and the upper 2.

Recording can be performed at the same density as in FIG. 22. In this case, the number of times of scanning is doubled, and the printing amount per unit time decreases. However, the thinning/non-thinning mode need not be set by the SMS circuit 1606 in FIG. 16, thereby advantageously simplifying the circuit design.

According to this embodiment, as described above, (1) Low- and high-density printing modes are provided. In the low-density printing mode, the printing data is thinned, and multi-scanning (two scanning cycles) is performed. In the high-density scanning mode, the printing data is not thinned, and multi-scanning (two scanning cycles) is performed. In this case, the head scanning speed in the low-density printing mode is twice that in the high-density printing mode.

(2) Whether the printing data is thinned or not is switched in accordance with whether the printing image is not smooth. The feed quantity of an object to be printed is changed, and the head scanning speed is changed. That is, when the printing image is not smooth, the printing data is thinned to reduce the feed quantity of the object to be printed, and the scanning speed of the ink jet head is increased. However, when the printing image is smooth, the printing data is not thinned to increase the feed quantity of the object to be printed, and the scanning speed of the ink jet head is reduced.

The printing mode shown in FIG. 21 is used to perform normal printing. The printing mode shown in FIG. 22 is used to print a color design having a high density. The printing mode shown in FIG. 23 is used to print a design having a smooth image in which, e.g., an intermediate density of a monotone does not continue. In this manner, the productivity can be increased, and the printing cost can be reduced. A proper printing mode is selected depending on different designs.

The effects of this embodiment can be added to the operation mode table described above.

Assume that a time required for finishing printing by one normal scanning cycle is defined as 1. When thinned printing is performed by two scanning cycles, as shown in FIG. 21, the required time is about "1.5". The required time for the mode in FIG. 22 is about "2". The required time for the mode using four scanning cycles in FIG. 25 is about "3".

As described above, according to this embodiment, as the head scanning speed and the recording scheme are changed in accordance with a recording density, there are provided a method and apparatus which can prevent a decrease in recording density.

A cloth printing system according to the third embodiment of the present invention will be described in the following order.

Figure 26:
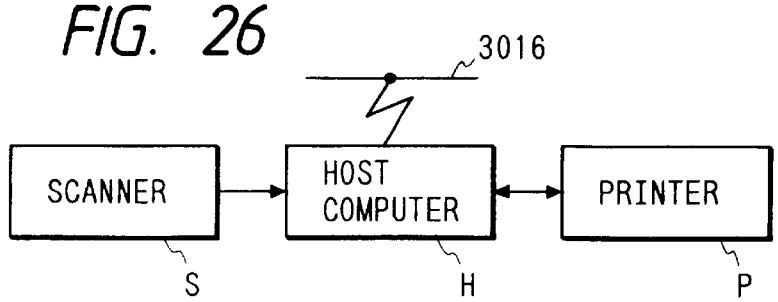
FIG. 26 is a block diagram showing an overall arrangement of a cloth printing system according to the third embodiment of the present invention.

(1) Overall System (FIGS. 26 and 27)
(2) Host Computer (FIGS. 28 to 37)
  (2.1) Arrangement
  (2.2) Operation
(3) Printer (FIGS. 28 to 45)
  (3.1) Description of Printing Mechanism
  (3.2) Description of Apparatus Arrangement
  (3.3) Printing Pattern of Basic Image
  (3.4) Download of Conversion Data and Parameters
(4) Other Arrangements (FIGS. 56 to 60)
(5) Others (1) Overall System FIG. 26 shows the overall arrangement of the cloth printing system according to the third embodiment of the present invention. A host computer H serves as a data supply apparatus for supplying original image data and other control commands for cloth printing to a printer P for recording (to be also referred to as printing hereinafter) an image on a recording medium such as a cloth. By using the host computer, an original image formed by a designer and read by a scanner S is desirably corrected, and predetermined parameters are set for the printer P, thereby performing cloth printing. The host computer H can be coupled to a LAN (local area network) 3016 such as an Ethernet (available from XEROX) to communicate with other systems. The state of the printer P is signaled from the printer P to the host computer H. The host computer H and the printer P will be described in detail with reference to FIGS. 28 and 38, respectively.

Figure 27:
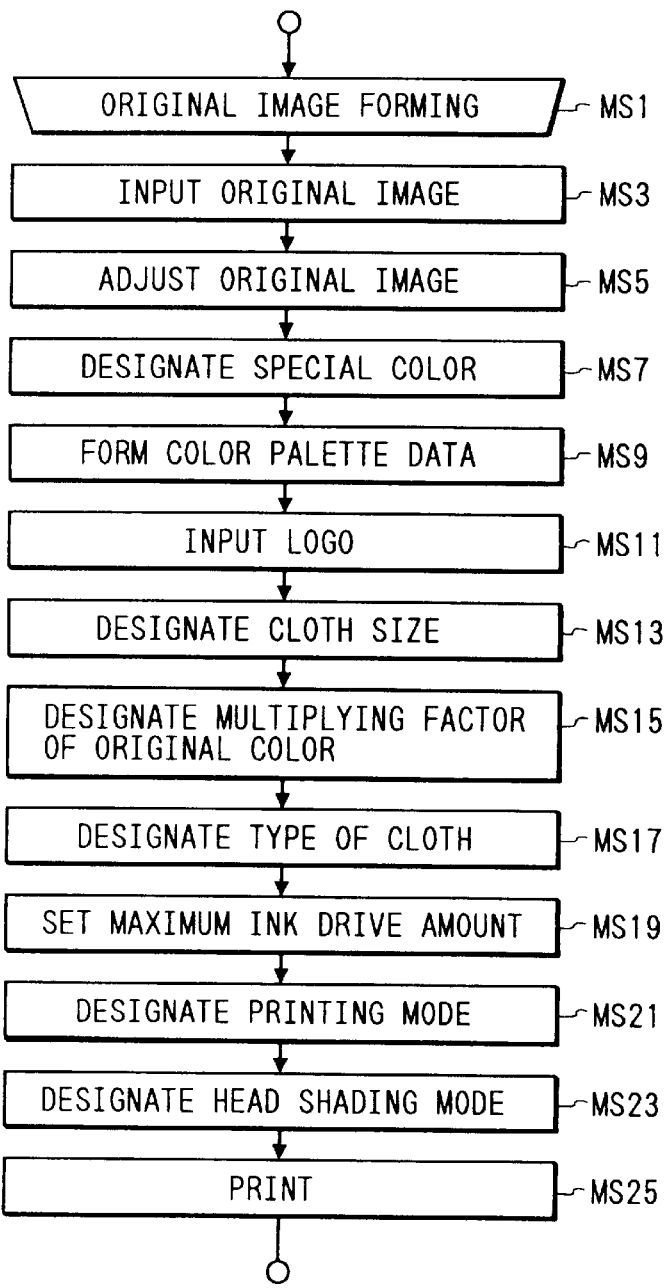
FIG. 27 is a flow chart schematically showing a cloth printing sequence of the third embodiment.

FIG. 27 is a flow chart showing a cloth printing sequence executed by the system of this embodiment. The processing contents of the respective steps are as follows.

Original Image Forming Step MS1

This step is a step for causing a designer to form an original image, i.e., a basic image serving as a basic unit of a repetition image on a cloth as a recording medium, using an appropriate means. In this forming step, predetermined parts, i.e., an input means and a display means, of the host computer H to be described in detail with reference to FIG. 28 can be used.

Step MS3 of Inputting Original Image

In this step, the original image formed in the step MS1 of inputting an original image is loaded in the host computer H using the scanner S, the original image data stored in an external memory of the host computer H is loaded in the host computer H, or the original image is received from the LAN 3016 to the host computer H.

Step MS5 of Adjusting Original Image

As will be described with reference to FIGS. 49A to 49E, the cloth printing apparatus of this embodiment can select various repetition patterns for the basic image. In this case, undesirable positional errors and color tone discontinuity of the image may occur at boundary portions depending on the selected repetition patterns. This step is a step of accepting selection of a repetition pattern and correcting discontinuity at the boundary portion of the selected repetition pattern. In a correction mode, a designer or operator uses a mouse or any other input means while observing the screen of a display of the host computer H, or automatic correction may be performed by image processing of the host computer H itself.

Step MS7 of Designating Special Color

The printer P of this embodiment basically performs printing using inks of yellow (Y), magenta (M), cyan (C), and black (BK). In cloth printing, in addition to these colors, a metallic color such as gold or silver or vivid color such as vivid red (R), vivid green (G), or vivid blue (B) may be desirably used. In the printer P of this embodiment, printing using such a special color is allowed. In this step, a special color is designated.

Step MS9 of Forming Color Palette Data

In design, a designer selects a color from a standard color patch to form an original image. Color reproducibility in printing a selected color greatly influences productivity of the cloth printing system. In this step, data which determines a mixing ratio of Y, M, C, and special colors to properly reproduce the selected standard color is generated.

Step M11 of Inputting Logo

Logo marks such as designers or maker brands are often printed at the end portions of dry goods. In this step, a logo mark, its color, size, and position are designed.

Step M13 of Designating Cloth Size

The width, length, and the like of a cloth serving as a target printing object are designated. This designation determines scanning amounts in the main-and sub-scanning directions of the recording head in the printer P and the number of repetition of the original image pattern.

Step MS15 of Designating Multiplying Factor of Original Color

A multiplying factor (e.g., 100%, 200%, or 400%) in printing an original image is set.

Step MS17 of Designating Type of Cloth

Various types of cloths such as a natural fiber (e.g., cotton, silk, or wool) and a synthetic fiber (e.g., Nylon, polyester, or acrylic) are available and have different cloth printing properties. When the cloth feed quantity is constant during printing, stripes differently appear at the boundary portions every main-scanning. This may be caused by elongation properties of the cloths. In this step, the type of cloth for printing is input to set an appropriate cloth feed quantity in the printer P.

Step MS19 of Setting Maximum Ink Drive Amount

Even if an ink is driven in the same drive amount, an image density reproduced on a cloth varies depending on types of cloths. An ink drive amount also varies depending on the arrangement or the like of a fixing system in the printer P. In this step, a maximum ink drive amount is designated depending on the type of cloth and the arrangement or the like of the fixing system of the printer P.

Step MS21 of Designating Printing Mode

Whether high-speed printing or normal printing is performed at the printer P or whether one ink drive operation or a plurality of ink drive operations are performed is designated. In addition, when printing is interrupted, it is also designated whether an image pattern can be continued before and after the interruption or the image pattern is newly started without being associated with image pattern continuity.

Step M23 of Designating Head Shading Mode

When a recording head having a plurality of discharge ports is used in the printer P, manufacturing variations and variations in discharge amount or direction for each ink discharge port in accordance with an application state may be caused. Processing (head shading) for correcting a driving signal for each discharge port to correct the above variations and keeping the discharge amount constant may be performed. In this step, timings and the like of such head shading can be designated.

Step MS25 of Printing

Cloth printing is executed at the printer P on the basis of the above designated conditions.

If some designation items are unnecessary, the corresponding steps may be omitted or skipped. A step for designating any other item may be added, as needed.

(2) Host Computer (2.1) Arrangement

Figure 28:
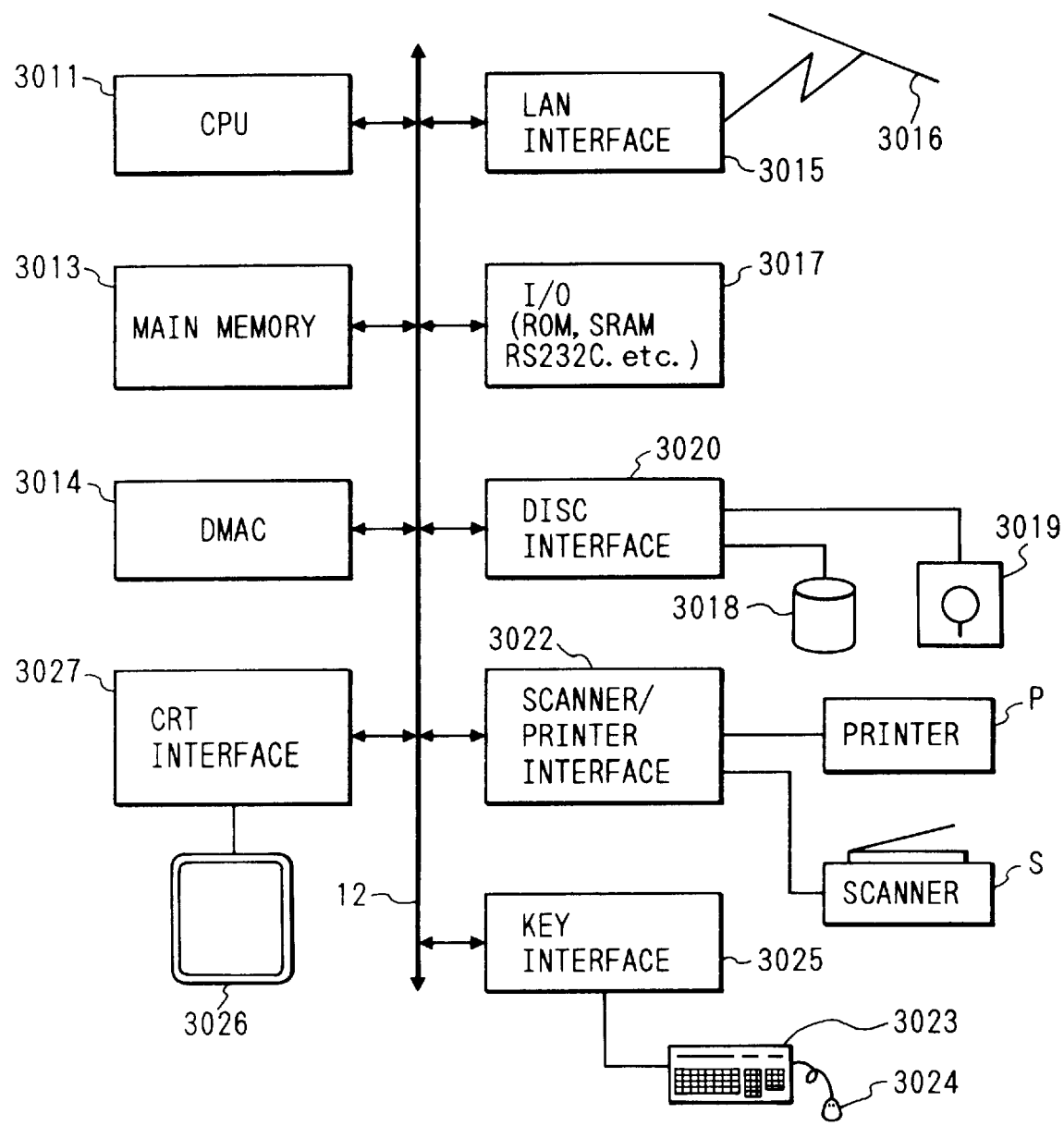
FIG. 28 is a block diagram showing a system centered on a host computer according to third embodiment.

FIG. 28 is a block diagram showing the overall arrangement having the host computer as the main component.

Referring to FIG. 28, a CPU 3011 executes control of the entire information processing system. A main memory 3013 stores programs executed by the CPU 3011 and can be used as a work area upon execution of the programs. A DMA controller (Direct Memory Access Controller; to be referred to as a DMAC hereinafter) 3014 transfers data between various components constituting the system without going through the CPU 3011. A LAN interface 3015 interfaces a LAN 3016 and the system. An input/output device (to be referred to as an I/O hereinafter) 3017 has a ROM, an SRAM, and an RS232C interface. Various external devices can be connected to the I/O 3017. A hard disc drive 3018 and a floppy disc drive 3019 serve as external memory devices. A disc interface 3020 connects signals between the system and the hard disc drive 3018 and the floppy disc drive 3019. A scanner/printer interface 3022 connects signals between the host computer H, and the printer P and the scanner S, thereby obtaining GPIB specifications. A keyboard 3023 inputs various character data and control data. A mouse 3024 serves as a pointing device. A key interface 3025 connects signals between the system, and the keyboard 3023 and the mouse 3024. The display operation of a display device (CRT) 3026 is controlled by an interface 3027. A system bus 3012 comprises a data bus, a control bus, and an address bus for connecting signals between the above system components.

(2.2) Operation

In the system in which all the components described above are connected, a designer or operator performs operations in correspondence with various kinds of information displayed on the screen of the CRT 3026. Character and image data supplied from the external devices connected to the LAN 3016 and the I/O 3017, the hard disc drive 3018, the floppy disc drive 3019, the scanner S, the keyboard 3023, and the mouse 3024, or the operation data stored in the main memory 3013 are displayed on the screen of the CRT 3026. The designer or operator designates various kinds of information or designation for the system while observing the display.

Of all the steps shown in FIG. 27, some steps associated with the main part of this embodiment using the system shown in FIG. 28 will be described in detail.

Figure 29:
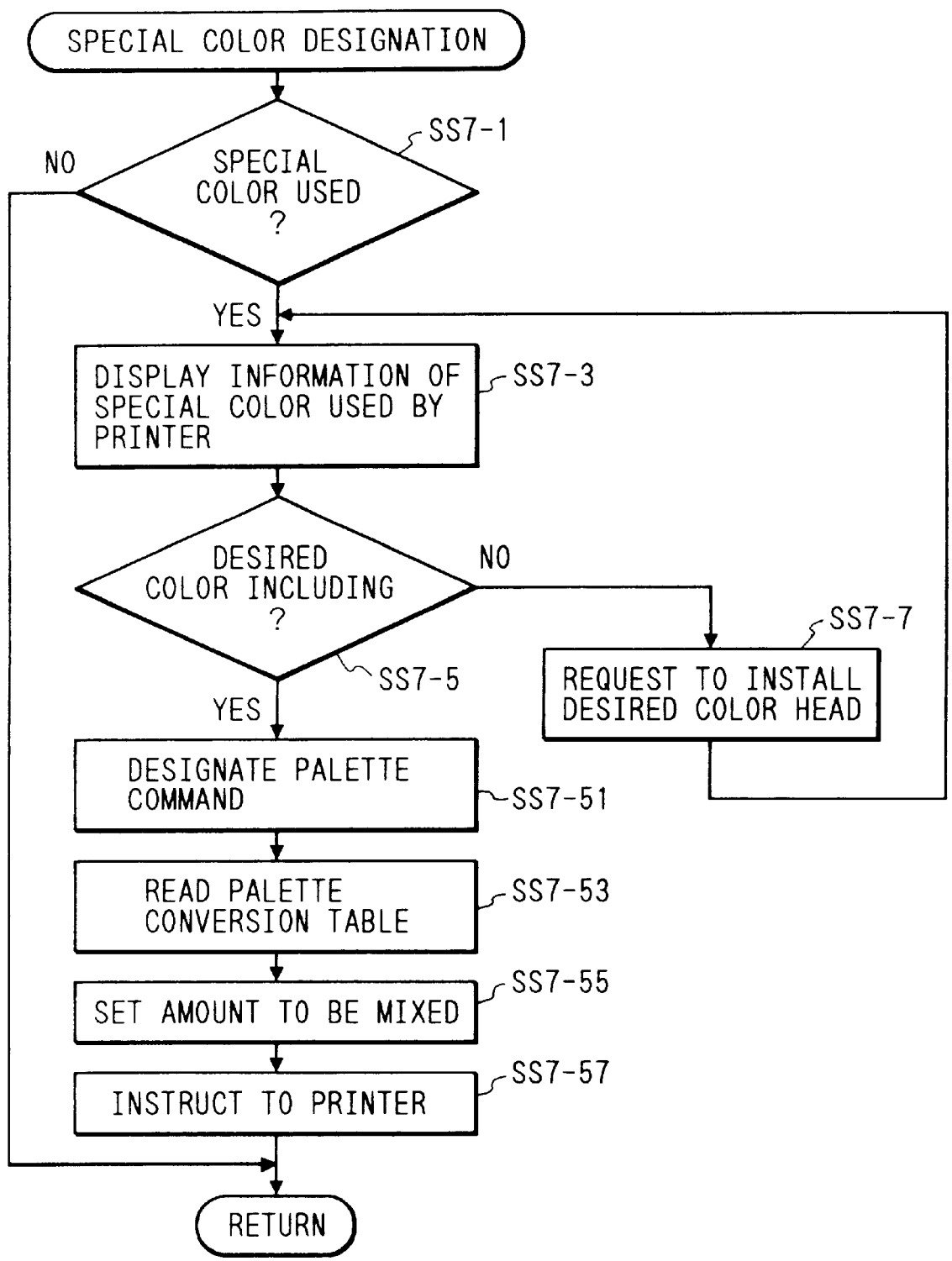
FIG. 29 is a flow chart showing a special color designation sequence in FIG. 27.

FIG. 29 is a special or specific color designation sequence in FIG. 27. In this routine, a palette conversion table formed by the host computer H in the form of a palette conversion table (i.e., a table representing a mixing ratio of Y, M, C, BK, and special colors) at the printer for the palette data transmitted from the host computer H to the printer P is output. When this routine is started, it is determined in step SS7-1 whether a specific or special color is designated. If NO in step SS7-1, the flow is immediately ended. However, if YES in step SS7-1, the flow advances to step SS7-3 to display information of the current special color used by the printer P on the CRT 3026. In this processing, for example, the prior art disclosed in Japanese Laid-Open Patent Application No. 2-187343 can be used wherein the recording head of the printer has a means for presenting its own information (pattern cutting), and this information is recognized by this means on the printer unit side. The means for presenting the information may be an EPROM or a DIP switch. When this prior art is applied to this embodiment, and the information is an ink color used by the recording head, this information is read by the printer P and is signaled to the CPU 3011 in the host computer H. The operator checks the information displayed on the CRT 1026 and knows the used/unused state of the special color recording head or the currently used special color. A key input operation is performed to determine in step SS7-5 whether a desired special color is included. If NO in step SS7-5, the flow advances to step SS7-7 to request to install a desired color head. When the desired color head is installed, the flow returns to step SS7-3.

It is determined in step SS7-5 that the recording head currently used in the printer P need not be changed, i.e., the desired color is included, a palette command for defining a color combination is designated in step SS7-51. For example, three colors, i.e., C, M, and Y, four colors, i.e., C, M, Y, and BK, or five colors, i.e., C, M, Y, S1, and S2, or C, M, Y, S3, and S4 are used, and these colors can be designated using numerical values if "3", "4", "6", and "8".

In step SS7-53, the palette conversion table is read out from the memory device (main memory 3013 or external storage devices 3018 and 3019). The operator appropriately corrects the readout palette conversion table as needed to set an amount of each color to be mixed (step SS7-55), and its table data is transmitted together with a palette command to the printer P (step SS7-57). The palette conversion table can be selected from palette conversion tables shown in FIGS. 30 to 33.

A processing circuit on the printer P side for the above sequence, as shown in FIGS. 28 to 34 can be used.

Figure 34:
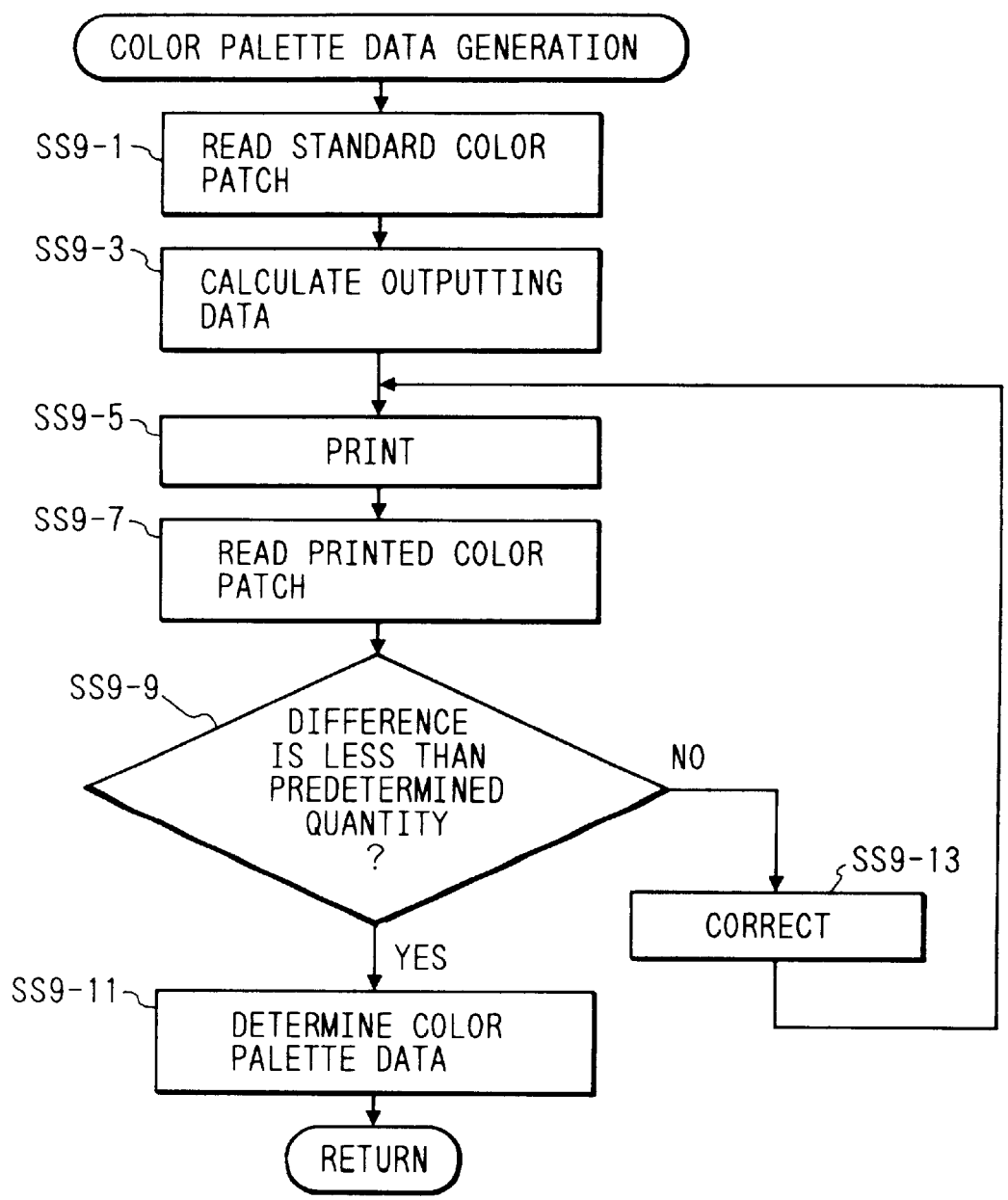
FIG. 34 is a flow chart showing a color palette data generation sequence shown in FIG. 27.

FIG. 34 is a detailed sequence of step SM9 of forming color palette data in FIG. 27.

In this sequence, the standard color patch of a color selected by a designer is read in step SS9-1. For this purpose, the scanner S can be used or a reading means (to be described later) arranged in the printer P can be used. In step SS9-3, palette conversion data including a special color is calculated in accordance with the palette conversion table set to match the printer P on the basis of the code corresponding to the standard color patch, and image formation is performed in correspondence with the calculated data including the special color. In step SS9-5, the data is printed in the form of a color patch.

The color patch printed at the printer P is read in step SS9-7, and this color data is compared with the color data obtained in step SS9-1. If a difference is less than a predetermined value, the corresponding color palette conversion table is employed and set in the printer P in step SS9–11. When the difference is the predetermined value or more, the palette data is corrected on the basis of the difference in step SS9–13, and the flow returns to step SS9-5. The above operations are repeated until YES is obtained in step SS9-9. Use of the special colors S1, S2, S3, and S4 is exemplified in the special color sequence shown in FIG. 29. However, when these special colors S1, S2, S3, and S4 are used, a palette conversion table formed by the operator can be corrected on the basis of the data obtained in this sequence. According to this embodiment, a combination of a plurality of inks including a special color corresponding to a color code selected by a designer can be selected from the color patches,. i.e., the color codes selected by the designer.

Figure 35:
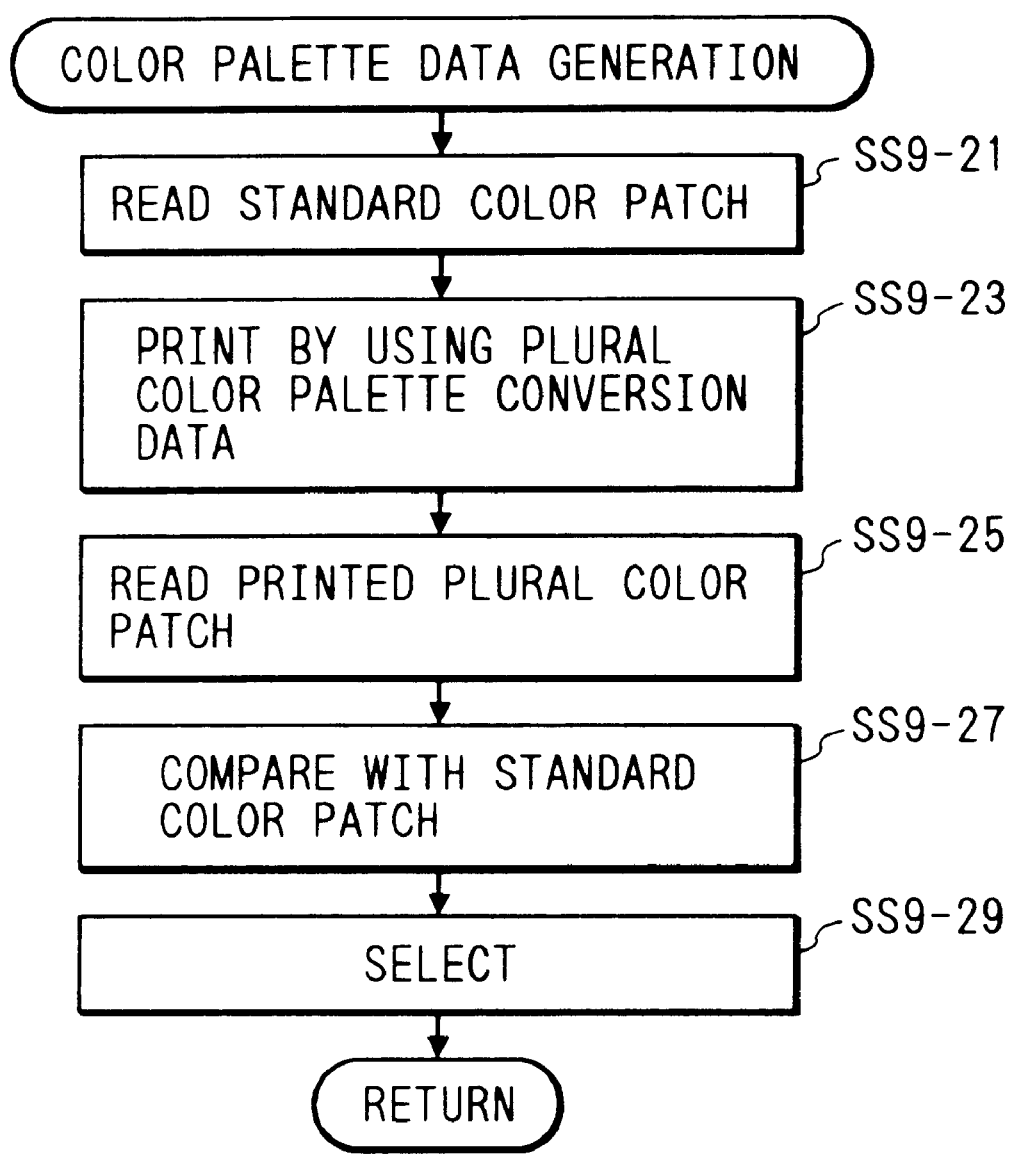
FIG. 35 is a flow chart showing another color palette data generation sequence.

FIG. 35 is another detailed sequence of the step of generating color palette data.

A standard color patch is read in step SS9–21 as in step SS9-1. In this sequence, plural color palette conversion data are prepared in step SS9–23, and printing is performed using the plural color patches. In step SS9–25, the plural color patches are read. In step SS9–27, these patches are compared with the color data obtained in step SS9–21. Color data closest to the color data obtained in step SS9–21, i.e., color data having most excellent color reproducibility, is selected, and this color palette conversion data is employed and set in the printer P.

Plural color palette conversion data prepared in step SS9–23 may be data for changing the ink mixing amounts for all color recording heads every predetermined amount. Alternatively, a predetermined range centered on the data obtained in step SS9–21 or data set by the operator in the sequence of FIG. 29 may be selected, and the ink mixing amounts may be slightly changed within this range. In the sequence of FIG. 35, correction and reprinting can be omitted as compared with the sequence of FIG. 34. Therefore, the color palette conversion data can be generated at high speed.

Figure 36:
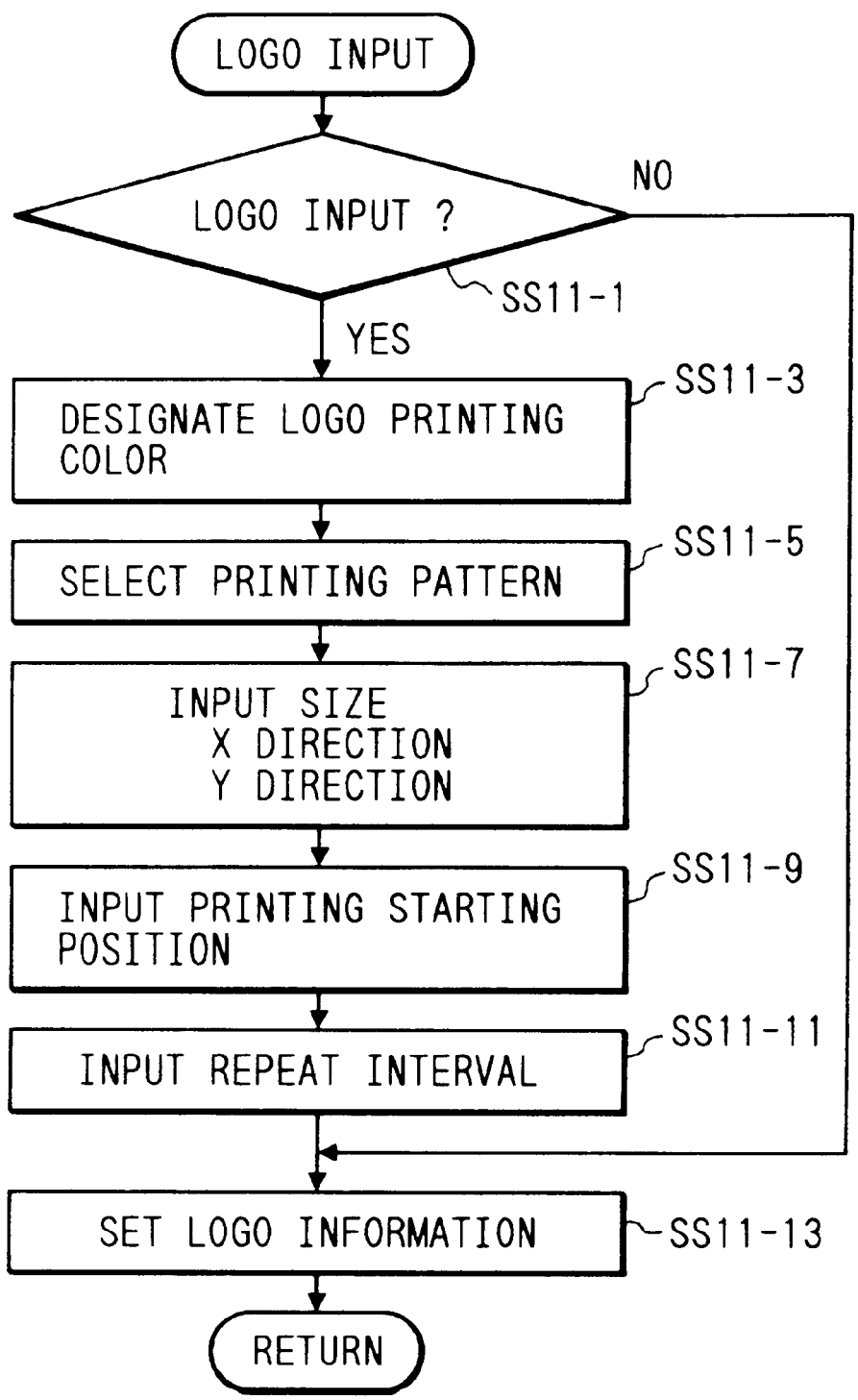
FIG. 36 is a flow chart showing a logo input sequence in FIG. 27.

FIG. 36 is a logo input sequence in FIG. 27.

In this sequence, an inquiry for determining whether a logo is printed on a cloth is made in step SS11-1 to an operator. If YES in step SS11-1, a logo printing color is designated in step SS11-3. The logo printing color is selected from the eight colors, i.e., C, M, Y, and BK, and the special colors S1, S2, S3, and S4.

A logo is selected from plural types of logos (to be described later) prepared in the printer P in step SS11-5. In this case, for example, one of the four different logos can be selected.

In step SS11-7, the size of a logo to be printed in the main-scanning direction (X direction) and the sub-scanning direction (Y direction) is designated. For example, the length in the X direction can be designated for each pixel within a maximum of 512 pixels, and the length in the Y direction can be designated for each recording width (band) of one main-scanning cycle of the recording head within a maximum of eight bands.

In step SS11-9, the printing starting position of the logo in the main-scanning direction (X direction) is designated. For example, this position can be designated for each pixel within a maximum of 512 pixels.

In step SS11-11, the pitch (repeat interval) between logos is designated to designate the starting position of the logo in the sub-scanning direction (Y direction). This position can be designated for each band within a maximum of 256 bands. Information may be presented to the operator so as not to set the designated value to be smaller than the Y-direction size designated in step SS11-7.

The host computer H sets logo information in the printer P in accordance with all the designated conditions in step SS11-13. A data format for setting the logo information can be exemplified as follows:

"<WLOGO>, <color>, <pattern>, <X0>, <Y0>, <L0>, <L1>"

Figure 37:
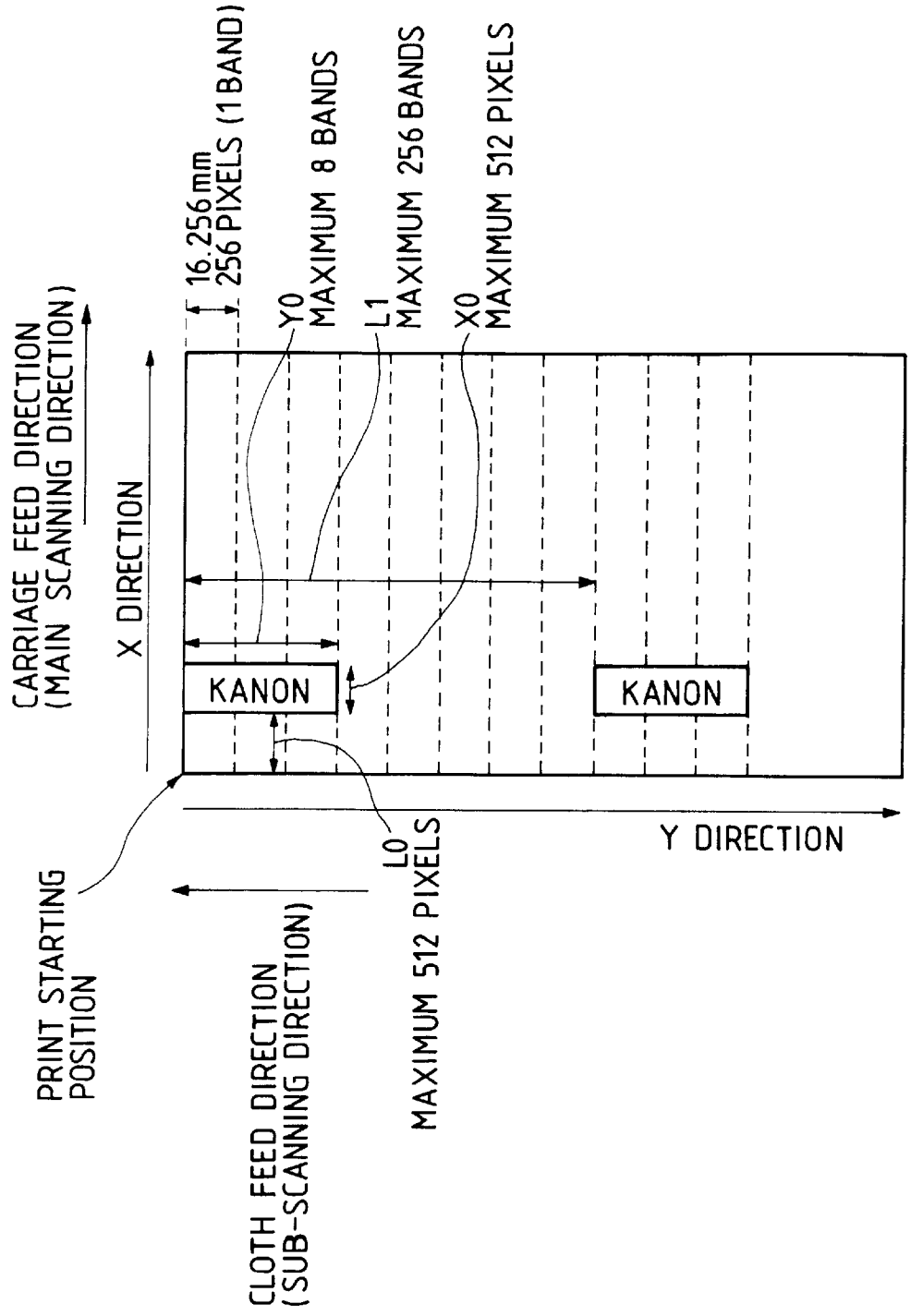
FIG. 37 is a view for explaining a correspondence between data designated in FIG. 36 and a logo printing form.

<WLOGO> is an identification code for causing the printer P to recognize that the data following this identification code is logo information, and <color> is data for setting a color. Each bit is assigned to each of the eight colors described above and can be a one-byte signal to output/mask the color when the signal is set in the ON/OFF state. <pattern> is data for setting a logo pattern and can be a 2-bit signal for selecting one of the four different logo patterns. <X0>, <Y0>, <L0>, and <L1> are data for setting the X-direction logo size, the Y-direction logo size, the X-direction logo starting position, and the Y-direction logo repeat interval, respectively. A correspondence between the above data and a logo outputting format is shown in FIG. 37.

The arrangement of the printer P side corresponding to the above sequence will be described with reference to FIG. 46 later.

(3) Printer (3.1) Description of Printing Mechanism

The operation of a serial type ink jet recording apparatus as the printer P applicable to the present invention will be described below.

Figure 38:
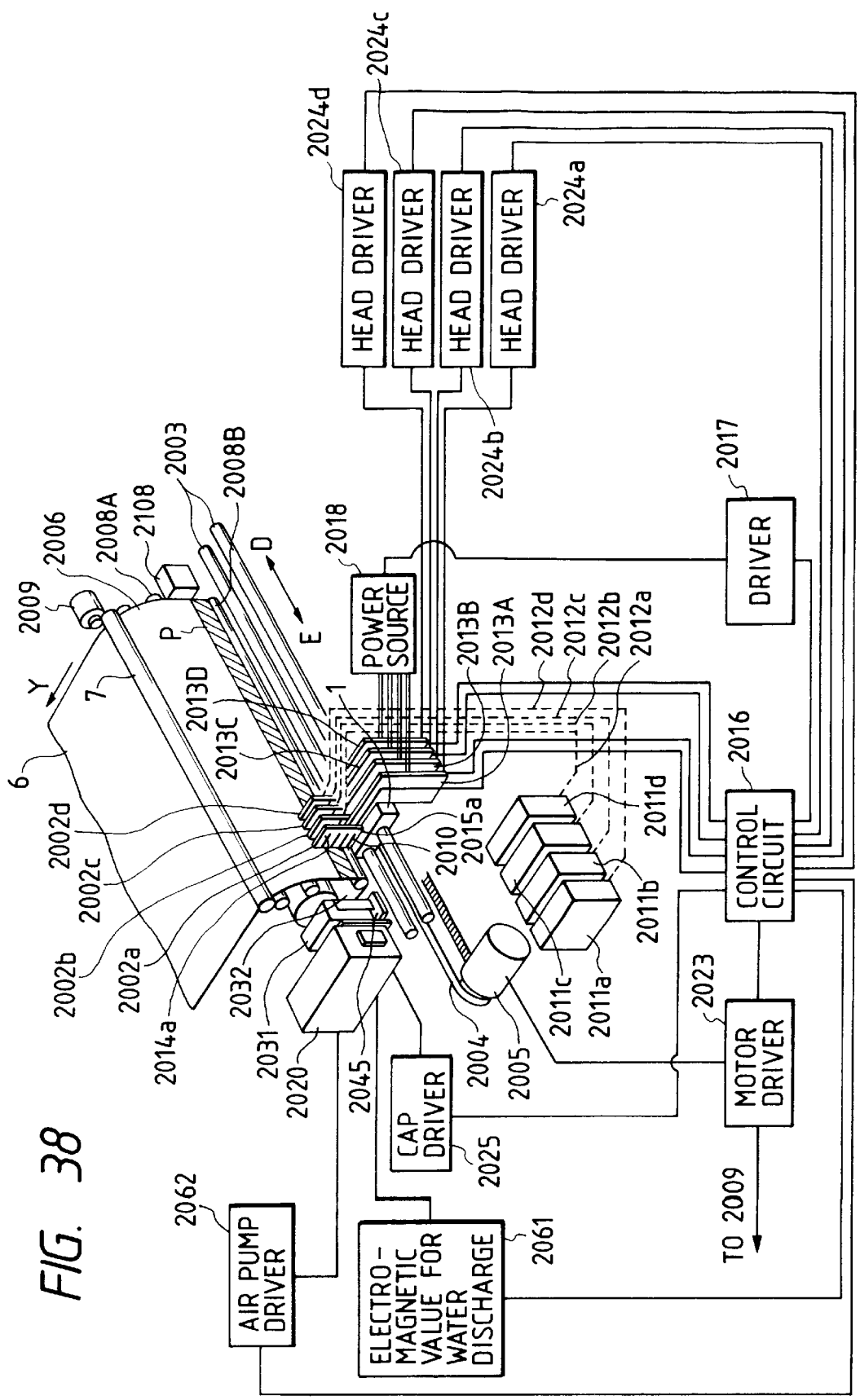
FIG. 38 is a perspective view showing a schematic mechanical arrangement of a printer used in this embodiment.

Referring to FIG. 38, a carriage 2001 has color recording heads 2002a, 2002b, 2002c, and 2002d corresponding to four colors, i.e., cyan (C), magenta (M), yellow (Y), and black (BK). A guide shaft 2003 moves and guides to support the carriage 2001. For the illustrative convenience, a maximum of four special color heads (not shown) can be mounted on the carriage 2001, and the associated mechanism can also be mounted on the carriage 2001. Each head or several integral heads may be detachably mounted on the carriage 2001.

Part of a belt 2004 as an endless belt is fixed and connected to the carriage 2001 and is kept taut with a gear mounted on a driving shaft of a carriage driving motor 2005 (driven by a motor driver 2023) constituted by a pulse motor. When the carriage driving motor 2005 is driven to feed the belt 2004 kept taut with the driving shaft. As a result, the carriage 2001 scans and moves along the recording surface of the recording medium along the guide shaft 2003. A feeding roller 2007 feeds a recording medium 2006 (recording paper or cloth), guide rollers 2008A and 2008B guide the recording medium 2006, and a recording medium feeding motor 2009 feeds the feeding roller 2007.

256 discharge ports for discharging ink droplets toward the recording medium 2006 are formed in each of the recording heads 2002a, 2002b, 2002c, and 2002d, and the special color recording heads at a density of, e.g., 400 dpi (dots per inch). Inks are supplied from ink tanks 2011a, 2011b, 2011c, and 2011d (and special color ink tanks) to the recording heads 2002a, 2002b, 2002c, and 2002d (and the special color heads) through supply tubes 2012a, 2012b, 2012c, and 2012d (and the special color supply tubes), respectively. Ink discharge signals are selectively supplied from head drivers 2024a, 2024b, 2024c, and 2024d (and special color drivers) to energy generating means (not shown) arranged in liquid paths communicating with the discharge ports through flexible cables 2013a, 2013b, 2013c, and 2013d (and special color flexible cables), respectively.

Head heaters 2014a, 2014b, 2014c, and 2014d (the heaters 2014b, 2014b, and 2014d, and the like are not illustrated) and temperature detecting means 2015a, 2015b, 2015c, and 2015d (the means 2015b, 2015c, and 2015d, and the like are not illustrated) are arranged in the recording heads 2002a, 2002b, 2002c, and 2002d, and the like. Detection signals from the temperature detecting means 2015a, 2015b, 2015c, and 2015d, and the like are input to a control circuit 2016 having a CPU. The control circuit 2016 controls heating of the head heaters 2014a, 2014b, 2014c, and 2014d through a driver 2017 and a power source 2018 on the basis of these detection signals.

A capping means 2020 abuts against the discharge port surfaces of the recording heads 2002a, 2002b, 2002c, and 2002d in the non-recording state to prevent drying and mixing of foreign matters and to eliminate the foreign matters. More specifically, in the non-recording state, the recording heads 2002a, 2002b, 2002c, and 2002d are moved to a position opposite to the capping means 2020. The capping means 2020 is driven by a cap driver 2025 in the forward direction, and an elastic member 2044 is brought into tight contact with the discharge port surfaces to perform capping. Although not shown, a special color head capping means is also arranged, as a matter of course.

A clogging preventive means 2031 receives a discharged ink in an idle discharge operation of the recording heads 2002a, 2002b, 2002c, and 2002d. The clogging preventive means 2031 comprises a liquid reception member 2032, located to oppose the recording heads 2002a, 2002b, 2002c, and 2002d, for receiving and absorbing the ink discharged in the idle discharge. The liquid reception member 2032 is located between the capping means 2020 and the recording starting position. The liquid reception member 2032 and a liquid holding member 2045 effectively consist of sponge-like porous members or plastic sintered bodies.

The capping means 2020 is connected to an electromagnetic valve 2061 for water discharge and an air pump driver 2062. Under the control of the control circuit 2016, the water discharge for cleaning and an air spray nozzle, which are arranged in the capping means 2020, are driven by the electromagnetic valve 2061 and the air pump driver 2062, respectively.

Figure 39:
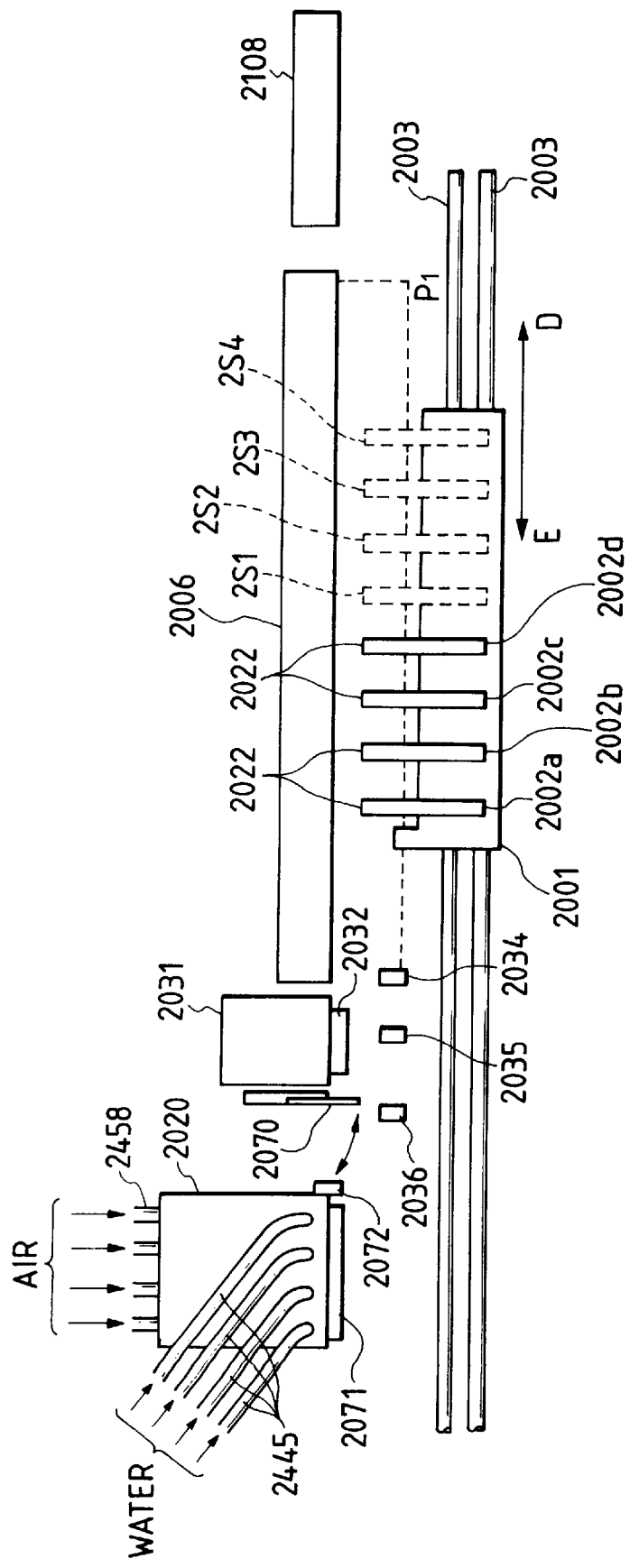
FIG. 39 is a plan view sowing the schematic mechanical arrangement of the printer shown in FIG. 38.

FIG. 39 is a plan view for explaining operations of the recording heads of this embodiment. The same reference numerals as in FIG. 38 denote the same parts in FIG. 39, and a detailed description thereof will be omitted. An arrangement associated with the heads 2S1 to 2S4 for the special color will be omitted in FIG. 39.

Referring to FIG. 39, a recording starting detection sensor 2034 and a capping means detection sensor 2036 are used to detect the positions of the recording heads 2002a, 2002b, 2002c, and 2002d. An idle position detection sensor 2035 detects the reference position of the idle discharge operation while the recording heads 2002a, 2002b, 2002c, and 2002d are being moved in the scanning direction.

A head characteristic measuring means 2018 is used for head shading (step MS23 in FIG. 27) and formation of color palette data (step MS9). The head characteristic measuring means 2018 comprises a feeding means for feeding a recording medium printed with a head shading test pattern and a color patch by the heads and a reading means for reading information from the recording medium. This head characteristic measuring means may comprise a means illustrated in FIG. 31 of Japanese Laid-Open Patent Application No. 4-18358 filed by the present applicant.

An ink jet recording operation will be described.

In the standby state, the recording heads 2002a, 2002b, 2002c, and 2002d are capped by the capping means 2020. When a printing signal is input to the control circuit 2016, the motor 2005 is driven by the motor driver 2023 to start moving the carriage 2001. Along with this movement, when the idle discharge position detection sensor 2035 detects each recording head, an ink idle discharge is performed by the clogging preventive means 2031 for a predetermined period of time. When the carriage 2001 is moved again in a direction indicated by an arrow D, and this movement is detected by the recording starting detection sensor 2034, the discharge ports of the recording heads 2002a, 2002b, 2002c, and 2002d, and the like are selectively driven. Ink droplets are discharged, and an image in a dot matrix pattern is recorded in a recording width portion p of the recording medium 2006. When recording in the predetermined width (this width is determined by the nozzle interval of the recording head in the longitudinal direction and the number of nozzles) is performed, the carriage 2001 is moved to the left end position (this position can be detected by counting the number of pulses supplied to the motor 2005). Upon detection of the left end position, pulses corresponding to the width of the recording head are supplied to cause the recording head 2002a at the rear end of the carriage 3001 to cross the recording medium. The carriage 2001 is then reversed and driven in a direction indicated by an arrow E. The carriage 2001 returns to the idle discharge position. The recording medium 2006 is moved by the width or more of the recording width portion p in a direction indicated by an arrow F. The above operations are then repeated.

(3.2) Description of Apparatus Arrangement

Figure 40:
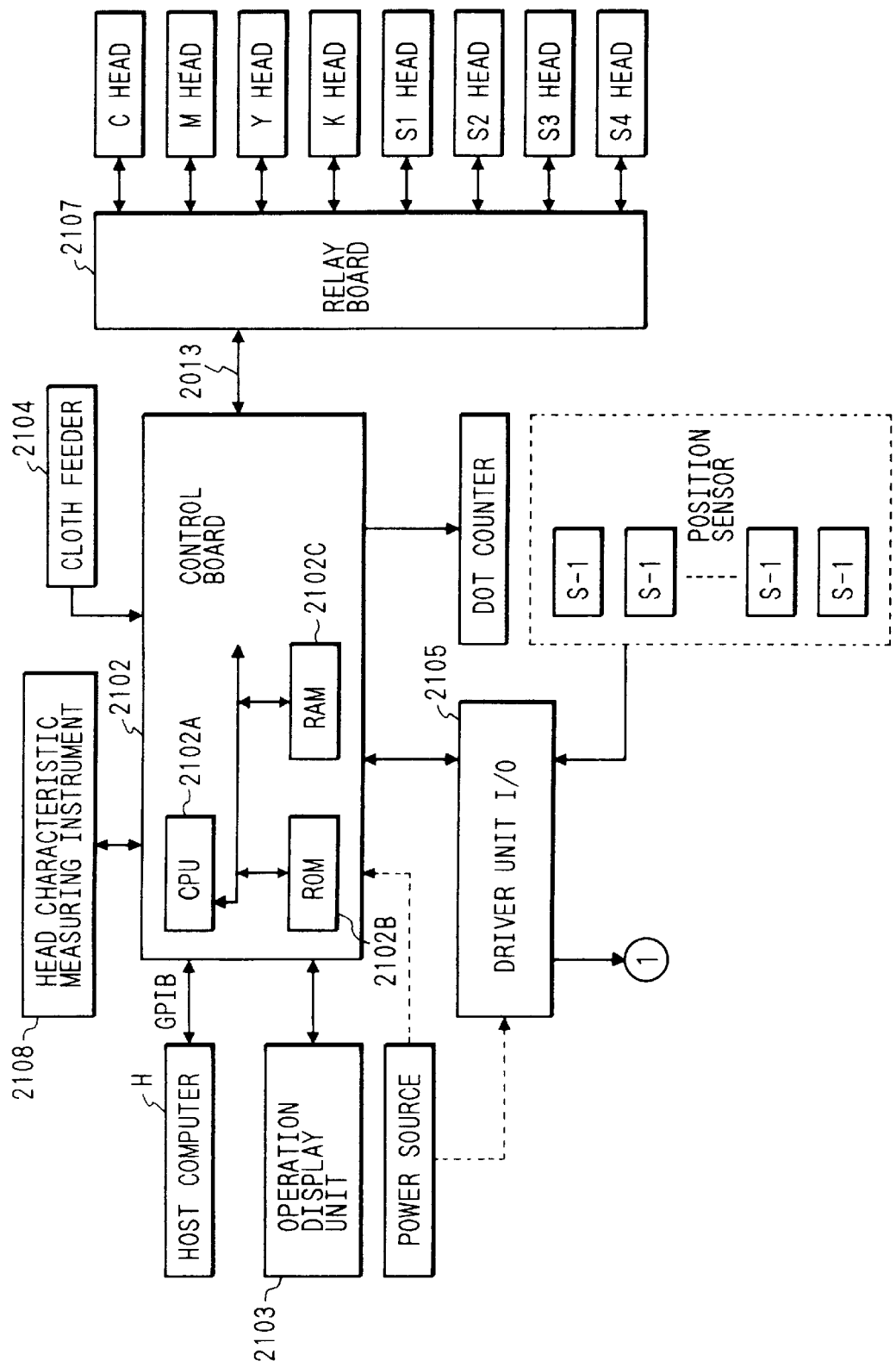
FIG. 40 is a block diagram showing a schematic electrical arrangement of the printer shown in FIG. 38.
Figure 41:
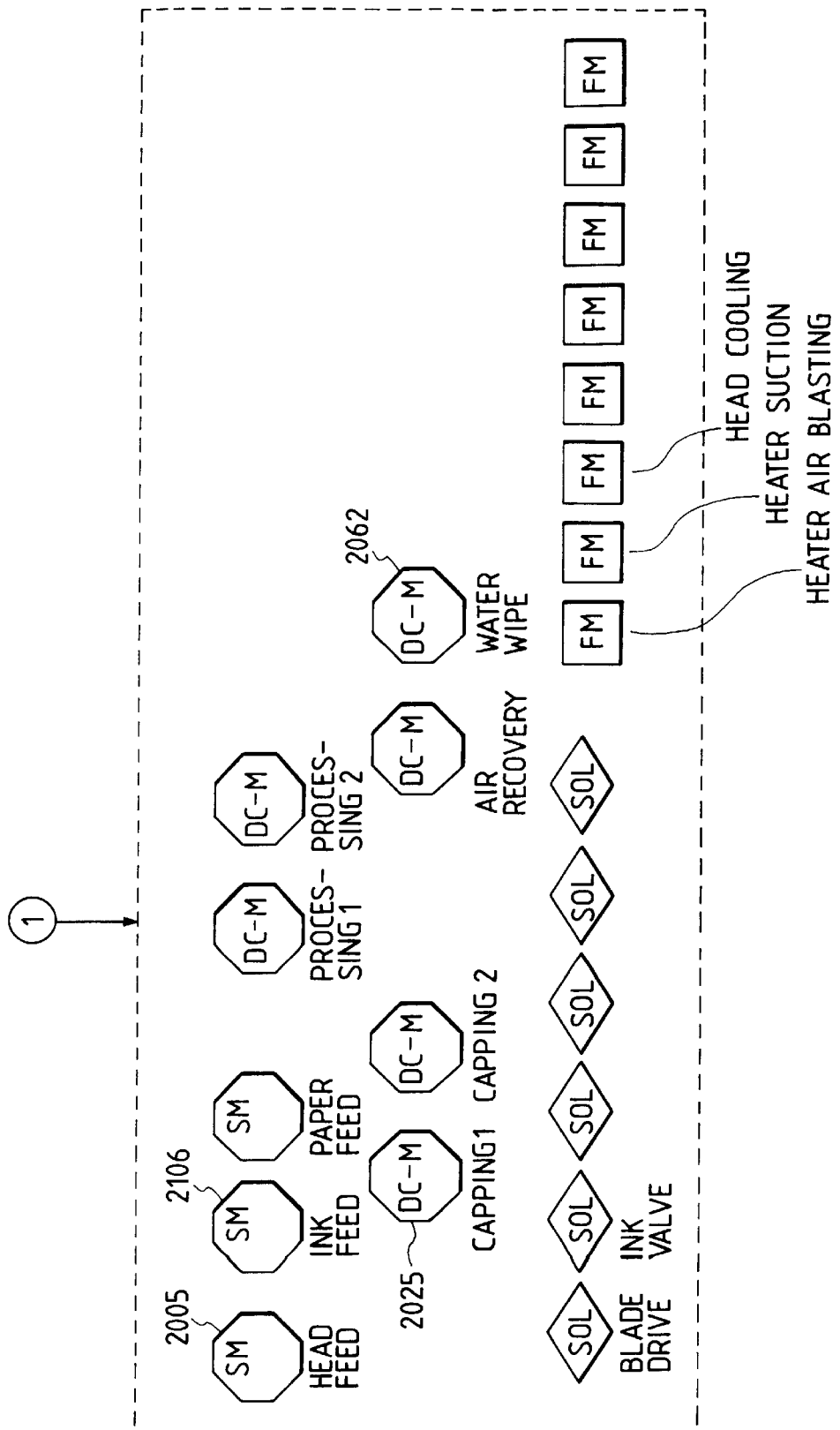
FIG. 41 is a block diagram showing the schematic electrical arrangement of the printer shown in FIG. 38.
Figure 42:
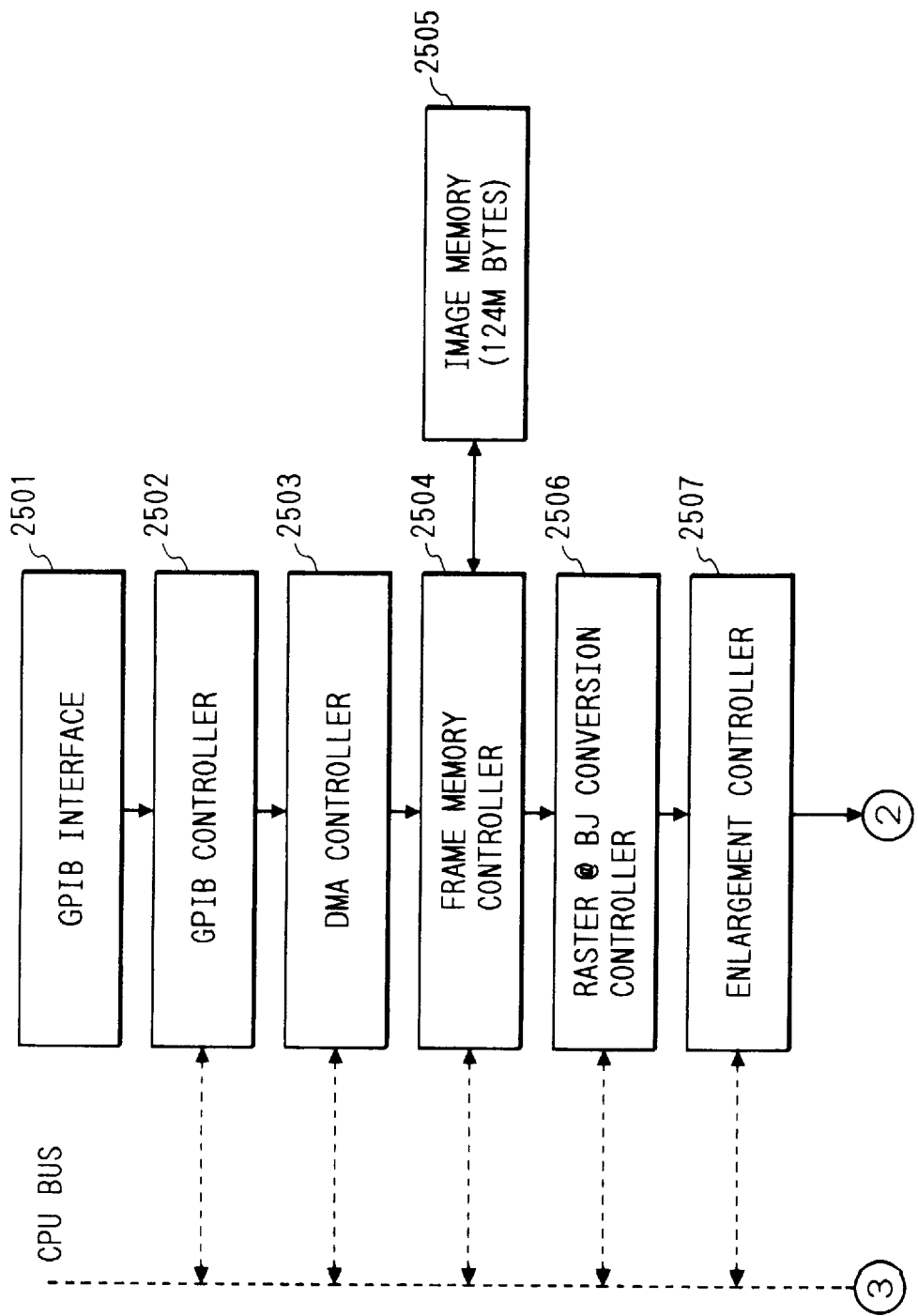
FIG. 42 is a block diagram showing part of the internal arrangement of a control board in FIG. 40 so as to mainly explain a data flow.
Figure 43:
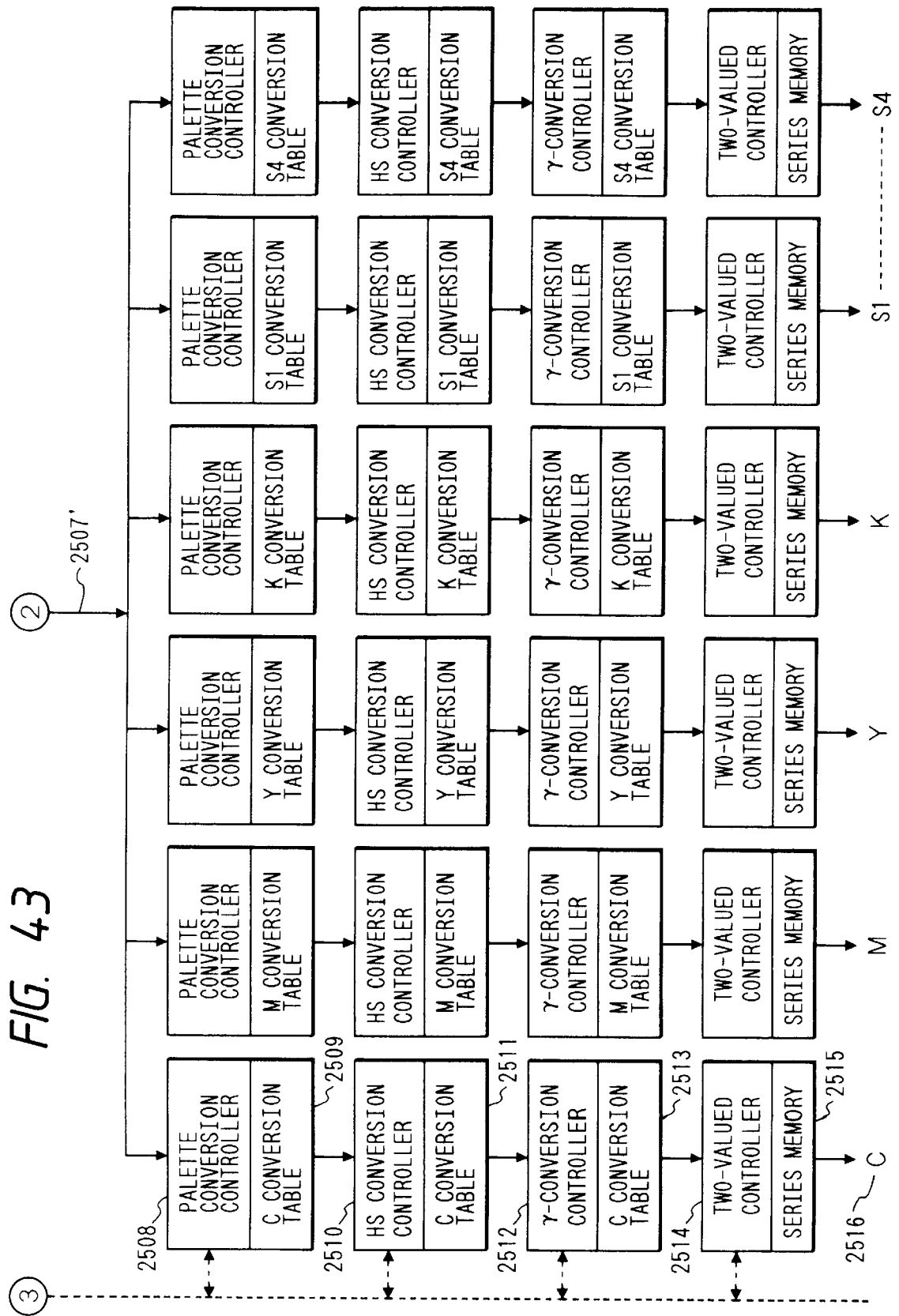
FIG. 43 is a block diagram showing the internal arrangement of the control board in FIG. 40 so as to mainly explain the data flow.
Figure 44:
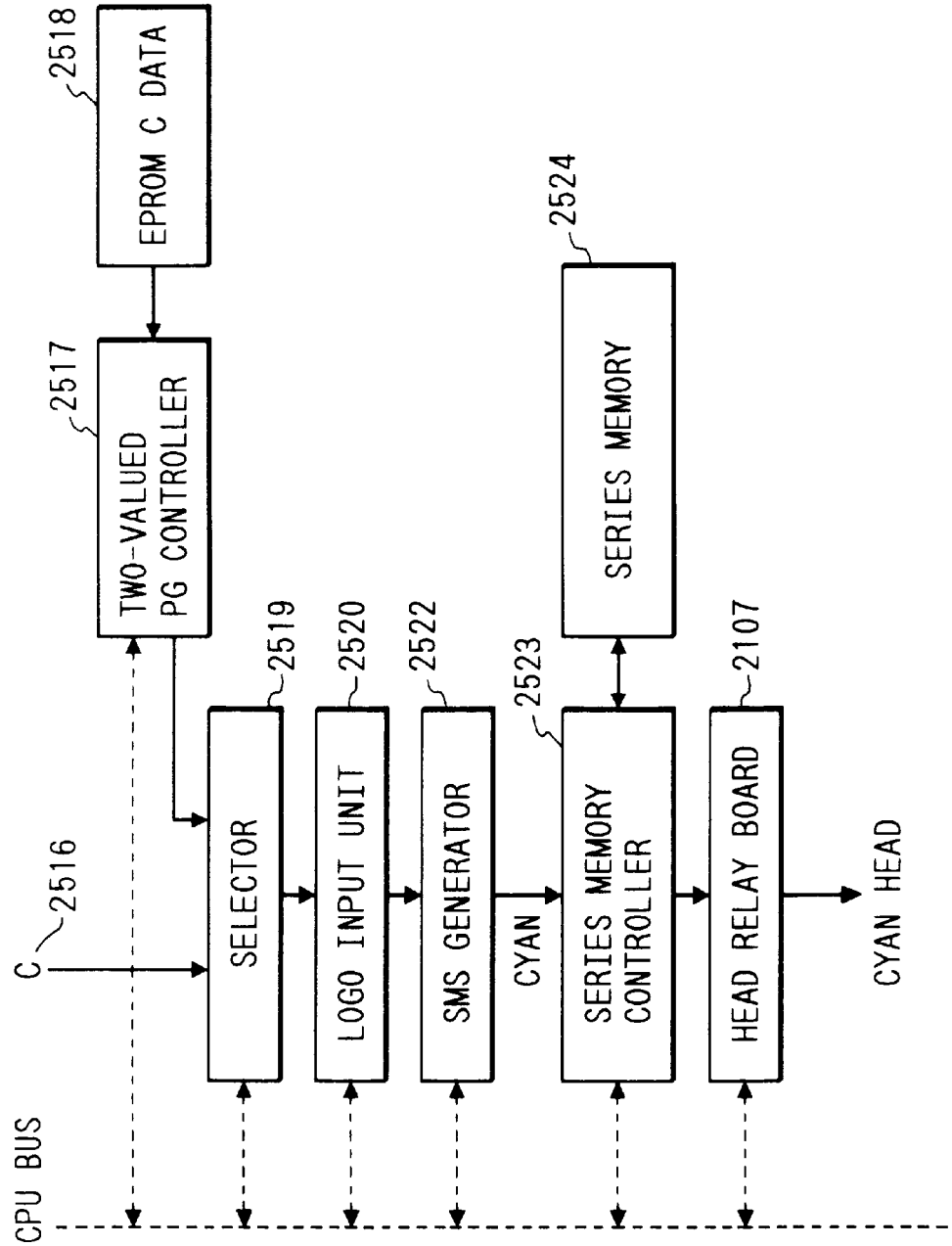
FIG. 44 is a block diagram showing the internal arrangement of the control board in FIG. 40 so as to mainly explain the data flow.

The arrangement of the apparatus will be described below. FIGS. 40 and 41 show the arrangement of the ink jet printer of this embodiment and the arrangement of an operation unit thereof, respectively. FIGS. 42 to 44 are block diagrams of a data flow in the internal arrangement of a control board 2102 in FIG. 40.

Printing image data is transmitted from the host computer H to the control board 2102 having the control circuit 2016 and the like in FIG. 38 through an interface (GPIB in this case). The apparatus for transmitting image data is not limited to a specific one. A transfer form may be transfer through a network or an off-line transfer through a magnetic tape or the like. The control board 2102 comprises a CPU 2102A, a ROM 2102B for storing various programs, a RAM 2102C having various register areas and a work area, and other parts shown in FIGS. 42 to 44 and performs the overall operation of the apparatus. An operation display unit 2103 comprises an operation unit for causing an operator to instruct predetermined designation to the printer P and a display for displaying a message and the like to the operator. A cloth feeder 2104 includes a motor for feeding a recording medium such as a cloth serving as a target printing object. A driver unit I/O 2105 drives various motors (suffixed with "M") and various solenoids (represented by "SO") shown in FIG. 43. A relay board 2107 supplies a driving signal to each head, receives information (i.e., information such as mounted/non-mounted state of the head and a head color) associated with each head, and supplies this information to the control board 2102. This information is transferred to the host computer H described above.

When the host computer H receives information of image data to be printed, the image data is stored in the image memory 2505 through a GPIB interface 1501 and a frame memory controller 2504 (FIG. 42). The image memory of this embodiment has a 124-Mbyte capacity, and the A1 size is constituted by 8-bit palette data. That is, eight bits are assigned for each pixel. A DMA controller 2503 performs high-speed memory transfer. At the end of transfer from the host computer H, predetermined processing is completed, and printing is started.

Although a description gets out of order, the host computer connected to the printing apparatus of this embodiment transfers image data as raster image data. Each recording head has an array of a plurality of ink discharge nozzles in the longitudinal direction, and image data must be converted into data matching the nozzle array of the recording head. This data conversion is performed by @BJ conversion controllers 2506. Data converted by the raster @BJ conversion controllers 2506 is enlarged by an enlargement function of enlargement controllers 2507 for variably enlarging the image data, and the enlarged data is then supplied to palette conversion controllers 2508. The data up to the enlargement controllers 2507 are data sent from the host computer. In this embodiment, this data is an 8-bit palette signal. The palette data (8 bits) is commonly supplied to processing units (to be described later) for the recording heads and is processed.

In the following description, eight recording heads are used. That is, yellow, magenta, cyan, and black recording heads and recording heads of the special colors S1 to S4 are used.

The palette conversion controllers 2508 supply the palette data input from the processing in FIGS. 29, 34, and 35 from the host computer H and the corresponding color conversion tables to conversion table memories 2509.

When the palette data is 8-bit palette data, the number of reproducible colors is 256 from 0 to 255. For example, tables shown in FIGS. 30 to 33 are developed in the corresponding color table memories 2509.

Detailed circuit arrangements will be described below. Each palette conversion table memory 2509 has a function of writing conversion data at an address position corresponding to the palette data. That is, when palette data is actually supplied as address data, the memory is cleared in a read mode. Each palette conversion controller 2508 manages the corresponding palette conversion table memory 2509 and interfaces with the control board 2102 and the corresponding palette conversion table memory 2509. A circuit (i.e., a circuit for multiplying an output 0 times to once) for setting a special color mixing amount can be inserted between each palette conversion table memory 2509 and a corresponding HS system consisting of an HS controller 2510 and an HS conversion table memory 2511 to variably set a value. In this case, the data shown in FIGS. 30 to 33 are transmitted, and then data for variably setting the value is then transmitted to set the transmitted data in the corresponding circuits.

Each HS conversion controller 2510 and the HS conversion table memory 2511 correct variations in printing density and discharge direction for each discharge port of each head on the basis of data measured by the head characteristic measuring means 2198. Data for a discharge port having a small ink discharge amount and a low recording dot density is converted to data representing a higher density, data for a discharge port having a large ink discharge amount and a high recording dot density is converted into data representing a lower density, and data for a discharge port having an intermediate ink discharge amount and a middle recording dot density is directly used.

A γ-conversion controller 2512 and a γ-conversion table memory 2513 constitute table conversion in which the density of the entire image for each color is increased or decreased. If no density conversion is performed, a linear table is obtained. That is, an output of "0" is obtained for an input of "0";
an output of "100", for an input of "100";
an output of "210", for an input of "210"; and
an output of "255", for an input of "255".

Each two-valued controller 2514 has a pseudo gradation function. The two-valued controller 2514 inputs 8-bit gradation data and outputs two-valued 1-bit pseudo gradation data. Methods of converting multivalue data into two-valued data are a method using a dither matrix and an error diffusion method. These methods can be employed in this embodiment, but a detailed description thereof will be omitted. Any method which can express gradation in the number of dots per unit area can be used.

The two-valued data are stored in series memories 2515 and are used as data for driving the recording heads. The two-valued data output from the respective series memories are output as data C, M, Y, BK, and S1 to S4. The two-valued signal of each color is subjected to various processing operations. In this case, only two-valued data C is exemplified with reference to FIG. 46. The arrangement in FIG. 46 is formed for the recording color of cyan. Identical arrangements are formed for the remaining recording colors. FIG. 44 is a block diagram showing the circuit arrangement connected to the output from the corresponding series memory 2515 in FIGS. 42 and 43.

The two-valued signal is output to a corresponding sequential multi-scanning generator (to be referred to as an SMS generator) 2522. In this case, test printing of the apparatus itself may be performed by corresponding two-valued PG controller 2517 and an EPROM 2518. The two-valued data is supplied to a selector 2519. This selection is controlled by the CPU in the control board 2102. When an operator performs a predetermined operation on the operation unit 2103 (FIG. 40), data from the two-valued PG controller 2517 is selected. Therefore, the selector 2519 generally selects the data from the two-valued controller 2514 (series memory 2516).

The SMS generator 2522 prevents image density variations caused by variations in discharge amount or direction of each nozzle. Multi-scanning is proposed in Japanese Patent Application No. 4-79858. The series memory 2524 is a buffer memory for correcting the physical position of the head space. The image data is temporarily stored in the series memory 2524 and is output at a timing corresponding to the physical position of the head. The capacity of the series memory 2524 varies depending on recording colors. Whether multi-scanning is performed to discharge inks from a plurality of discharge ports for each pixel so as to preferentially improve the image quality or multi-scanning is not performed to preferentially increase the speed can be designated in step SM21 in FIG. 27.

When the above data processing is performed, data is supplied to each head through the head delay board 2107.

Conventionally, palette conversion data, HS conversion data, and γ-conversion data are permanently held in a memory arranged in the apparatus unit. For this reason, such conversion data does not often match image data to be output, and sufficiently high image quality cannot often be obtained. In this embodiment, these conversion data are externally input, and the corresponding conversion table memories are arranged. For example, the palette conversion data shown in FIGS. 30 to 33 are downloaded in the conversion table memories 2509. That is, the conversion table memories 2509, 2511, and 2513 comprise RAMs. The palette conversion data and the γ-conversion data are transmitted from a host computer 2101. A head characteristic measuring instrument 2108 (FIG. 40) arranged outside the apparatus supplies the HS conversion data, so that data always matching the head state can be obtained. To obtain head characteristics of the respective recording colors by the head characteristic measuring instrument 2108, test printing operations (recording at a uniform predetermined intermediate density) with the respective recording heads, and the density distributions corresponding to the resultant recording widths are measured. The head state represents a difference between a desired density and the variations in discharge states of the plurality of nozzles included in the head or the density of the image printed with the heads.

In this embodiment, to prevent an abnormal output until a conversion parameter is input, "0" is output even if data shown in FIG. 45 is input, thereby inhibiting printing the data. This also applies to γ-conversion and the like.

Figure 46:
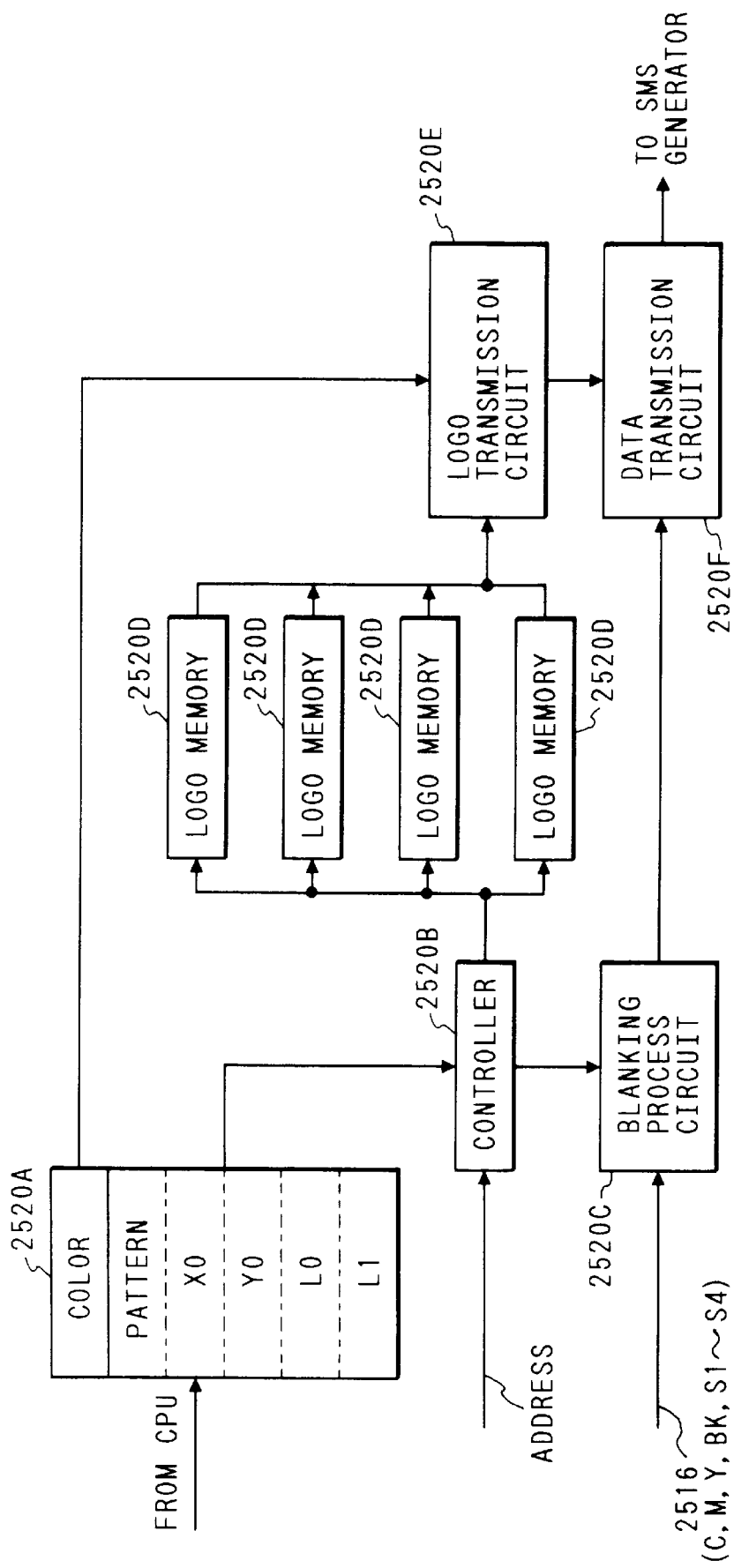
FIG. 46 is a block diagram showing an arrangement of a logo input unit in FIG. 44.

FIG. 46 shows an arrangement of a logo input unit 2520 shown in FIG. 44. This arrangement corresponds to the sequence (FIG. 36) executed by the host computer H.

All data, e.g., <color>, <pattern>, <X0>, <Y0>, <L0>, and <L1> transmitted from the host computer H in accordance with the above sequence are set in a register 2520A set in the control board 2102 in the printer P by the CPU 2102A. A controller 2520B is arranged using a counter and other circuit components and receives a signal (e.g., an address signal) for managing feeding in the main-scanning direction (X direction) and the sub-scanning direction (Y direction) of a cloth 2006 to form a logo at a position defined by L0 and L1 (FIG. 37). The controller 2520B also controls a blanking process circuit 2520C of two-valued image data 2516 so as to blank a logo printing range, i.e., the range determined by X0 and Y0 stored in the register 2520A, from the defined position. The blanking process circuit 2520C disables image data of this range upon reception of the control signal.

The controller 2520B designates one of logo memories 2520D which store the logos to be printed, on the basis of the pattern stored in the register 2520A. Four different logo patterns are available in this embodiment. That is, four logo memories are arranged. Each logo memory 2520D comprise two 4-Mbit ROMs which correspond to a maximum size determined by a maximum value (512 pixels) of the designatable X0 and a maximum value (2048 pixels=256 (the number of discharge ports)×8 (bands)) of Y0.

Figure 47A:
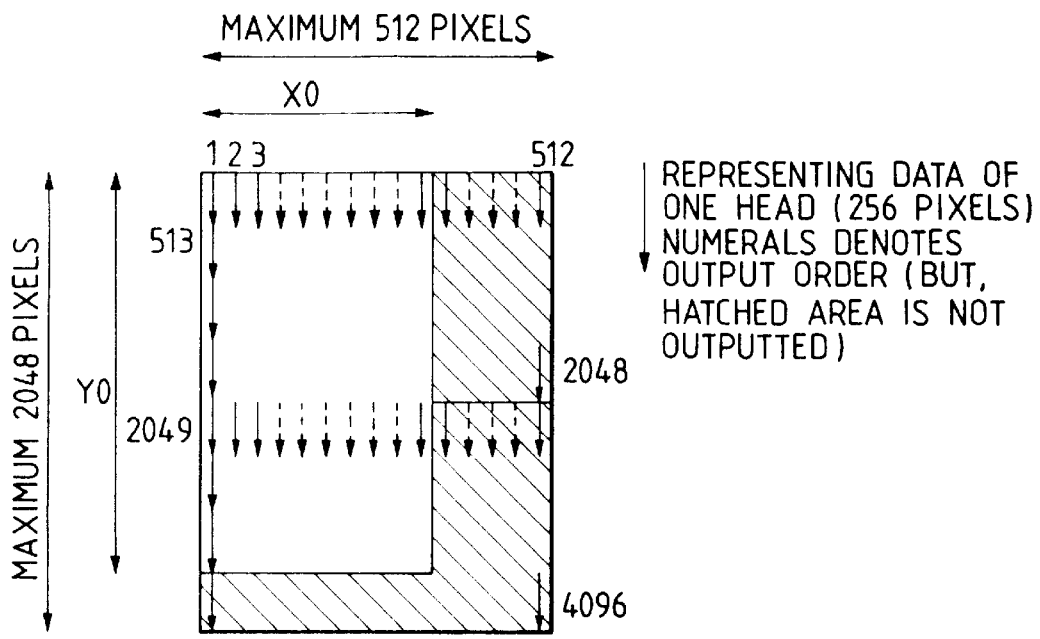
FIGS. 47A and 47B are views for explaining a correspondence between a logo image output range and a logo memory space.
Figure 47B:
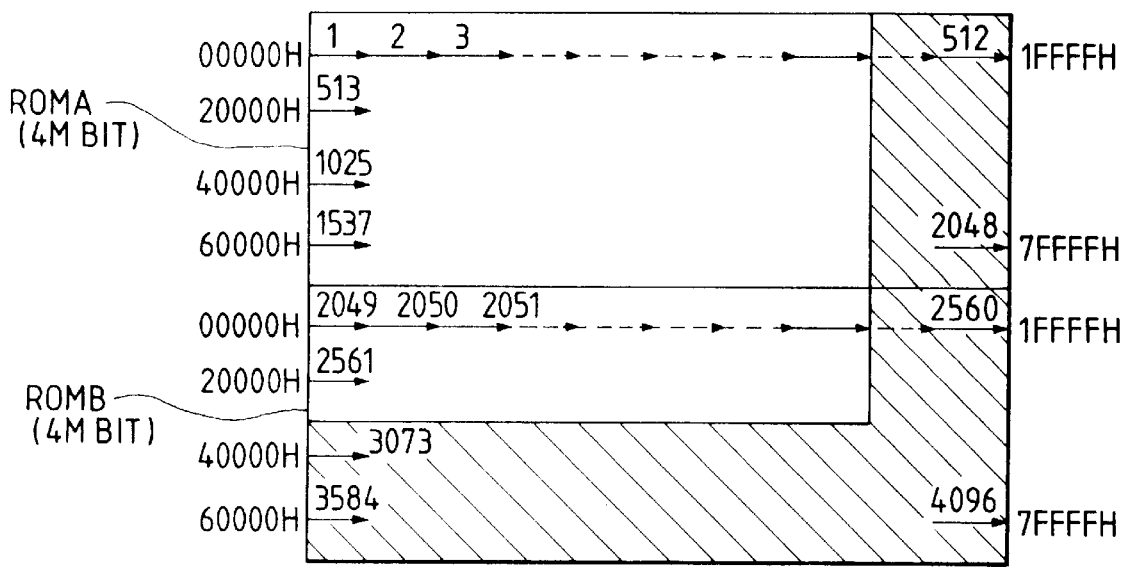

FIGS. 47A and 47B show a correspondence between a logo image output range and a space of the two ROMs (ROMA and ROMB). Hatched regions are non-output portions because they exceed the range designated by X0 and Y0.

Figure 48:
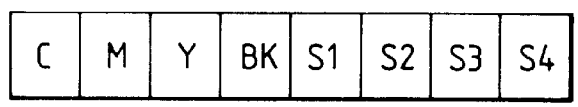
FIG. 48 is a view for explaining a data structure for one pixel in a logo memory.

As shown in FIG. 48, one pixel in the ROM is constituted by eight bits. Each bit is assigned with ON/OFF data of one color of the pixel.

Data read out from the logo memory 2520D designated by the controller 2520B is supplied to a logo transmission circuit 2520E. The logo transmission circuit 2520E is constituted by a selector and the like. This logo transmission circuit receives the pixel data shown in FIG. 48 and validates only data of a color designated by the logo color designation data (color) stored in the register 2520A. The validated data is supplied to a data transmission circuit 2520F. The data transmission circuit 2520F arranged using an OR circuit and the like transmits, to the SMS generator, data for printing the logo with the designated pattern in the designated color in the blanked region. The data transmission circuit 2520F transmits the image data 2516 directly for the remaining region to the SMS generator.

In this embodiment, the logo data is managed independently of the basic image data. Desired logo data can be inserted at a repetition period desired by the operator independently of the repetition period of the basic image and the types of repetition patterns shown in FIGS. 49A to 49E. In addition, the logo is inserted immediately before transmission of the basic image data to the head, i.e., in a blank of the designated range upon two-valuing. The logo mark is not influenced by various kinds of conversion and can be desirably (clearly) printed. As shown in FIG. 48, assignment of a 1-byte (8-bit) space for each pixel and each color improves memory utilization efficiency.

The CPU of the host computer H or the printer P may read out the contents of the logo memory to display the read data on the CRT 3026 of the host computer H or the operation display unit of the printer P.

In this embodiment, the logo memory comprises a ROM, but can be arranged using a memory such as a RAM or EPROM, and the contents of the memory may be updated by the host computer H. In this case, the host computer H forms a logo data file and stores it in an external memory with management numbers, thereby appropriately accessing the logo data file. When a RAM is used, it can be backed up with a battery so as to preserve the storage contents even in the power-OFF state. Alternatively, logo data may be transferred from the host computer H and developed in a memory area.

The number of logo memories, i.e., the number of logo data patterns is not limited to four.

In the printer P of this embodiment, a mode for performing two or more discharge operations for one pixel as in multi-scanning can be set. If high image quality of the logo is not required, third or subsequent discharge operations for the logo can be controlled to be inhibited. In this case, a gate circuit and the like for disabling the logo data so as not to perform the third or subsequent discharge operation may be added to the data transmission circuit 2520F in FIG. 46.

(3.3) Printing Pattern of Basic Image

In inputting image data of the basic image, the host computer H transmits an input image size $(X_{in}, Y_{in})$ in the form of a command and a parameter. This allows the CPU 2102A of the printer P to assure the input region of the image memory 2505. This input image size is stored in a predetermined parameter storage portion of the RAM 2102C. When the host computer H sequentially transmits image data to the printer P, the printer P receives this data. The received data is stored in the image memory 2505 through the FM controller 2504. The host computer H transmits the output form of the image data to the printer P. The printer P stores the image output form in the parameter storage portion of the RAM 2102C. The image output form can be one of the output types shown in FIGS. 49A to 49E.

FIGS. 49A to 49E are views showing image output forms in the present invention.

Figure 49A:
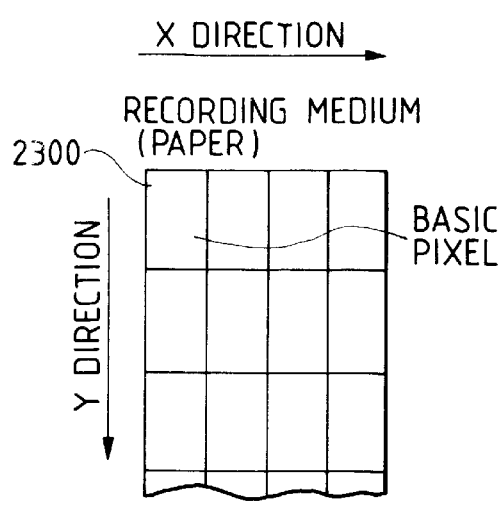
FIGS. 49A to 49E are views for explaining basic image forming patterns for a recording medium.
Figure 49B:
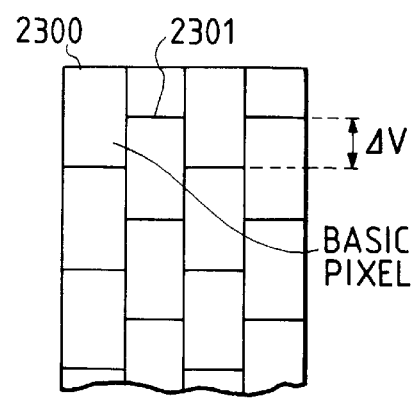
Figure 49C:
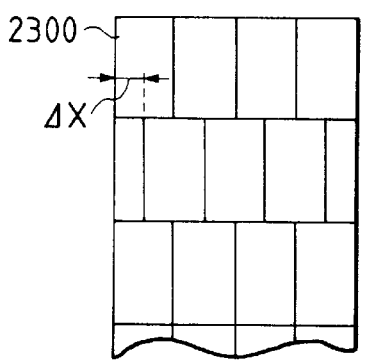
Figure 49D:
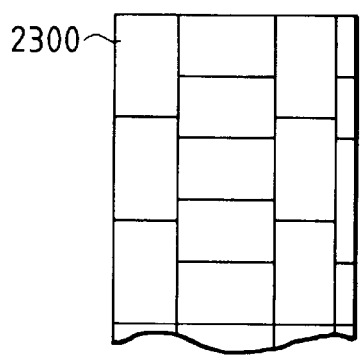
Figure 49E:
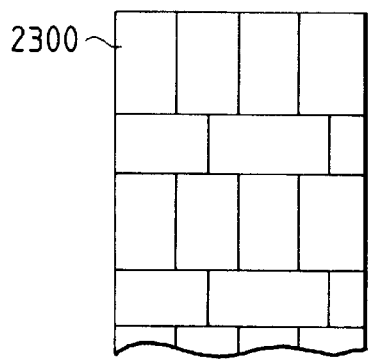

FIG. 49A shows a form (type 1) for periodically and repeatedly printing and outputting a basic image 2300 in the X direction (feed direction of the carriage 2001) and the Y direction (feed direction of the recording medium 2006). FIG. 49B shows an output form (type 2) for shifting every other basic image 2300 by a predetermined offset amount (shift amount) in the X direction and by $\Delta y$ in the Y direction when the basic data is periodically and repeatedly output. FIG. 49C shows a form (type 3) for shifting every other basic image 2300 by a predetermined offset amount in the Y direction and by $\Delta x$ in the X direction when the basic data is periodically and repeated output. FIG. 49D shows a form (type 4) for rotating the basic image 2300 (through 90° in FIG. 49D) and shifting the resultant image by an offset amount (offset "0" in FIG. 49D) in the Y direction as in the type 2 (FIG. 49B). Finally, FIG. 49E shows a form (type 5) for rotating the basic image 2300 (through 90° in FIG. 49E) and shifting the resultant image by an offset amount (offset "0" in FIG. 49E) in the X direction as in the type 3 (FIG. 49C).

Parameters for designating the output forms output from the host computer H include output types such as types 1 to 5, a basic image size $(X_b, Y_b)$, a full output image size $(X_{OUT}, Y_{OUT})$, an X-direction offset amount $\Delta x$, a Y-direction offset amount $\Delta y$, a rotation amount (every 90°), and the like in addition to the above parameters. These parameters are set under the following conditions.

$X_{in} \times Y_{in} \leq$ (Capacity of Memory 2505), $X_b \leq X_{in}$, $Y_b \leq Y_{in}$, $X_{OUT} \geq X_b$, $Y_{OUT} \geq Y_b$, $\Delta X \leq X_b$, and $\Delta y \leq Y_b$ The host computer H transmits a printing instruction of image data to the printer P in step MS25 in FIG. 27, so that the printer P starts a printing operation.

More specifically, the CPU 2102A controls a read timing of the memory 2505 in the address control unit arranged in the FM controller 2504, a starting timing of the motor driver 2023 and a starting timing of the head driver 2024 to control the printing timing of the cloth 2028 serving as the recording medium. The address control unit sequentially reads out image data from the memory 2505 in accordance with the parameters set in the parameter storage unit, and the readout data is output to the head driver 2024. The head driver 2024 forms driving signals for the recording heads 2002a to 2002d and the special color heads in accordance with the input image data and outputs the resultant data to the corresponding recording heads. In this manner, each recording head is driven by the recording head to discharge ink droplets to the cloth 2006, thereby printing an image corresponding to the image data.

The motor driver 2023 drives the feeding motor 2009 to feed the cloth 2006 to the printing position. The motor driver 2023 drives the carriage motor 2005 in a predetermined direction to move the carriage 2001 in the direction indicated by the arrow D, thereby recording the image (FIG. 38). When one-scanning printing is finished, the carriage motor 2005 is rotated in the reverse direction to move the carriage 2001 in the direction indicated by the arrow E. The carriage 2001 is thus returned to the home position. The feeding motor 2009 is rotated to move the recorded cloth 2006 by a one-scanning width of the cloth in the Y direction or by less than a one-multi-scanning amount in the multi-scanning mode. The above timings of one reciprocal movement of the carriage 2001 constitute a basic cycle. The printing operation speed of the recording head serves as the reference of the printing timing.

When the printer P repeats the above-mentioned operations and an image having a size designated by the full output image size $(X_{OUT}, Y_{OUT})$ is completely printed, the printer P stops the operations of the motor driver, the head driver, the FM controller 2504, and the like. The printing mode is ended to wait for an input from the host computer H and the operation display unit 2103.

FIG. 50 is a block diagram showing internal arrangements of the parameter storage unit and the address control unit in this embodiment.

Referring to FIG. 50, the parameter storage unit includes storage units 2830 to 2836 such as registers. The register 2830 stores the full output image size $(X_{OUT}, Y_{OUT})$. The register 2831 stores the basic image size $(X_b, Y_b)$. The register 2832 stores the numbers $(N_x, N_y)$ of repetitions in the X and Y directions to repeatedly output the basic image. The register 2833 stores the output type. The register 2834 stores the offset amount $\Delta x$ in the X direction. The register 2835 stores the offset amount $\Delta y$ in the Y direction. The register 2836 stores the rotation amount R.

Note that $N_x = INT(X_{OUT}/X_B)$ and $N_y = INT(Y_{OUT}/Y_b)$ where INT(a) indicates that the first decimal part of a number a is rounded up if the number a is a fraction. For example, INT(1.2)=2.

These registers are connected to the corresponding parts of the address control unit in accordance with the output form of the input image data (more specifically, such a register is used as a reference value of a comparator to be described below).

Referring to FIG. 50, an X address generator A 2837 counts addresses (XADRA) in the X direction of the basic image 2300. A Y address generator A 2838 counts addresses (YADRA) of the basic image 2300 in the Y direction. An X address generator B 2839 and a Y address generator B 2840 count X- and Y-direction addresses (XADRB and YADRB) of the basic image 2300 shifted in the X or Y direction as in the image output types 2 and 3 (FIGS. 49B and 49C). Each of these address generators 2837 to 2840 is constituted by a counter for outputting an actual address and a comparator for comparing to determine whether the address exceeds the size of the basic image or the full image size.

A block counter 2841 counts the numbers of repetitions of the basic image 2300 in the X and Y directions. The block counter 2841 mainly comprises a counter and a comparator. A selector 2842 selects one of the address (XADRA) in the X direction or the X address (XADRB) shifted in the X direction. A selector 2843 selects one of the address (YADRA) in the Y direction or the Y address (YADRB) shifted in the Y direction as in the selector 2842. A timing generation unit 2844 generates various read signals (e.g., CS, ADR, RAS, CAS, and WE) and various timing signals (e.g., IN, OUT, VE, and PE) on the basis of the addresses (XADR and YADR) from the selectors 2042 and 2043.

The memory 2505 is constituted by at least one commercially available D-RAM (dynamic RAM) module. The read signals of the memory 2009 are a chip select signal CS for selecting the module, a signal ADR which time-assigning a row address (YADR) and a column address (XADR), a row address strobe signal RAS, a column address strobe signal CAS, and a write enable signal WE. The timings of these signals are shown in FIG. 51.

Figure 51:
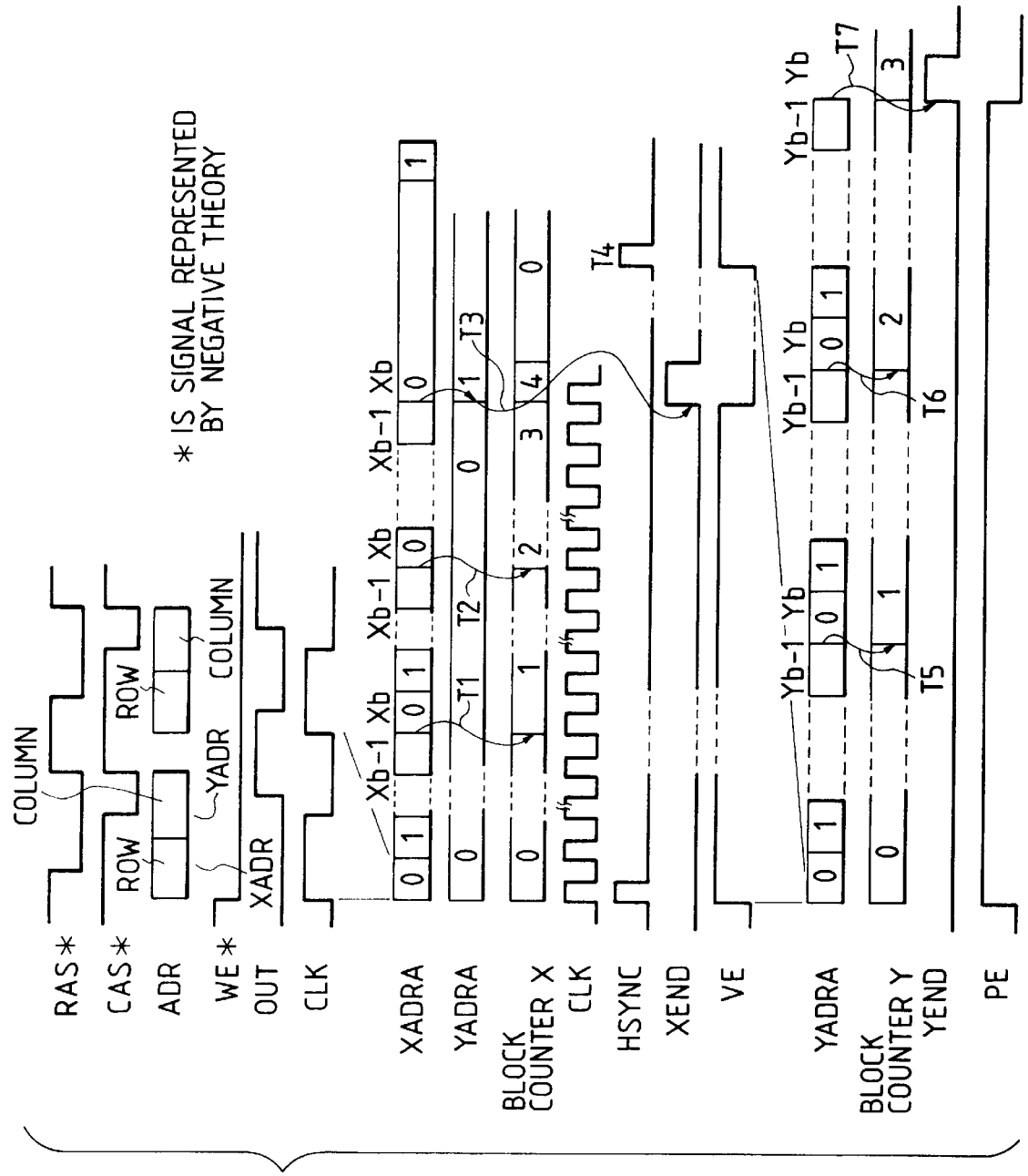
FIG. 51 is a timing chart showing output timings of signals in a memory control unit when an image output (type 1) by the printer of this embodiment is to be output.
Figure 52:
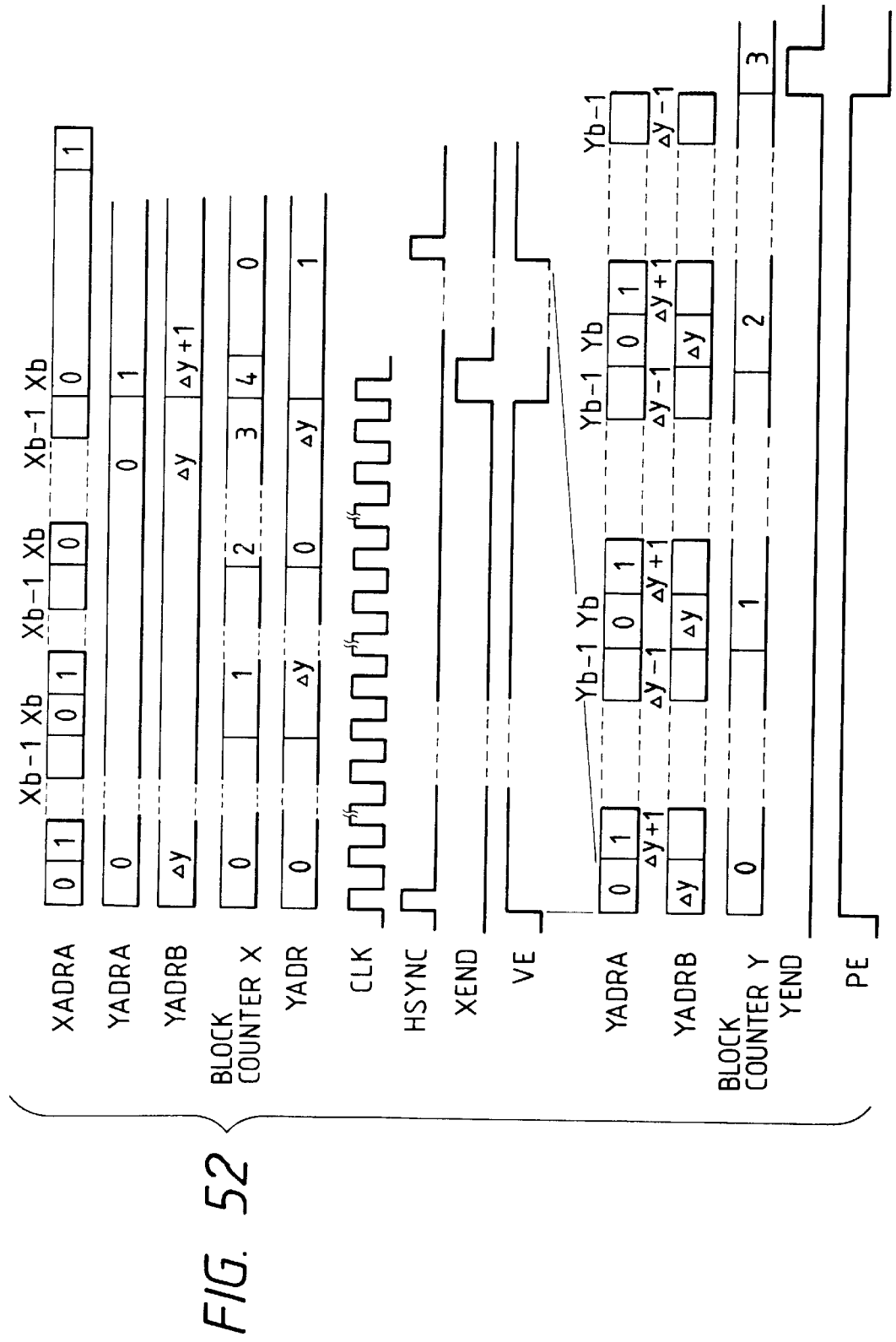
FIG. 52 is a timing chart showing output timings of signals in the memory control unit when an image output (type 2) by the printer of this embodiment is to be output.

The various timing signals include a latch timing signal IN of a latch circuit for temporarily holding image input data, a latch timing signal OUT of a latch circuit for temporarily holding image output data, a video enable data VE representing effective data of each raster, and a page enable signal PE representing an effective raster in one page (FIGS. 51 and 52).

The operations of the respective parts of the address control unit for outputting an image having the type 1 shown in FIG. 49A will be described with reference to FIG. 51.

When the start of printing is designated from the host computer H or the operation display unit 2103, the CPU 2102A outputs a start signal START to the address control unit to clear the X address generator A 2837 and the Y address generator A 2838 (i.e., both XADRA and YADRA are reset to "0"). At the same time, the CPU 2102A renders the address generators 2837 and 2838 operative. At the same time, the CPU 2102A renders the timing generation unit 2844 and the block counter 2841 operative.

Of all output reference timing signals 2500 (e.g., an image output clock CLK, a raster sync signal HSYNC, and the start signal START), the start signal START is set at high level (enabled). When the horizontal sync signal HSYNC rises, the timing generation unit 2044 sets both the signals VE and PE to high level, as shown in FIG. 51. While the signals VE and HSYNC are set at high level, the signals RAS, CAS, ADR, WE, and OUT are output to the memory 2505 in synchronism with the signal CLK to read out image data from the memory 2505. While the signal VE and PE are set at high level, the read address is controlled by the memory 2505, thereby determining the read and output positions of the image data.

Address control in the address control unit will be described below.

An output from the X address generator A 2837 is cleared to "0" when the horizontal sync signal HSYNC goes to high level. An output (XADRA) from the X address generator A 2837 is incremented one by one. When its count value becomes "$X_b$" (the length of the basic image size in the X direction), a ripple carry signal (XARC) is output to the block counter 2041 to clear its output address (XADRA) to "0" (timings T1 to T3 in FIG. 51). That is, the carry signal (XARC) is a result obtained when "$X_b$" as the basic image size stored in the basic image size register 2831 and an output from a counter for counting the signal CLK are compared by a comparator (not shown).

During this operation, the block counter 2841 outputs selection signals XSEL and YSEL of high level to select the address (XADRA) from the X address generator A 2837 and the address signal (YADRA) from the Y address generator A 2838. When a carry signal (XARC) from the X address generator 2836 is received, a block count X in the X direction is incremented by one. When the block count X reaches the number $N_x$ of repetition in the X direction (timing T3), a signal YCNT for counting up an address signal from the Y address generator A 2838 by one is output. A signal XEND signaling the end of one-raster image data in the X direction is set at "1" (enabled).

Meanwhile, the timing generation unit 2844 generates the address signal ADR and the chip select signal CS for the memory 2505 on the basis of the address signal (XADR) from the selector 2042 and the address signal (YADR) from the selector 2043 and outputs the signals RAS, CAS, WE, ADR, CS, and OUT to the memory 2505 in synchronism with the output reference timing signal 2500, thereby reading out the image data therefrom. When the signal XEND output from the block counter 2841 to the timing generation unit 2844 goes to "1", the timing generation unit 2844 temporarily sets the signal VE to low level (disabled) (timing T3) and stops generating the respective signals to stop reading out the image data from the memory 2009. When the signal VE goes to low level, the X address generator 2837, the Y address generator 2838, and the block counter 2841 are stopped.

When the horizontal sync signal HSYNC as the start of the next raster rises, the above operations are repeated to sequentially count up the Y address generator A 2838.

Printing of each raster is performed. When the value of the Y address (YADRA) output from the Y address generator A 2838 coincides with the length "$Y_b$" of the basic image size in the Y direction (timings T5 to T7), the Y address generator A 2838 outputs a carry signal (YARC) to the block counter 2841 and clears the signal (YADRA) to "0".

Upon reception of the carry signal (YARC) from the Y address generator 2838, the block counter 2041 increments the block count Y in the Y direction by one. It is then checked if this value becomes equal to the number $N_y$ of repetition. If so, the Y address generator 2838 sets the signal YEND representing an end of all read access of the Y direction to high level (enabled) (timing T7). When the signal YEND goes to "1", the timing generation unit 2844 sets the signal VE and PE to low level (disabled). At the same time, the timing generation unit 2844 stops outputting the respective signals, thereby finishing image read of one cloth. When the signal PE goes to low level, the counting operations of the X address generator A 2837, the Y address generator A 2838, and the block counter 2841 are stopped.

The number $N_y$ of repetition may be transmitted together with a command from the host computer H, calculated in step MS13 (FIG. 27), or set on the operation display unit 2103.

An operation of the address control unit in outputting the image of the type 2 (FIG. 49B) will be described with reference to a timing chart in FIG. 52.

The basic operations of this timing chart are the same as the operation for outputting the image of the type 1 in FIG. 51, except for validation of the operation of the Y address generator B 2840 and selection of the selector 2843.

More specifically, the block counter 2841 switches the selector 2843 to high/low level in synchronism with the X-direction block count of the block counter 2841 in response to the selection signal YSEL. The signal (YADRA) from the Y address generator A 2838 and the sinal (YADRB) from the Y address generator B 2840 are switched to switch the Y address YADR every block.

The Y address generator B 2840 is not cleared to "0" at the leading edge of the horizontal sync signal HSYNC, but is loaded with the offset amount Δy in the Y direction at this timing. The Y address generator B 2840 compares the length "$Y_b$" of the basic image size in the Y direction with the output (YADRB) from the Y address generator B 2840. When the output (YADRB) becomes equal to "$Y_b$", the Y address generator B 2840 is cleared to "0". At this time, the carry signal YBRC is not output, and the block counter 2041 increments the block counter Y in response to the carry signal (YARC) from the X address generator A 2837.

This timing is shown in detail in FIG. 52. For example, when the first one-scanning portion of the basic image 2300 in FIG. 49B is to be printed, the output (YADRA) from the Y address generator A 2838 is selected as the Y address (YADR) input to the timing generation unit 2844 to set the Y address to "0". When the first one-scanning portion of the right image region (an offset portion) is to be printed, the output (YADRB) from the Y address generator B 2849 is selected and set to be "Δy". In the third image region (no offset), the Y address (YADR) returns to "0". In the next offset region, the Y address is set to "Δy" again.

In the second scanning cycle for printing these image regions, the output (YADRA) from the Y address generator A 2838 is selected to set the Y address (YADR) to "1" for a non-offset image region. The output (YADRB) from the Y address generator B 2840 is selected to set the Y address to "Δy+1".

After a line 2301 in FIG. 49B is output, the output (YADRB) from the Y address generator B 2840 becomes equal to "$Y_b$" of the basic image size, and the Y address generator B 2840 is cleared to "0".

The type 3 in FIG. 49C is different from the type 2 in that the type 3 is offset in the X direction while the type 2 is offset in the Y direction. In the type 2, when the selector 2843 selects the outputs from the Y address generator A 2838 and the Y address generator B 2840 to form the Y address (YADR). In the type 3, however, the selector 2842 must be controlled to select one of the outputs from the X address generator A 2837 and the X address generator B 2839 and output the selected output as the X address (XADR).

More specifically, the block counter 2841 switches the selection signal XSEL between high and low levels in synchronism with the Y count value from the block counter 2841 to switch between the address (XADRA) output from the X address generator A 2837 and the address (XADRB) output from the X address generator B 2839 for each block. The selected output is supplied to the timing generation unit 2844. The X address generator B 2839 is not cleared to "0" at the leading edge of the HSYNC, but is loaded with the offset value "Δx" in the X direction at this timing. The X address generator B 2839 compares the width "$X_b$" of the basic image size in the X direction with its output (XADRB). When the output (XADRB) exceeds "$X_b$", the X address generator B 2839 does not output a ripple carry (XBRC). The X address generator B 2839 is cleared to "0". The block counter 2041 increments the value of the block counter X in response to a carry (XARC) from the X address generator A 2837.

The types 4 and 5 are useful if a ratio of the horizontal "$X_b$" to the vertical "$Y_b$" of the basic image size is an integer because the resultant image is geometrically beautiful. If $X_b=Y_b$ (the basic image has a square shape), then patterns can be regularly arranged in a matrix form, and constitution is relatively facilitated. Switching between XADR and YADR and the count directions (count-up/count-down) of the address generators 2837 to 2840 can be easily realized by the rotation amount R.

In rotation of the basic image, in addition to address control, a rotation processing unit can be inserted in a pipeline manner. Before image data is actually output by address control, an image obtained by rotating the basic image through 90° is formed and stored in the image memory by the number of basic images, and image data including rotated images can be easily output at high speed.

The block counter 2841 counts blocks of the basic image and outputs the full output image size ($X_{OUT}, Y_{OUT}$). However, the arrangement of the block counter 2841 is not limited to this. In particular, when $X_{OUT}$ and $Y_{OUT}$ are not multiples of $X_b$ and $Y_b$, $X_{OUT}$ and $Y_{OUT}$ cannot be defined by only the block count. Remaining pixels $X_r = X_{OUT} - N_x \times X_b$ for $N_x = INT(x_{OUT}/X_b) - 1$ are used to compare the numbers $N_x$ of repetitions and the remaining pixels $X_r$ to determine whether the remaining pixels reach $X_{OUT}$. This also applies to the Y direction.

When the printing speed of the recording head is low and the image output clock frequency is low, it is possible to realize address formation by software using the CPU or the like. Part of the memory can be replaced with a counter, and part of the arrangement in FIG. 50 can be replaced with software.

In this embodiment, image data output to the recording head is arranged in a raster form, and the image data arrangement depending on each recording head is changed by the raster @BJ conversion controller 2506 (FIG. 42). The present invention, however, is not limited to this. The arrangement of the image data stored in the memory 2505 may be identical to that of the image data output to the recording head. If their arrangements are different from each other, the image data may be arranged to match the nozzle array of the recording head when the image signal is output to the head driver.

Figure 53:
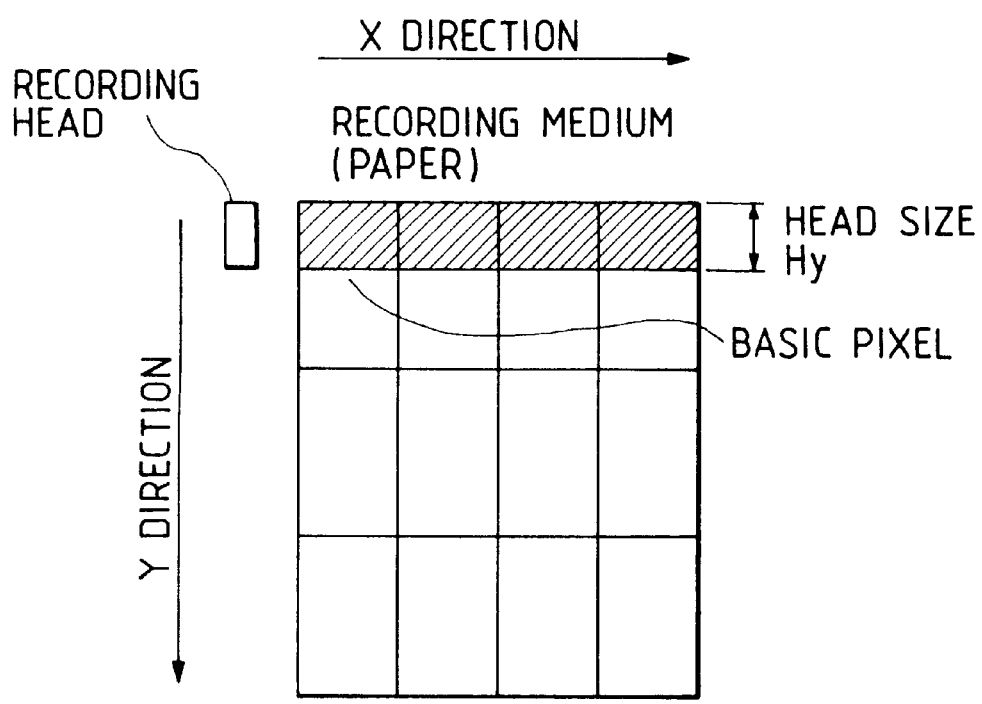
FIG. 53 is a view for explaining an actual image output at the printer of this embodiment.

In the mechanical structure of the printer P according to this embodiment, as shown in FIG. 53, a recording head having a recording range of a width $H_y$ in the Y direction is scanned in the X direction to obtain an image output.

In this case, it is possible to obtain the above image output by a two-stage arrangement of a counter (and a comparator) for counting only $H_y$ from the Y address generator 2838 and the Y address generator B 2040 of the address control unit of the FM controller 2504 in the Y direction, and a counter (and a comparator) for counting a ripple carry from the $H_y$ counter (and the $H_y$ comparator).

It is also possible to read out an image in the $H_y$ width in the Y direction for each $X_{OUT}$ (this is called a band unit) in the X direction. At this time, an upper counter for the Y address generator A 2838 and the Y address generator B 2840 in the Y direction need not be used, but only a lower counter (i.e., an $H_y$ counter) is required. More specifically, the CPU 2102A may load a defined Y-direction address (Y address of the first image data for each band to be printed this time) may be loaded in the $H_y$ counter every time an image is output for each band, and then a count-up operation may be started.

(3.4) Download of Conversion Data and Parameters

Figure 54:
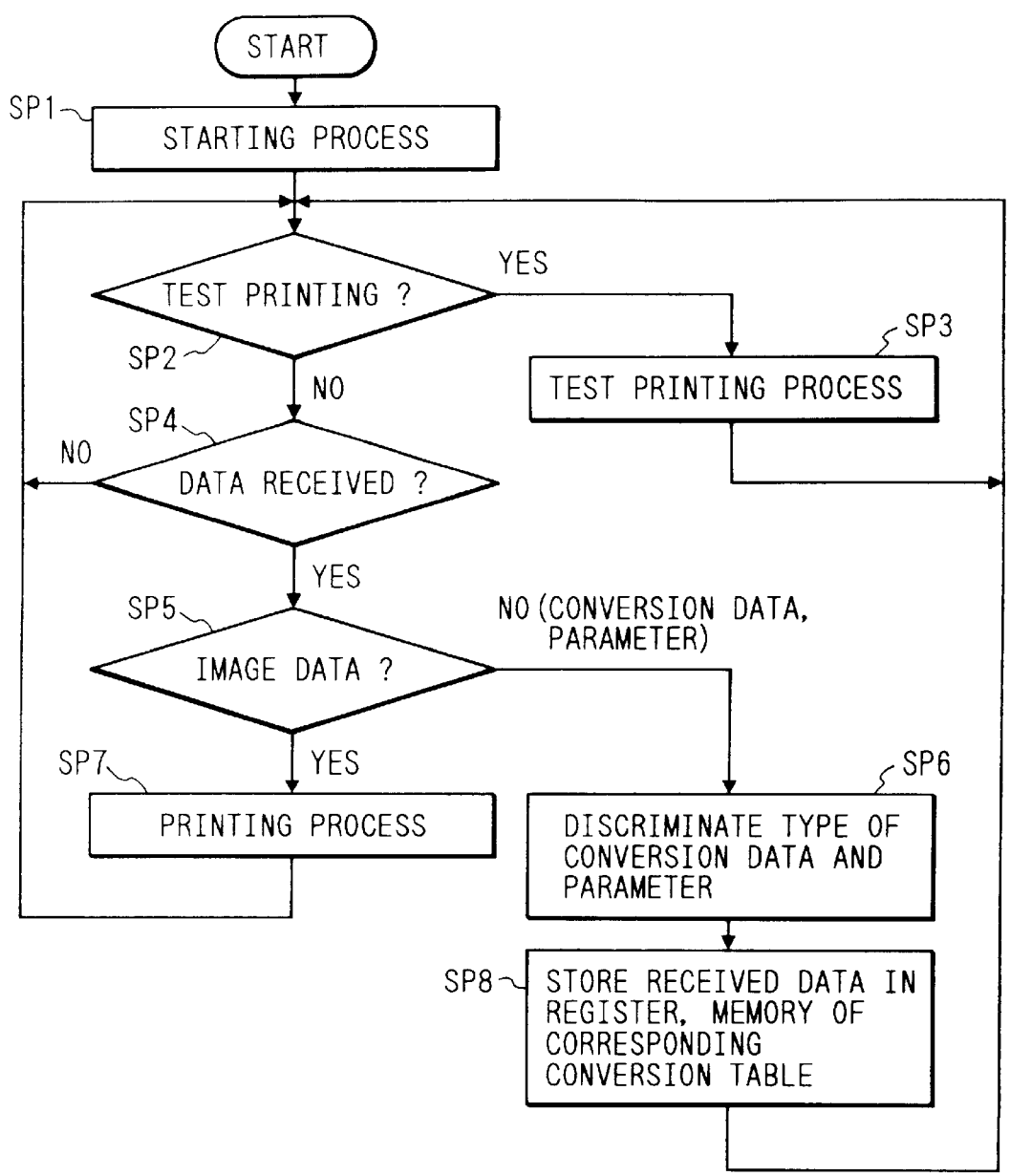
FIG. 54 is a flow chart showing a sequence for setting conversion data and parameters in the respective memories and the respective registers shown in FIG. 43.

To download the various conversion data described above to the conversion tables through the corresponding conversion controllers, or to store various parameters set from the host computer H and at the operation display unit 2103 in the corresponding predetermined registers, the apparatus of this embodiment performs processing in accordance with a flow chart in FIG. 54. The operation of the apparatus will be described below. The program of this processing is stored in the ROM 2102B arranged in the control board 2102 and is executed by the CPU 2102A.

When the power switch of the system is turned on, the printer P is started in step SP1. In this starting process, the starting process operations of the conversion tables 2509, 2511, and 2513 for the respective recording colors are also included.

It is determined in step SP2 whether a test printing instruction is received from the host computer H or the operation display unit 2103. If YES in step SP2, the test printing process is performed in step SP3. In this case, as described above, an instruction signal is output so that the selector 2519 for each color selects data from the corresponding two-valued PG controller, thereby performing the printing process.

If an instruction is not input from the host computer H or the operation display unit 2103, the flow advances to step SP4 to determine whether data is received through the GPIB interface 2501. If YES in step SP4, the flow advances to step SP5 to determine whether the received data is the image data or the conversion table data or parameter. Whether the received data is the image data is determined by translating a control command located at the start of the received data. In particular, when the received data is the conversion table data or parameter, identification data is added to represent a specific recording color, a specific destination conversion table, or a specific parameter for specific control.

If it is determined that the received data is the image data, the flow advances to step SP7 to execute the printing process based on its image quality.

If it is determined that the received data is the conversion table data or parameter, the flow advances to step SP6 to translate the control command to determine a specific recording color, a specific destination conversion table, or a specific parameter. In step SP8, the received data based on the discrimination result are stored in the conversion table and the register through the corresponding conversion controller and the CPU.

Figure 55:
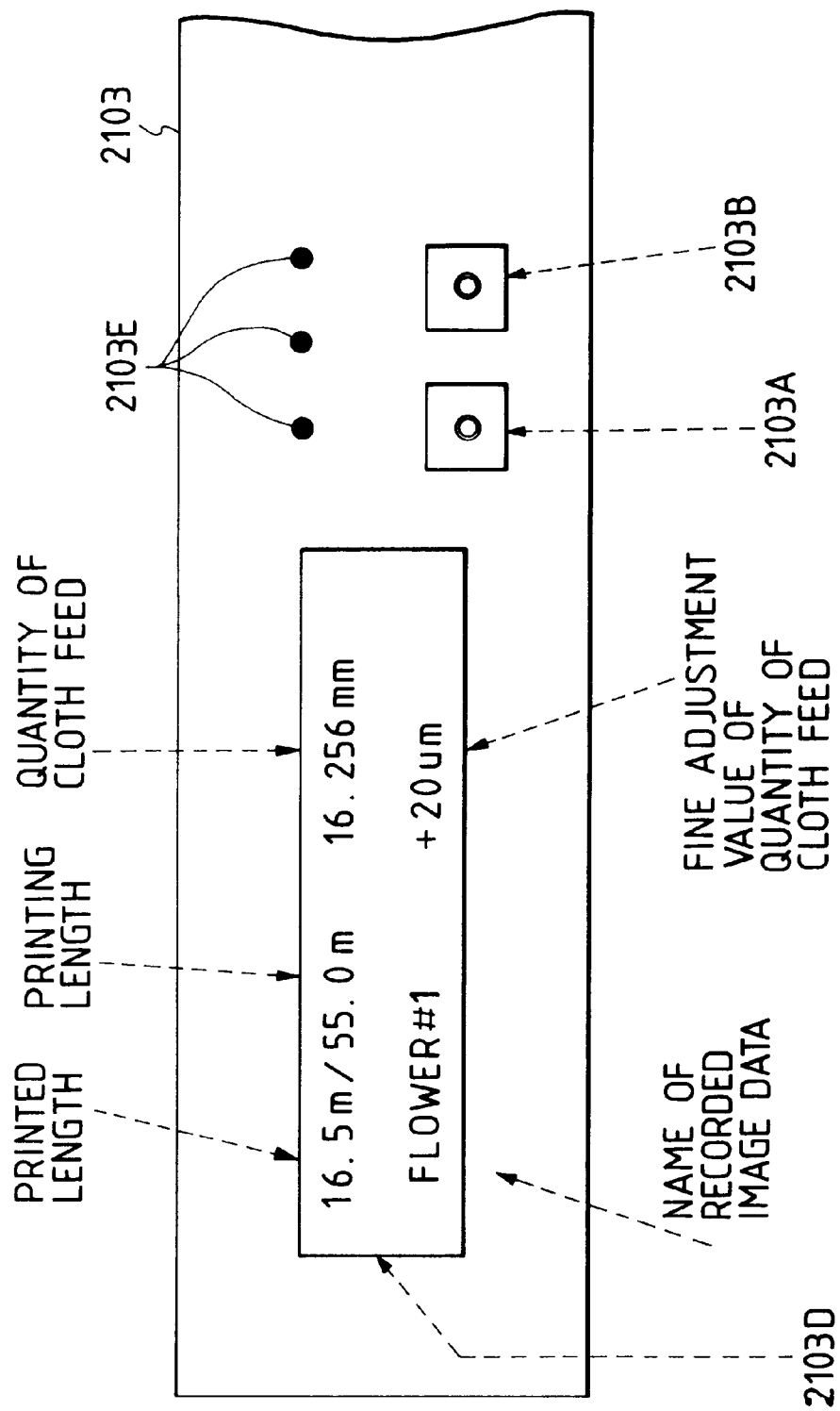
FIG. 55 is a plan view sowing the main part of an operation display unit in the printer.

Information set in the host computer H and the operation display unit 2103 and others can be displayed on the display on the operation display unit 2103. FIG. 55 shows the display contents on the display. The length of a printed cloth 2006, the overall length of the cloth, the quantity of the cloth feed, and the like are displayed on a display 2103D in FIG. 55. Various parameters, a mode, and the like set in the host computer H or operation buttons of the operation display unit may also be displayed, as a matter of course. The operation display unit in FIG. 55 includes various error lamps 2103E, a stop button 2103A, and an emergency stop button 2103B. The stop button 2103A and the emergency stop button 2103B are used to set a stop mode for assuring continuity of the print output and a stop mode for not assuring this continuity.

(4) Other Arrangements

In the above embodiments, the host computer H supplies the image data in the form of color palette data to the printer P. The printer P performs printing using C, M, Y, and BK and the special colors S1 to S4 on the basis of the color palette conversion tables. However, in the following description, the host computer H supplies image data as R. G, and B luminance data to the printer P.

In this arrangement, almost the same arrangement as the system described above can be used. The image memory 2505 in FIG. 42 does not store image data in the form of palette data, but stores image data expressed in the form of R, G, and B luminance data. The arrangement in FIG. 43 is replaced with that in FIG. 56.

Figure 56:
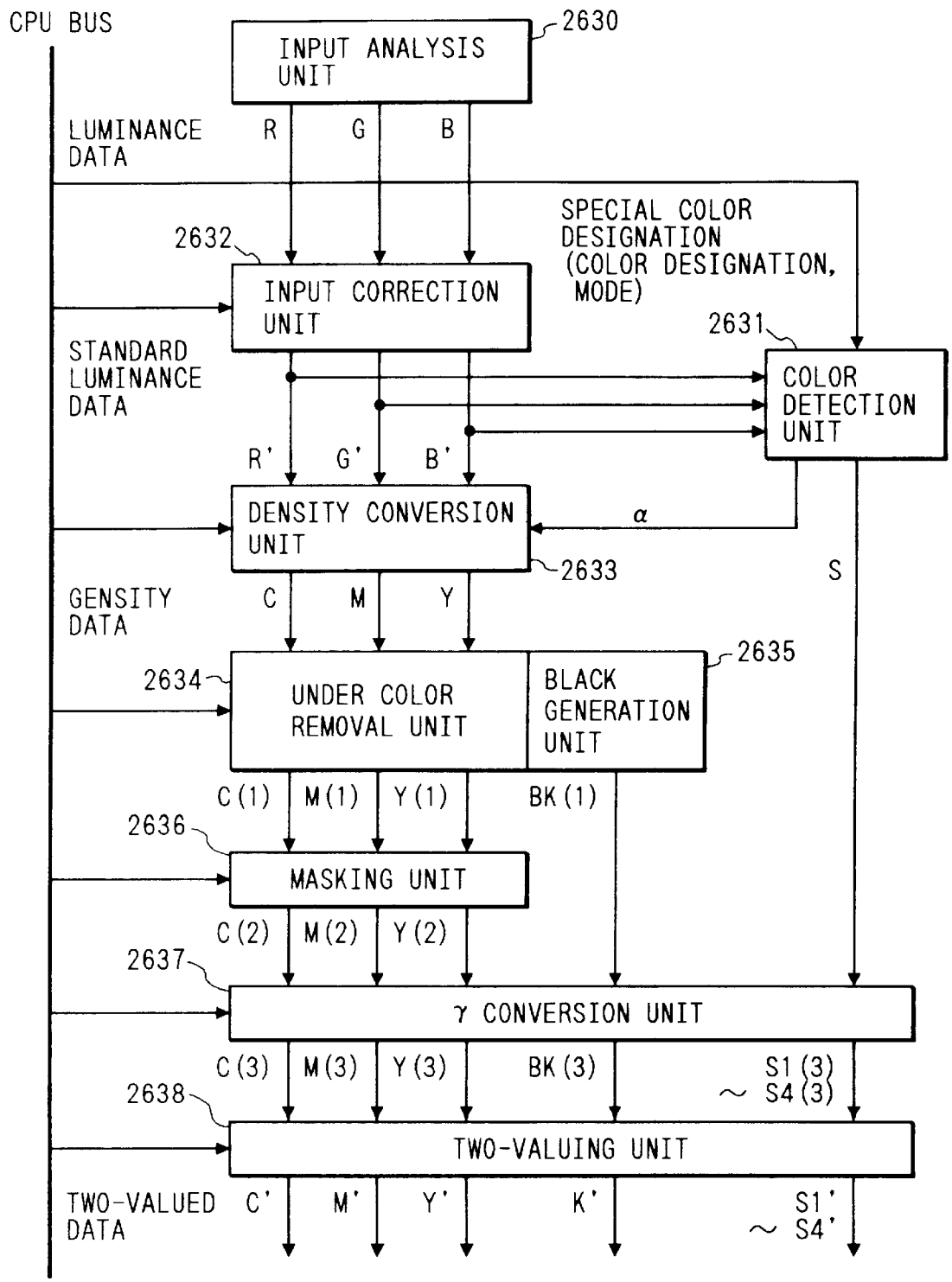
FIG. 56 is a block diagram showing another arrangement of the main part of the control board in FIG. 40 so as to mainly explain a data flow.

FIG. 56 shows an arrangement of an image processing unit for converting R. G, and B signals and the like into C, M, Y, and BK signals or generating S1 to S4 special color signals.

In this arrangement, the host computer H transmits color image data in the form of R, G, and B components to the printer P, and the printer P receives the image data R, G. and B. The CPU 2102A sets and controls the timings of the image data processing unit, the recording head driver 2024, the motor driver 2023, and the like arranged in the control board 2102 to apply the cyan (C), magenta (M), yellow (Y), black (BK), and S1 to S4 inks to the cloth 2006 to form and output a color image.

Referring to FIG. 56, an input correction unit 2632 receives the image data (luminance data) R, G, and B supplied from the memory 2505 through the controllers 2504, 2506, and 2507 and converts the input data into standard luminance data R', G', and B' (e.g., R, G, and B in the NTSC scheme of color television) in consideration of the spectral characteristics and dynamic range of the input image. A density conversion unit 2633 converts the standard luminance data R', G', and B' into density data C, M, and Y using nonlinear conversion such as logarithmic conversion. An undercolor removal unit 2634 and a black conversion unit 2635 perform the following undercolor removal and black generation in accordance with the density data C, M, and Y, an UCR amount β, and a blackening amount σ.

C(1)=C−β×MIN(C,M,Y)
M(1)=M−β×MIN(C,M,Y)
Y(1)=Y−β×MIN(C,M,Y)
K(1)=σ×MIN(C,M,Y)

A masking unit 2636 corrects unnecessary absorption characteristics of inks for undercolor-removed C(1), M(1), and Y(1) as follows.

C(2)=A11×C(1)+A12×M(1)+A13×Y(1)
M(2)=A21×C(1)+A22×M(1)+A23×Y(1)
Y(2)=A31×C(1)+A32×M(1)+A33×Y(1)

where Aij (ij=1 to 3) are masking coefficients.

A γ conversion unit 2637 converts the data C(2), M(2), Y(2), and BK(l) into gamma-corrected data C(3), M(3), Y(3), and BK(3) (the input data are corrected to have a linear relationship with the image density output with inks corresponding to the signals of C(3), M(3), Y(3), and BK(3)).

In this case, each recording head is a two-valued recording means, i.e., has two states, that is, a discharge state and a non-discharge state. A two-valuing unit 2638 converts multivalue data C(3), M(3), Y(3), and K(3) into two-valued data C', M', Y', and BK' which allow pseudo gradation formation. The values C', M', M', and BK' are output to the circuit unit shown in FIG. 44.

A color detection unit 2631 is arranged to generate an instruction for converting predetermined R, G, and B ranges (R', G', and B' supplied from the input correction unit 2632) on the chromaticity diagram into the special colors S1 to S4 and performing printing in accordance with a special color instruction supplied from the CPU 2102A. This designation signal is supplied as a signal S to the γ conversion unit 2637. The γ conversion unit 2637 outputs appropriate special color signals S1(3) to S4(3). These special color signals are converted into two-valued signals by the two-valuing unit 2638, thereby generating signals S1' to S4'.

Figure 57:
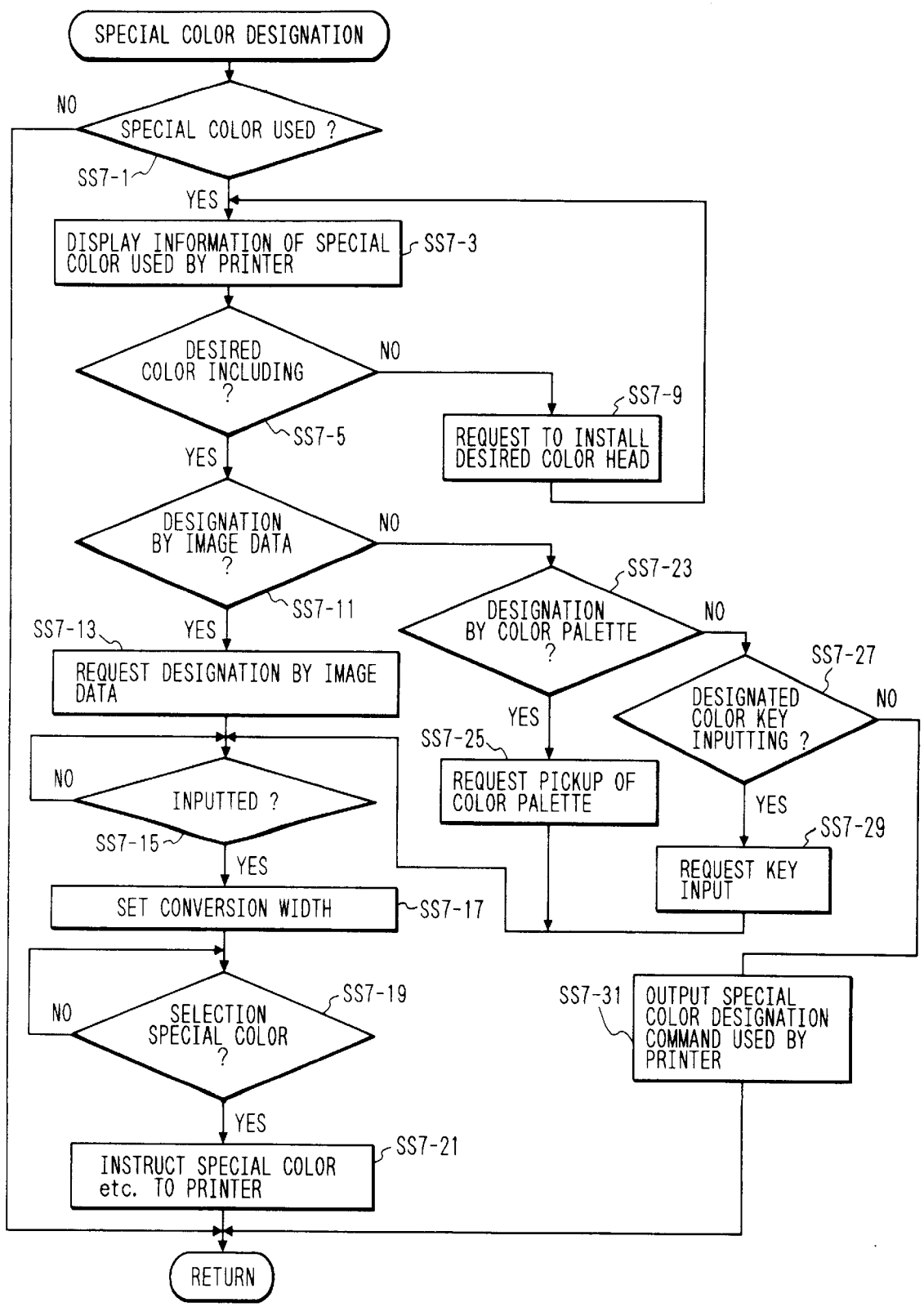
FIG. 57 is a flow chart showing a special color designation sequence which can be employed by a host computer for the arrangement in FIG. 56.

FIG. 57 is a special color designation sequence performed by the host computer H to the arrangement in FIG. 51. In this sequence, in principle, desired chromaticity ranges of three colors, i.e., R, G, and B are designated to determine a predetermined range on the chromaticity diagram. The colors included in this range are replaced with desired special colors.

In this sequence, the operations of steps SS7-1 to SS7-7 are performed first. When a recording head of a desired color is mounted, it is determined in step SS7-11 whether a color of the original data displayed on the CRT 2026 is directly designated. If YES in step SS7-11, designation by image data is requested in step SS7-13. If it is determined in step SS7-15 that the designation is inputted, designation for the conversion widths of the R, G, and B to the special colors is awaited. In this designation, a minimum value (min) and a maximum value (max) of the conversion width for each of the R, G. and B colors are designated. A desired special color is selected in step SS7-19. For example, if the number of special colors are four, i.e., the special colors S1 to S4, designation is performed with numbers assigned to the respective special colors.

When the conversion range and the special colors are designated as described above, designation is performed for the printer P in step SS7-21. The command format in this designation is given following an identification code <WCOLOR>:

"<Rmin>, <Rmax>, <Gmin>, <Gmax>, <Bmin>, <Bmax>, <byte>"

The above format indicates that a special color designated by "<byte>" is used for data within the range of the chromaticity diagram determined by the following conditions:

Rmin≦R≦Rmax, Gmin<G<Gmax, and Bmin<B<Bmax

If NO in step SS7-11, the flow advances to step SS7-23 to determine whether a color associated with conversion is designated using a color sample table on the CRT screen used in a computer having a color graphic function. If YES in step SS7-23, this designation is requested in step SS7-25. The flow then advances to step SS7-15 to perform the same operations as described above.

If NO in step SS7-23, the flow advances to step SS7-27 to determine whether color information associated with conversion is designated with a key. If YES in step SS7-27, this is prompted, and the flow advances to step SS7-15. If NO in step SS7-27, the special colors currently used in the printer P are used, and the processing is ended.

Figure 58:
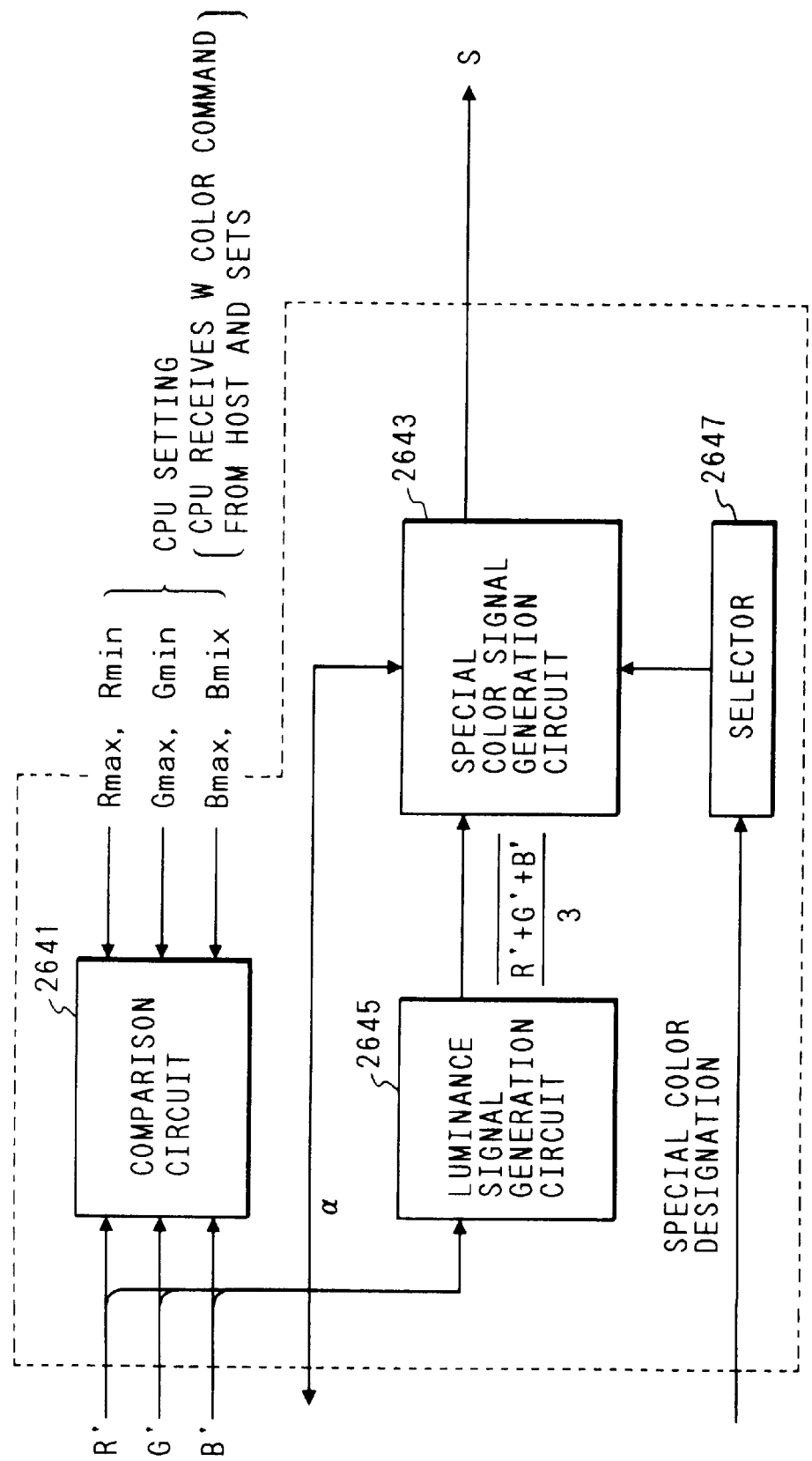
FIG. 58 is a block diagram showing an arrangement of a color detection unit in FIG. 56 so as to execute the sequence in FIG. 57.

The arrangement of the color detection unit 2631 in the printer P for designation on the host computer H side is shown in FIG. 58.

Referring to FIG. 58, the data transmitted from the host computer H is set in a comparison circuit 2641 constituted by a register, a comparator, and the like under the control of the CPU 2102A. When the comparison circuit 2641 receives the R', G', and B' signals from the input correction unit 2632, it compares these input signals with preset values. If the input signals represent colors falling within the designated ranges, the comparison circuit 2641 outputs a signal $\alpha$ of "0". Otherwise, the comparison circuit 2641 outputs a signal $\alpha$ of "1". The signal $\alpha$ is supplied to the density conversion unit 2633 and a special color signal generation circuit 2643. The density conversion unit 2633 does not generate the C, M, and Y signals in response to the R', G', and B' signals if $\alpha=0$.

The R', G', and B' signals are also supplied to a luminance signal generation circuit 2645. The luminance signal generation circuit 2645 calculates, e.g., (R'+G'+B')/3 and supplies the calculated value to the special color signal generation circuit 2643 so as to properly reproduce the densities within the range in which the recording colors are substituted with the special colors. A selector 2647 is switched by the CPU 2102A in accordance with the data designated by the <byte> and informs the special color signal generation circuit 2643 of use of the special colors. Therefore, when $\alpha$ output from the comparison circuit 2641 is "0", the special color signal generation circuit 2643 generates the special color data S designated by the selector 2647 at a density corresponding to the luminance signals supplied from the luminance signal generation circuit 2645.

If special colors, C, M, Y, and the like are desired to be mixed, the <byte> data is increased, and at the same time, the comparison circuit 2641 generates data for determining the mixing ratio between $\alpha=0$ for designating only use of special colors and $\alpha=1$ for designating only use of C, M, Y, and the like.

Figure 59:
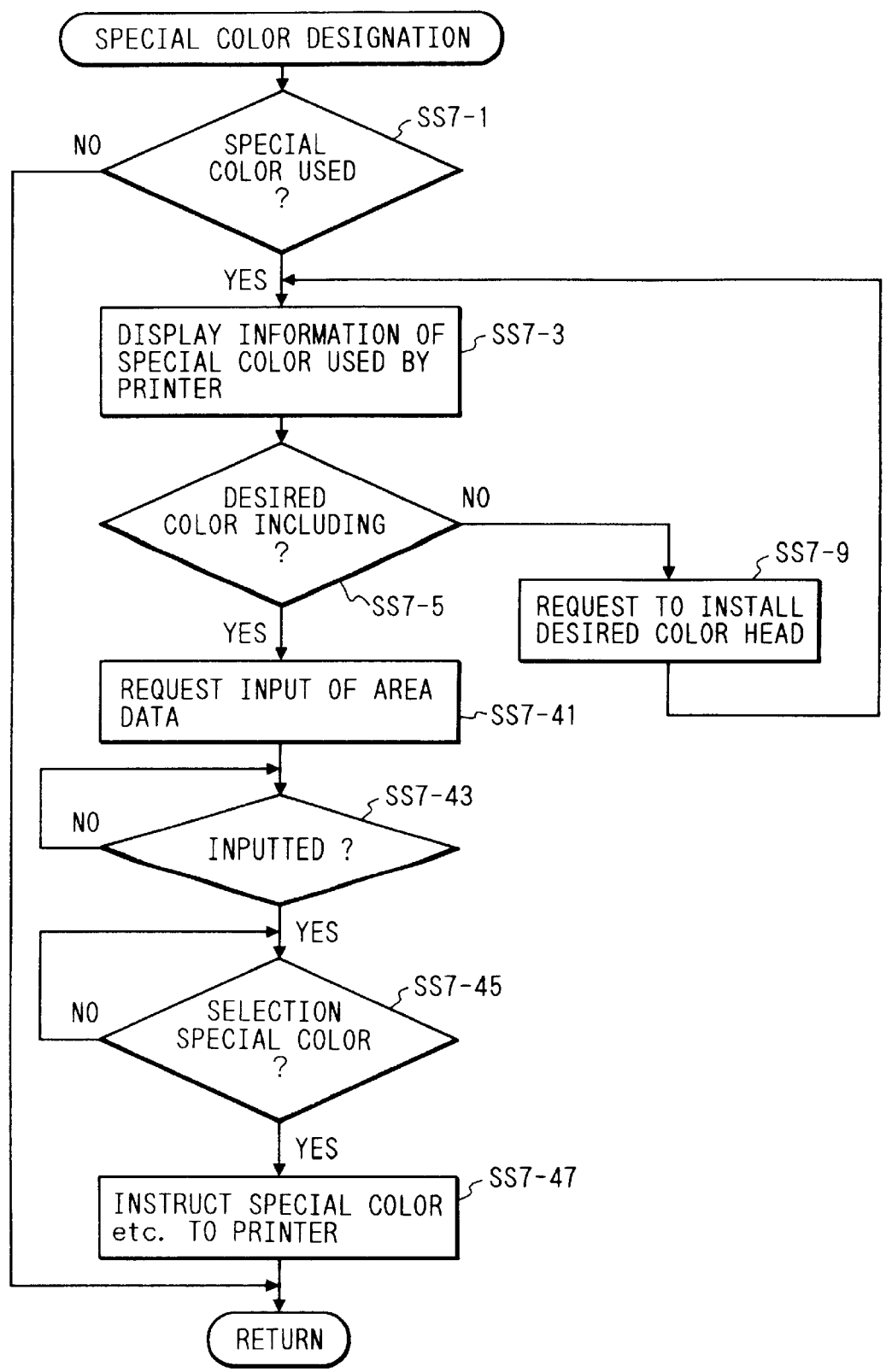
FIG. 59 is a flow chart showing another special color designation sequence.

FIG. 59 shows still another special color designation sequence performed by the host computer H. In this sequence, a specific area on the original data is designated, and this range is printed with a desired special color.

In this sequence, steps S7-1 to SS7-9 are performed first. When a special color recording head to be used is installed, an input of coordinate data representing a desired area on the original image is requested in step SS7-41. If this input is determined, a special color is selected in step SS7-45. The area data and the special color designation data are informed to the printer P in step SS7-47. In this case, the command format is given following an identification code <WAREA>:

"<X$_1$>, <Y$_1$>, <X$_2$>, <Y$_2$>, <X$_3$>, <Y$_3$>, <byte>"

where "<byte>" is the special color designation data as described above.

Figure 60:
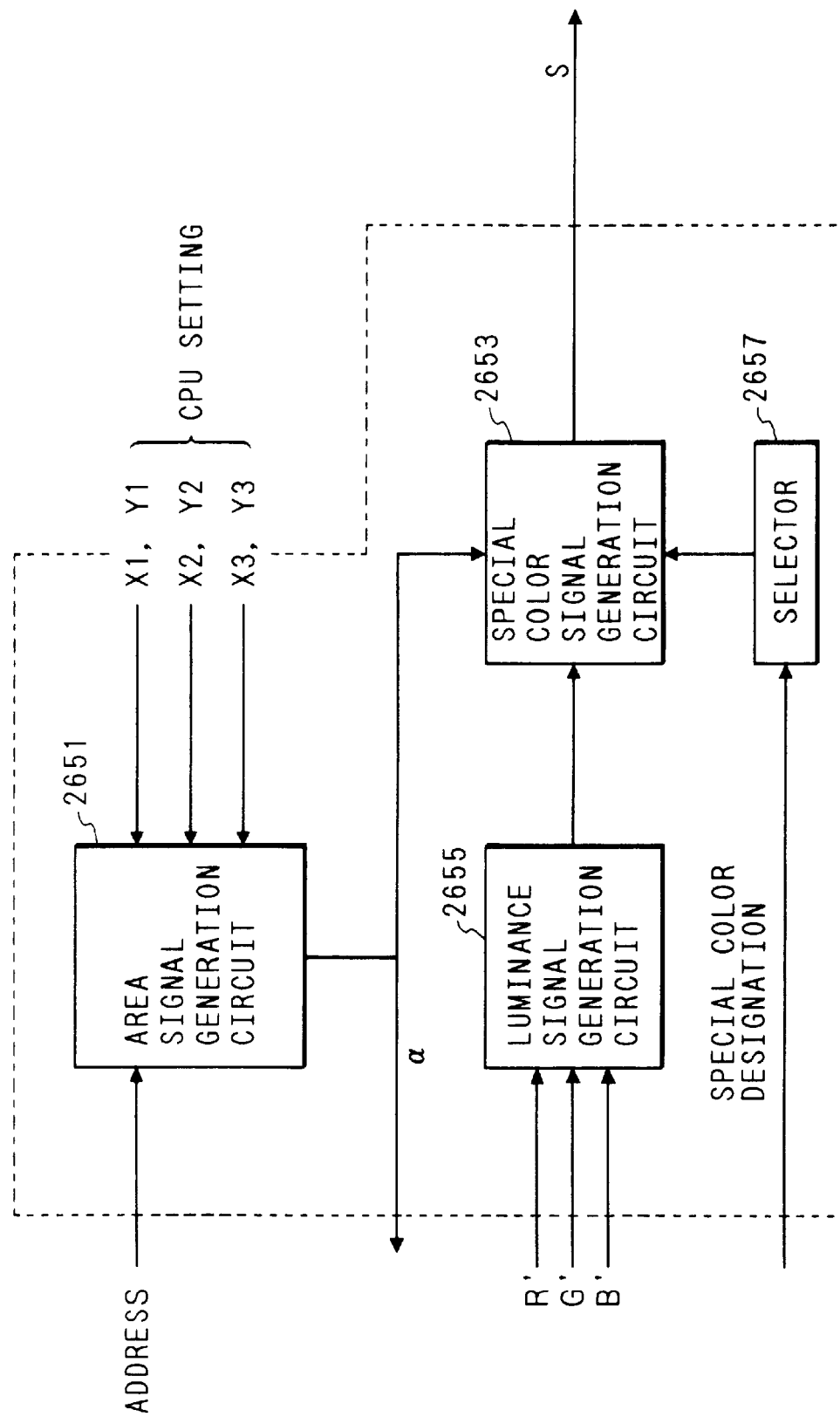
FIG. 60 is a block diagram showing an arrangement of an area detection unit arranged in place of the color detection unit in FIG. 56 so as to execute the sequence in FIG. 56.

A processing circuit in the printer P for this sequence can be given such that the color detection unit in FIG. 56 serves as an area detection unit, and the area detection unit is given as shown in FIG. 60.

Referring to FIG. 60, data associated with the area which is transmitted from the host computer H is set in a comparison circuit (area signal generation circuit) 2651 by the CPU 2102A. The area signal generation circuit 2651 can be constituted by a register, a comparator, and the like. When an image address is input from a CPU bus to the area signal generation circuit 2651, the area signal generation circuit 2651 compares this input signal with various set values. If the input signal represents an area falling within the designated range, the area signal generation circuit 2651 outputs a signal $\alpha$ of "0". Otherwise, the area signal generation circuit 2651 outputs a signal $\alpha$ of "1". The signal $\alpha$ is supplied to the density conversion unit 2633 and the special color signal generation circuit 2643. If $\alpha=0$, then the density conversion unit 2633 does not generate the C, M, Y signals. The area signal generation circuit 2651 may be arranged to generate data for determining a mixing ratio of the C, M, Y, and likes to the special colors.

The arrangements of the special color signal generation circuit 2653, the luminance signal generation circuit 2655, and the selector 2657 are the same as those of the special color signal generation circuit 2643, the luminance signal generation circuit 2645, and the selector 2647 in FIG. 58. When the area signal generation circuit 2651 outputs the signal $\alpha$ of "0", the special color signal generation circuit 2653 generates the special color data S designated by the selector 2657 at a density corresponding to the luminance signal supplied from the luminance signal generation circuit 2655.

Any one of the special color designation sequences described with reference to FIGS. 29, 57, and 59 can be started in accordance with the arrangement of the printer P, i.e., on the basis of the information presented by the printer P. Alternatively, if the printer P has a circuit compatible with any one of the sequences, any sequence can be started in accordance with a request of the operator.

In each embodiment described above, the "specific or special color" is defined as a metallic color which is impossible or difficult to be reproduced by Y, M, and C normally used in a color printer, or as colors of vivid R, vivid G, vivid B, violet, and orange, using specific color recording heads. In addition to these colors, the special color defined in the present invention may include a color for reducing amounts of color recording agents used to be mixed due to a high frequency of use although the resultant color can be reproduced or is easily reproduced by a mixture of Y, M, C, and the like. The special color may be a color expressed by mixing a recording agent of a special color with Y, M, or C, or mixing recording agents of special colors.

In the embodiment described with reference to FIGS. 34 and 35, the processing for faithfully reproducing a color selected by a designer exemplifies a sequence for generating color palette data. When the host computer H transmits R, G, and B luminance signals to the printer P as in the embodiment from FIG. 56, correction shown in FIG. 34 or selection shown in FIG. 35 may be performed to transmit the R, G, and B signals for appropriate color reproduction.

The ink jet recording apparatus according to the present invention may be arranged in the forms of a copying machine combined with a reader or the like and a facsimile apparatus having a transmission/reception function, in addition to the form of an image output terminal for an information processing equipment such as a computer.

As described above, according to this embodiment, special color application and an application mode can be designated in an image supply apparatus, and an image can be recorded in an image output apparatus, using a special color under the control of a control unit for allowing such designation. Therefore, there can be realized an image forming system, having the image supply apparatus and the image output apparatus, for faithfully reproducing an original image.

Note that functions of the various embodiments described above may be combined.

The present invention provides excellent effects in an ink jet recording head and an ink jet recording apparatus of all ink jet recording systems, capable of utilizing a heat energy to form flying droplets to perform recording.

Typical arrangements and principles are preferably realized by basic principles disclosed in U.S. Pat. Nos. 4,723,129 and 4,740,796. Such a system can be applied to either an on-demand type or a continuous type. In the on-demand type, at least one driving signal is applied to a thermoelectric conversion element located to correspond to a sheet containing a liquid (ink) or a liquid path so as to cause an abrupt temperature rise exceeding nucleus boiling corresponding to recording information, thereby causing the thermoelectric conversion element to generate heat. Film boiling is caused on the heat-acting surface of the recording head. In this case, a bubble is effectively formed in the liquid (ink) in a one-to-one correspondence with this driving signal. The growth and contraction of this bubble cause discharge of the liquid (ink) through a discharge opening, thereby forming at least one droplet. When the driving signal is constituted by pulses, the growth and contraction of the bubble can be instantaneously and appropriately performed, and the liquid (ink) can preferably be discharged with excellent response characteristics.

As this pulsed driving signal, signals described in U.S. Pat. Nos. 4,463,359 and 4,345,262 are preferable. When a condition for a temperature rise rate on the heat-acting surface of the recording head, as described in U.S. Pat. No. 4,313,124, is employed, excellent recording can be performed.

As the recording head structure, in addition to a structure (linear or perpendicular liquid path) as a combination of discharge ports, liquid paths, and thermoelectric conversion elements, a structure in which a heat-acting surface is located at a bent region, as disclosed in U.S. Pat. Nos. 4,558,333 or 4,459,600, may be used.

Any other structure may be used based on a structure having a common slit as discharge ports of a plurality of thermoelectric conversion elements, as disclosed in Japanese Laid-Open Patent Application No. 59-123670, or a structure in which an opening for absorbing the pressure wave of heat energy corresponds to the discharge port, as disclosed in Japanese Laid-Open Patent Application No. 59-138461.

A full-line recording head having a length corresponding to the width of a maximum recording medium subjected to recording in a recording apparatus may be a structure in which a plurality of recording heads disclosed in the above prior art specifications are combined to obtain the length corresponding to the width of the maximum recording medium, or a structure using one integral recording head.

A recording head may be a chip type recording head detachably mounted in the apparatus so as to be electrically connected with the apparatus and to receive an ink, or a cartridge type recording head with which an ink tank is formed integrally.

A recording head recovery means, a supplementary auxiliary means, and the like arranged as the constituent components of the recording apparatus of the present invention are preferably used to further stabilize the effects of the present invention. More specifically, a recording head capping means, a recording head cleaning means, a recording head pressuring or suction means, a thermoelectric conversion element, a separate heating element, a supplementary heating means as a combination of the thermoelectric conversion element and the separate heating element, and a supplementary discharge mode for performing a discharge operation different from that for recording are effective means for stable recording.

The recording mode of the recording apparatus is not limited to a recording mode using a main color such as black. An apparatus can have at least one of a color image using different colors, or a full-color image obtained by a color mixture.

In the embodiment described above, inks are exemplified as liquids. The ink may be an ink solidified at a temperature less than room temperature and softened at room temperature, a liquid ink, or an ink converted into a liquid ink upon application of a recording signal because the above ink jet scheme generally controls to heat the ink within the range of 30° C. to 70° C. so as to cause the ink viscosity to fall within a stable discharge range.

The temperature rise by a heat energy is used as a transition energy of the ink from a solid phase to a liquid phase to positively prevent the temperature rise, or an ink which is solidified, while being left, to prevent ink evaporation is used. In either case, an ink having a nature which is liquefied for the first time upon reception of the heat energy, e.g., an ink liquefied upon reception of the heat energy corresponding to a recording signal, or an ink starting to solidify when the ink reaches a recording medium, can be applied to the present invention. Such an ink may be held as a liquid or solid material in recesses or through holes of a porous sheet and may oppose a thermoelectric conversion element, as described in Japanese Laid-Open Patent Application No. 54-56847 or 60-71260. According to the present invention, the most effective scheme for each ink described above is the film boiling scheme.

In addition, as the form of the recording apparatus according to the present invention, in addition to an integral or separate image output terminal for information processing equipment such as a wordprocessor or a computer, the recording apparatus may take the form of a copying machine combined with a reader or the like, or a facsimile apparatus having a transmission/reception function.

The required properties of ink jet printing cloths are as follows:

(1) an ink can be color-developed at a sufficiently high density;

(2) the degree of exhaustion is high;

(3) an ink can be immediately dried on a cloth;

(4) irregular ink blurring does not occur on a cloth; and (5) a cloth must provide excellent feedability in the apparatus.

To satisfy these requirements, a cloth must be pre-treated, as needed. For example, Japanese Laid-Open Patent Application No. 62-53492 discloses cloths each having an ink reception layer. A cloth containing a reducing inhibitor or an alkaline material is proposed in Japanese Patent Publication No. 3-46589. An example of this pre-treatment is to contain a material selected from an alkaline material, a water-soluble polymer, a synthesized polymer, a water-soluble metal salt, urea, and thiourea in a cloth.

Examples of the alkaline material are alkali metal hydroxides (e.g., sodium hydroxide and potassium hydroxide), amines (e.g., monoethanolamine, diethanolamine, and triethanolamine), and alkali metal salt carbonates or bicarbonates (e.g., sodium carbonate, potassium carbonate, and sodium bicarbonate). Organic acid metal salts (e.g., potassium acetate and barium acetate), ammonia, ammonia compounds, and the like can also be used. Sodium trichloroacetate converted into an alkaline material under the steaming or dry condition can also be used. The most preferable alkaline materials are sodium carbonate and sodium bicarbonate which are used in reactive dyes.

Examples of the water-soluble polymer are starches (e.g., corn and wheat), cellulose-based materials (e.g., carboxymethyl cellulose, methyl cellulose, and hydroxyethyl cellulose), polysaccharides (e.g., sodium alginate, acacia gum, locust bean gum, gum tragacanth, gua gum, and tamarind seeds), protein materials (e.g., gelatine and casein), and water-soluble natural polymers (e.g., tannin-based materials and lignin-based materials).

The water-soluble metal salt can be a compound which forms a typical ionic crystal and has a pH of 4 to 10, and is exemplified as halides of an alkali metal and an alkali earth metal. Typical examples of the alkali metal are NaCl, $Na_2SO_4$, KCl, and $CH_3COONa$, and typical examples of the alkali earth metal are $CaCl_2$ and $MgCl_2$. Of these materials, salts of Na, K, and Ca are preferable.

A method of containing the above material or the like in the cloth in the pre-treatment is not limited to a specific one. Dipping, padding, coating, or spraying may be used.

As a cloth printing ink applied to an ink jet printing cloth is simply attached to the cloth upon its application, a reactive fixing process (dyeing process) of a dye to the fiber is preferably performed. This reactive fixing process can be a conventionally known method such as steaming, HT steaming, or thermo-fixing. If a cloth which is not treated with an alkali, alkali pad steaming, alkali blotch steaming, alkali shocking, or alkali cold fixing may be used.

A non-reacted dye and materials used in the pre-treatment can be removed by cleaning according to a conventional known method after the reactive fixing process is performed. Note that conventional fixing is preferably simultaneously used.

Recording media used in the present invention are a cloth, wall paper, paper, an OHP recording medium, and the like.

The cloths in the present invention include all fabrics, an unwoven fabric, and any other fabric regardless of materials, a weaving method, and a knitting method.

The wall paper includes an adhesive wall paper having a sheet material as of paper, a cloth, or a synthetic resin such as vinyl polychloride.

The present invention is applicable to a system constituted by a plurality of devices or an apparatus constituted by one device. The system or apparatus of the present invention can be achieved by supplying a program for embodying the present invention.

What is claimed is:

1. An image forming method of forming an image corresponding to a given image signal on a cloth, using a plurality of discharge ports, comprising the steps of:

providing an information related to a type of said cloth;

performing shading correction for correcting a dispersion of a forming density corresponding to each of said discharge ports in accordance with the information related to the type of said cloth, in each color;

performing a gamma conversion process in each said color; and forming said image on said cloth in accordance with said shading correction and said gamma conversion-processed image signal, wherein said shading correction and said gamma conversion process are controlled according to said information related to a type of said cloth.

2. A method according to claim 1, wherein said type of said cloth is one of cotton, silk, Nylon, polyester, and acrylic.

3. A method according to claim 1, further comprising the step of fixing the image formed on said cloth.

4. A method according to claim 1, further comprising the step of cleaning said image formed on said cloth.

5. A method according to claim 4, further comprising the step of pre-processing said cloth before said image is formed thereon.

6. A method of producing ink jet recorded cloth, based upon a given image signal, using a plurality of discharge ports on a recording head, comprising the steps of:

providing an information related to a type of said cloth;

performing shading correction for correcting a dispersion of a forming density corresponding to each of said discharge ports in accordance with the information related to the type of said cloth, in each color;

performing a gamma conversion process in each said color; and forming an image on said cloth in accordance with said shading correction and said gamma conversion-processed image signal, wherein said shading correction and said gamma conversion process are controlled according to said information related to a type of said cloth.

7. A method according to claim 6, wherein said type of said cloth is one of cotton, silk, Nylon, polyester and acrylic.

8. A method according to claim 6, further comprising a step of performing the gamma conversion process corresponding to the type of said cloth.

9. A method according to claim 6, further comprising the step of fixing the image formed on said cloth.

10. A method according to claim 9, further comprising the step of cleaning said image formed on said cloth.

11. A method according to claim 6, wherein said recording head having said plurality of discharge ports is an ink jet recording head for discharging an ink utilizing a heat energy and comprises a heat energy converting element for generating said heat energy applied to said ink.

12. A recording apparatus for forming an image corresponding to a given image signal on a cloth, using a plurality of discharge ports, comprising:

input means for providing information related to a type of said cloth;

first processing means for performing shading correction for correcting a dispersion of a forming density corresponding to each of said discharge ports in accordance with the information related to the type of said cloth, in each color;

second processing means for performing gamma conversion process in each said color; and forming means for forming said image on said cloth in accordance with said shading correction and said gamma conversion-processed image signal, wherein said shading correction and said gamma conversion process are controlled according to said information related to a type of said cloth.

13. An image processing apparatus, comprising:

storing means for storing a palette conversion table in which a corresponding relationship of palette data and color data including a plurality of color components is written;

input means for inputting color image data represented by the palette data and information related to a type of a cloth to be used for an image formation from an external device;

converting means for converting the input palette data to color data by using the palette conversion table;

color processing means for performing a color process based on the information related to a type of a cloth for the converted color data; and output means for outputting processed color image data to an image forming means for forming an image on said cloth.

14. An apparatus according to claim 13, wherein said type of said cloth is one of cotton, silk, Nylon, polyester and acrylic.

15. An apparatus according to claim 13, wherein said process is a color process.

16. An apparatus according to claim 15, wherein said color process is a γ process.

17. An apparatus according to claim 13, wherein an amount of palette data is smaller than an amount of color data corresponding to the palette data in said palette conversion table.

18. An image recording method, comprising the steps of:

storing a palette conversion table in which a corresponding relationship of palette data and color data including a plurality of color components is written;

inputting a color image data represented by the palette data and information related to a type of a cloth to be used for an image formation from an external device;

converting the input palette data to color data by using the palette conversion table;

performing a color process based on the information related to a type of a cloth for the converted color data; and outputting processed color image data to an image forming means for forming an image on the cloth.

19. A method according to claim 18, wherein an amount of palette data is smaller than an amount of color data corresponding to the palette data in said palette conversion table.

* * * * *

UNITED STATES PATENT AND TRADEMARK OFFICE
CERTIFICATE OF CORRECTION

PATENT NO. : 5,984,454

DATED : November 16, 1999

INVENTORS : Kazuyoshi Takahashi, et al.

It is certified that error appears in the above-identified patent and that said Letters Patent is hereby corrected as shown below:

COVER PAGE

Under [56] References Cited, Foreign Patent Documents, "2280274 1/1976 France" should be deleted.

COLUMN 1

Line 27, "This" should read --If this--;
Line 30, "used" should read --are used--; and
Line 50, "occurs." should read --occur.--.

COLUMN 3

Line 24, "color-separates" should read --color-separate--.

COLUMN 4

Line 33, "another" should read --further--; and
Line 53, "FIG. 5A" should read --FIGS. 5A--.

COLUMN 6

Line 44, "sowing" should read --showing--.

COLUMN 12

Line 11, "has" should read --have--.

UNITED STATES PATENT AND TRADEMARK OFFICE
CERTIFICATE OF CORRECTION

PATENT NO. : 5,984,454

DATED : November 16, 1999

INVENTORS : Kazuyoshi Takahashi, et al.

Page 2 of 3

It is certified that error appears in the above-identified patent and that said Letters Patent is hereby corrected as shown below:

COLUMN 15

Line 29, "does" should read --is--.

COLUMN 26

Line 65, "When" should read --Then--.

COLUMN 27

Line 23, "2014d and" should read --2014c, and--.

COLUMN 33

Line 13, "repeated" should read --repeatedly--.

COLUMN 34

Line 43, "address" should read --addresses--; and
Line 53, "time-assigning" should read --time-assigns--.

UNITED STATES PATENT AND TRADEMARK OFFICE
CERTIFICATE OF CORRECTION

PATENT NO. : 5,984,454

DATED : November 16, 1999

INVENTORS : Kazuyoshi Takahashi, et al.

It is certified that error appears in the above-identified patent and that said Letters Patent is hereby corrected as shown below:

COLUMN 37

Line 5, "when" should be deleted.

COLUMN 42

Line 13, "likes" should read --the like--.

Signed and Sealed this

Fourteenth Day of November, 2000

Attest:

Q. TODD DICKINSON

*Attesting Officer*     *Director of Patents and Trademarks*